(12) United States Patent
Ishida et al.

(10) Patent No.: US 8,253,768 B2
(45) Date of Patent: Aug. 28, 2012

(54) OPTICAL SCANNER AND IMAGE FORMING APPARATUS

(75) Inventors: Masaaki Ishida, Kanagawa (JP); Yasuhiro Nihei, Kanagawa (JP); Atsufumi Omori, Kanagawa (JP); Jun Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1046 days.

(21) Appl. No.: 11/565,315

(22) Filed: Nov. 30, 2006

(65) Prior Publication Data

US 2007/0132828 A1 Jun. 14, 2007

(30) Foreign Application Priority Data

Dec. 9, 2005 (JP) ................................. 2005-355541
Feb. 17, 2006 (JP) ................................. 2006-040608
Oct. 30, 2006 (JP) ................................. 2006-294049

(51) Int. Cl.
*B41J 2/47* (2006.01)
*B41J 2/385* (2006.01)
*B41J 15/14* (2006.01)

(52) U.S. Cl. ......... 347/240; 347/251; 347/134; 347/243
(58) Field of Classification Search .................. 347/134, 347/240, 251, 243
See application file for complete search history.

(56) References Cited

U.S. PATENT DOCUMENTS

| | | | | |
|---|---|---|---|---|
| 5,325,216 A * | 6/1994 | AuYeung | ........................ | 358/479 |
| 6,055,084 A * | 4/2000 | Shiraishi et al. | ........... | 359/204.1 |
| 6,340,983 B1 * | 1/2002 | Hamada et al. | ................ | 347/131 |
| 2002/0008714 A1 * | 1/2002 | Tezuka et al. | ................. | 345/694 |
| 2002/0054392 A1 * | 5/2002 | Tamaki et al. | ................. | 358/514 |
| 2002/0149666 A1 * | 10/2002 | Amada et al. | .................. | 347/233 |
| 2003/0090537 A1 * | 5/2003 | Tanaka et al. | ................... | 347/41 |
| 2004/0041895 A1 * | 3/2004 | Tajima | .......................... | 347/116 |
| 2004/0252182 A1 * | 12/2004 | Wakasugi | ..................... | 347/251 |

FOREIGN PATENT DOCUMENTS

| | | |
|---|---|---|
| JP | 6-115155 | 4/1994 |
| JP | 7-174995 | 7/1995 |
| JP | 62-207062 | 9/1997 |
| JP | 10-16308 | 1/1998 |
| JP | 10-221618 | 8/1998 |
| JP | 10-235928 | 9/1998 |
| JP | 2001-272615 | 10/2001 |

(Continued)

OTHER PUBLICATIONS

U.S. Appl. No. 11/913,558, filed Nov. 5, 2007, Tanabe, et al.

(Continued)

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

A disclosed optical scanner includes a light source unit and a control unit configured to control the light source unit. Light emitted from the light source unit is scanned to expose a scan object surface and form an image on the scan object surface. The light source unit includes plural light sources arranged at a density equal to N (N being an integer of two or more) times higher than a density of pixels on the scan object surface. The control unit controls the light source unit such that one pixel is formed by at least two of the light sources.

11 Claims, 53 Drawing Sheets

FOREIGN PATENT DOCUMENTS

| | | |
|---|---|---|
| JP | 2001-350111 | 12/2001 |
| JP | 2003-72135 | 3/2003 |
| JP | 2003-322811 | 11/2003 |
| JP | 2005-37575 | 2/2005 |
| JP | 3644923 | 2/2005 |
| JP | 2005-234510 | 9/2005 |
| JP | 2006-159647 | 6/2006 |
| WO | WO 2007/050086 A1 | 5/2007 |

OTHER PUBLICATIONS

U.S. Appl. No. 12/029,115, filed Feb. 11, 2008, Omori, et al.
U.S. Appl. No. 12/055,666, filed Mar. 26, 2008, Tanabe, et al.
Office Action issued May 18, 2011 in Japan Application No. 2005-355541.
Office Action issued Jun. 9, 2011, in Japanese Patent Application No. 2006-294049, filed Oct. 30, 2006.

* cited by examiner

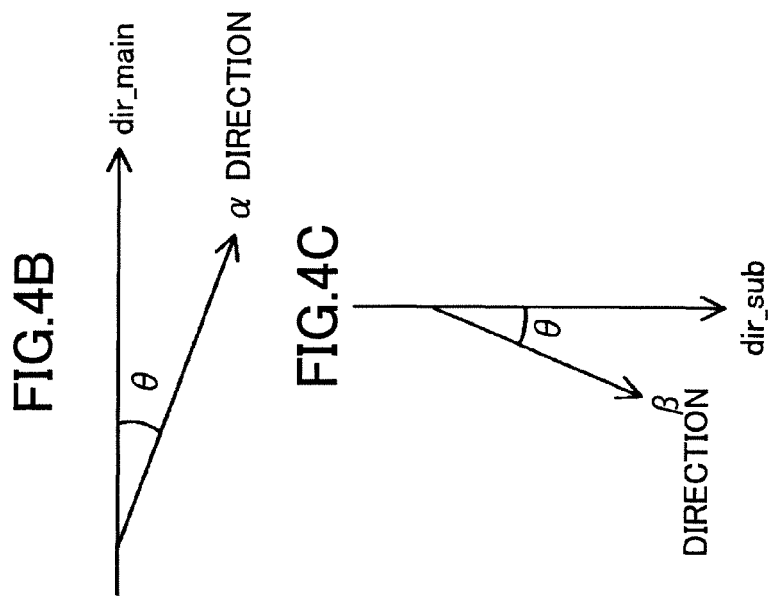
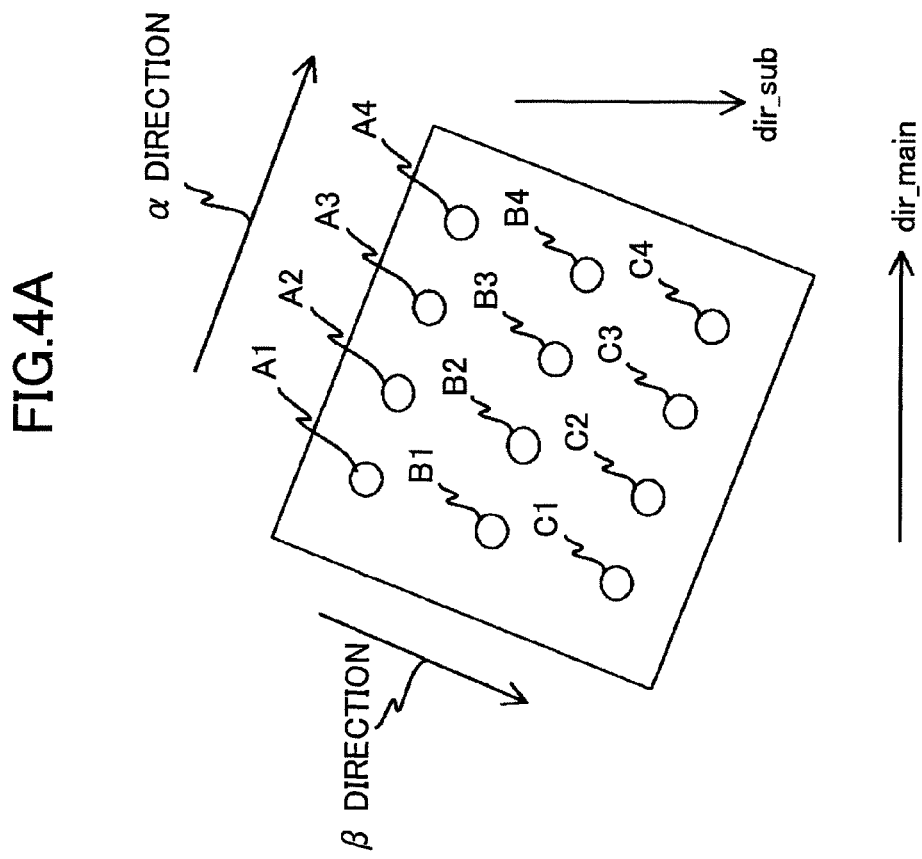

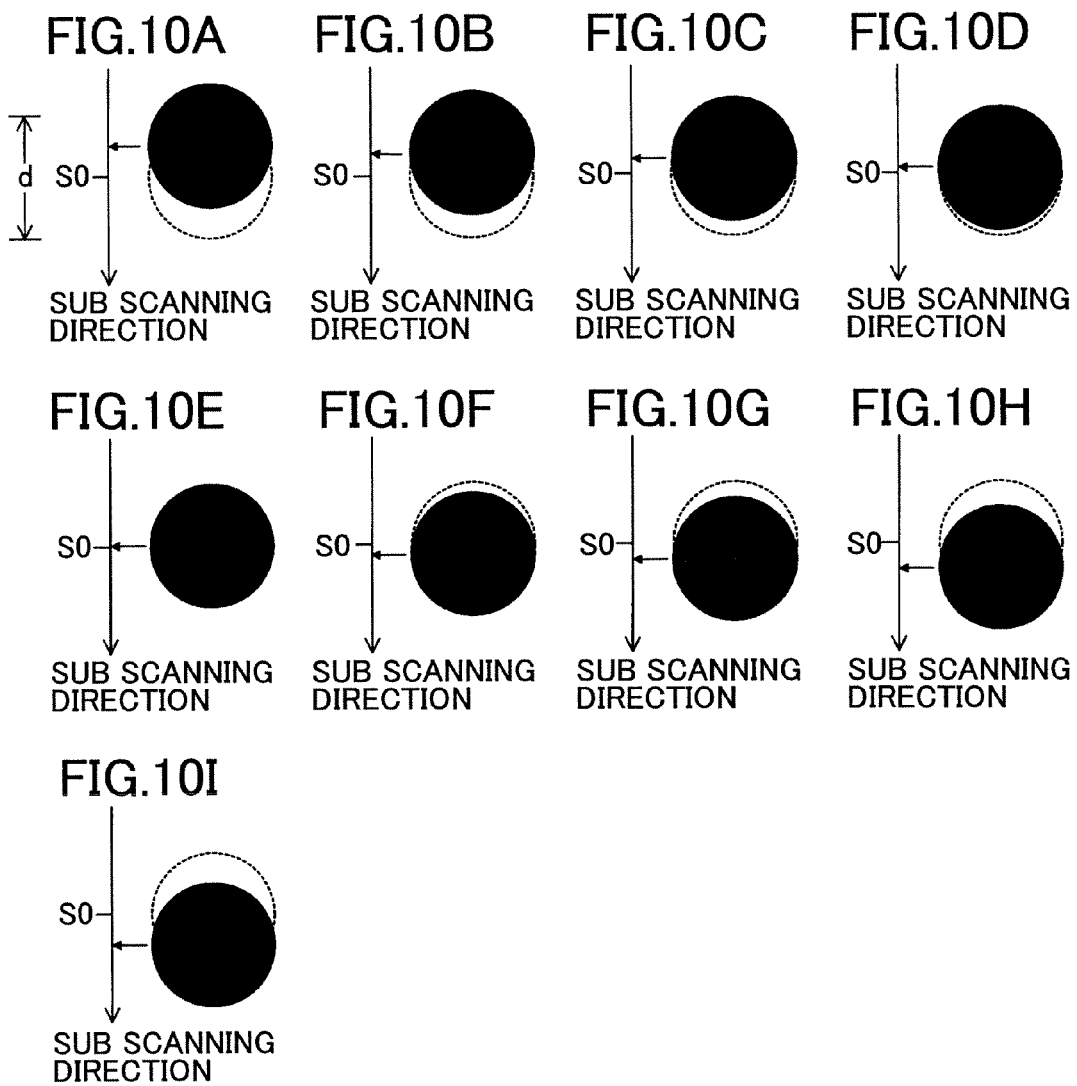

FIG.11A

| SUB SCANNING DIRECTION POSITIONAL SHIFT AMOUNT | PIXEL 1 | PIXEL 2 | PIXEL 3 | PIXEL 4 | PIXEL 5 | PIXEL 6 | PIXEL 7 | PIXEL 8 | PIXEL 9 | PIXEL 10 |
|---|---|---|---|---|---|---|---|---|---|---|
| | +4d/16 | +3d/16 | +2d/16 | +d/16 | 0 | -d/16 | -2d/16 | -d/16 | 0 | +d/16 |

FIG.11B

| LIGHT EMITTING PATTERN | PIXEL 1 | PIXEL 2 | PIXEL 3 | PIXEL 4 | PIXEL 5 | PIXEL 6 | PIXEL 7 | PIXEL 8 | PIXEL 9 | PIXEL 10 |
|---|---|---|---|---|---|---|---|---|---|---|
| | M9 | M8 | M7 | M6 | M5 | M4 | M3 | M4 | M5 | M6 |

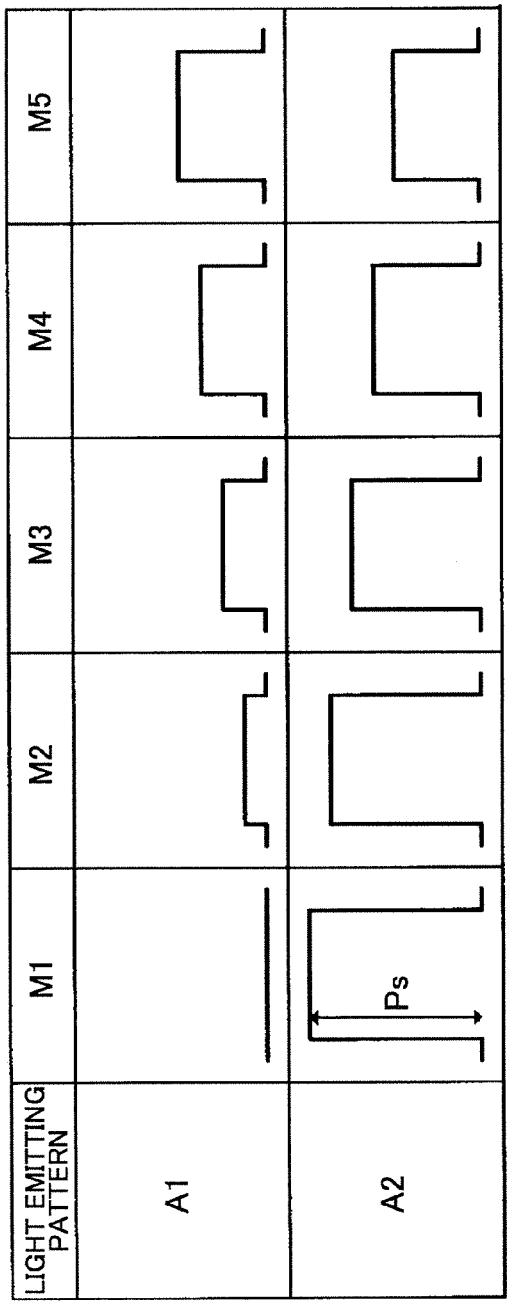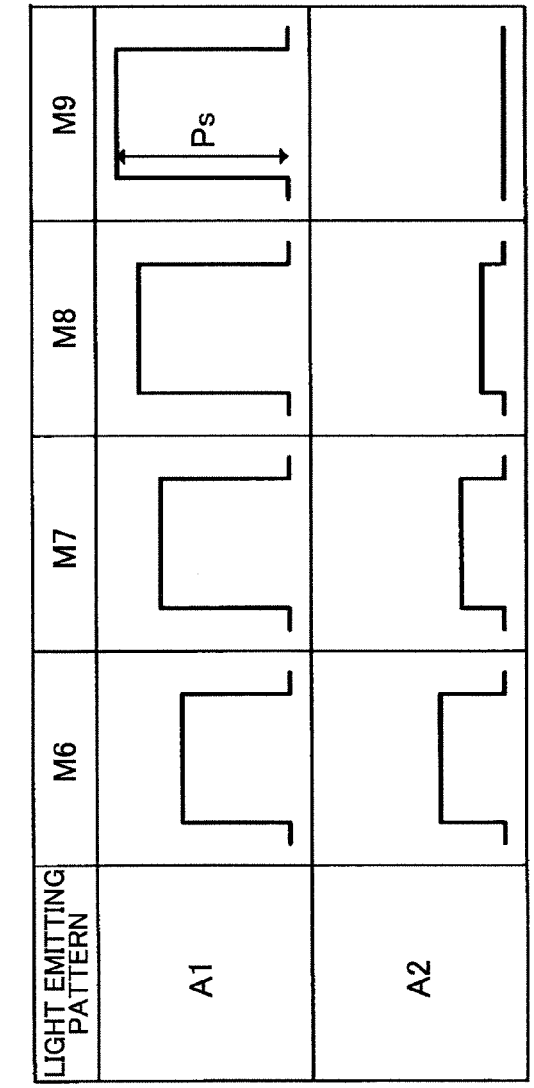
FIG.13

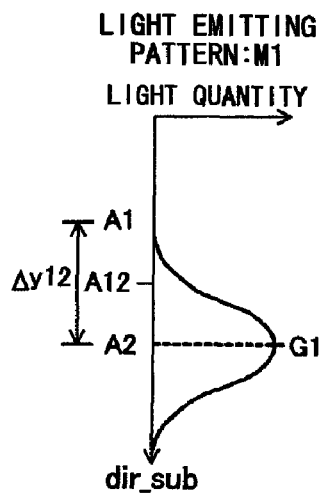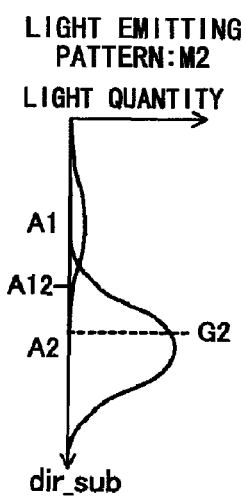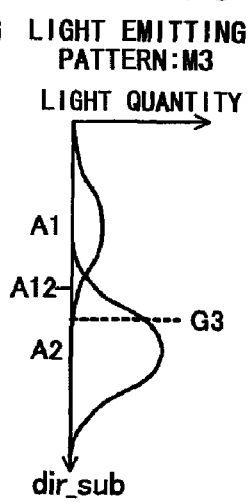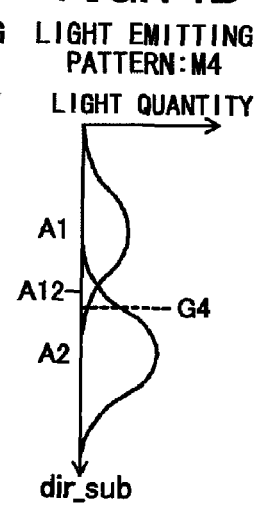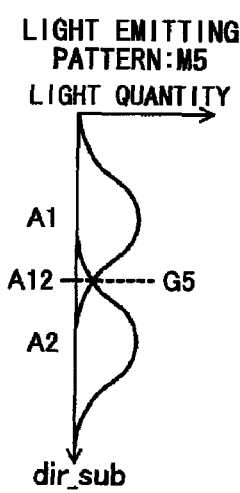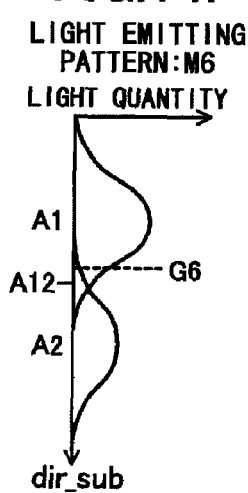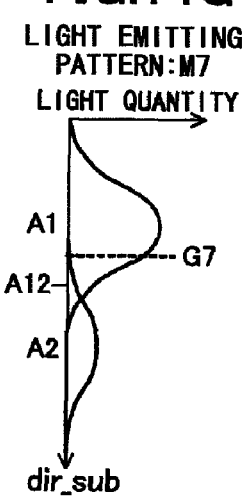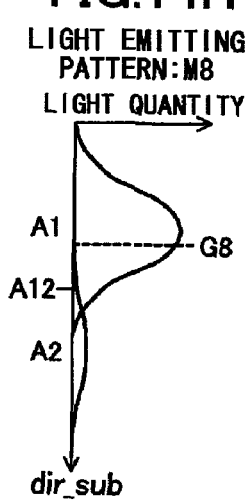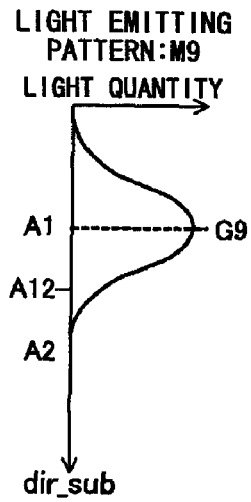

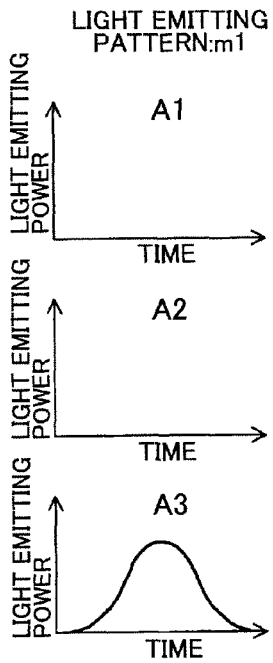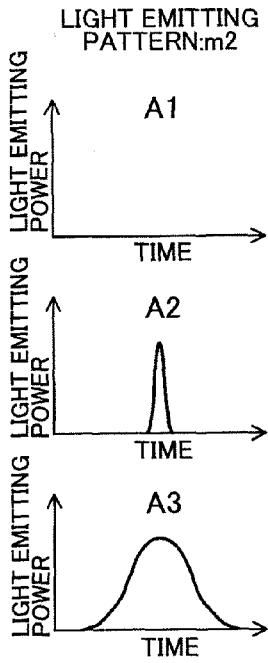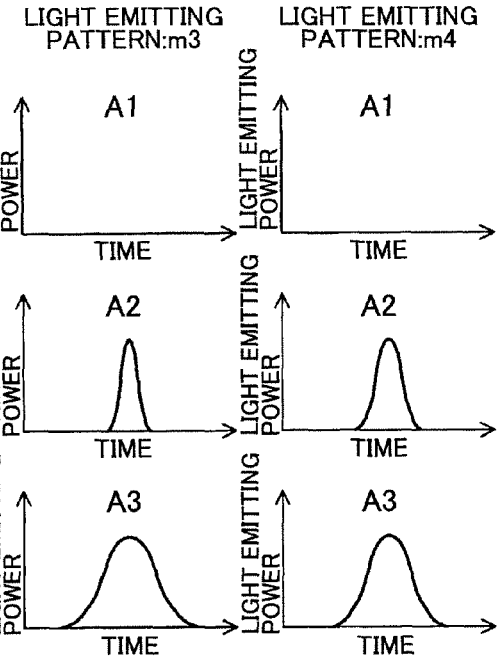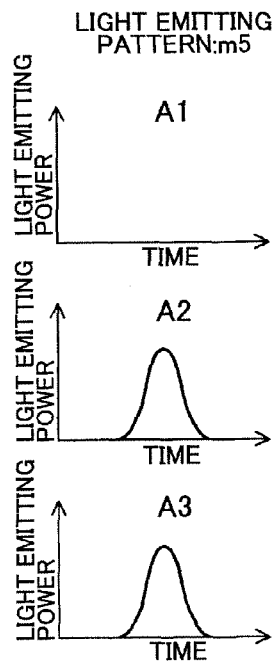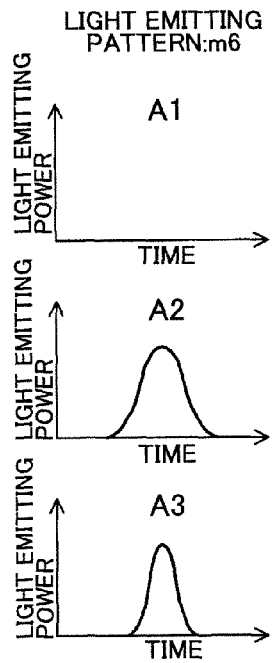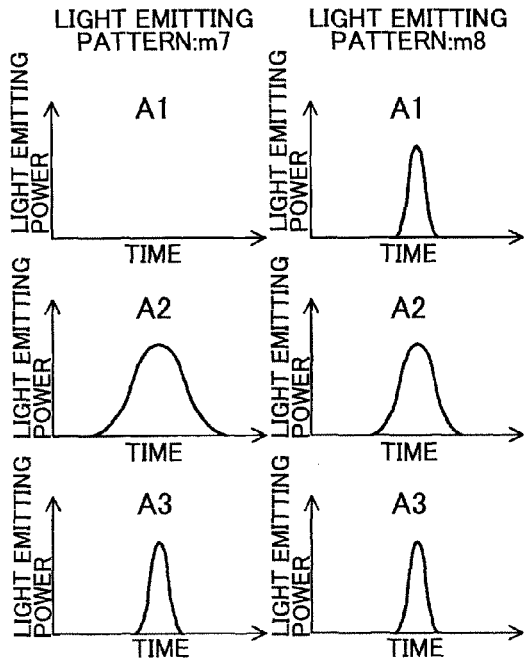

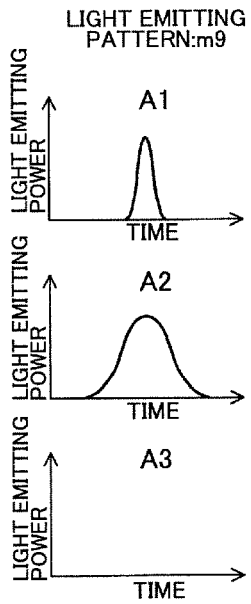
FIG.18A
LIGHT EMITTING PATTERN:m9
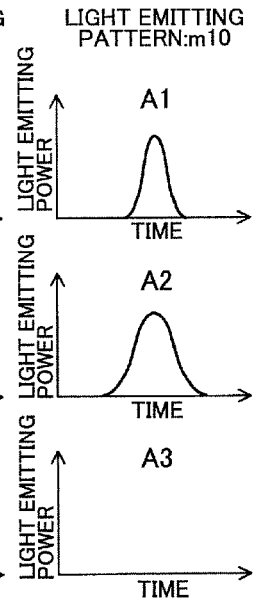
FIG.18B
LIGHT EMITTING PATTERN:m10
FIG.18C
LIGHT EMITTING PATTERN:m11
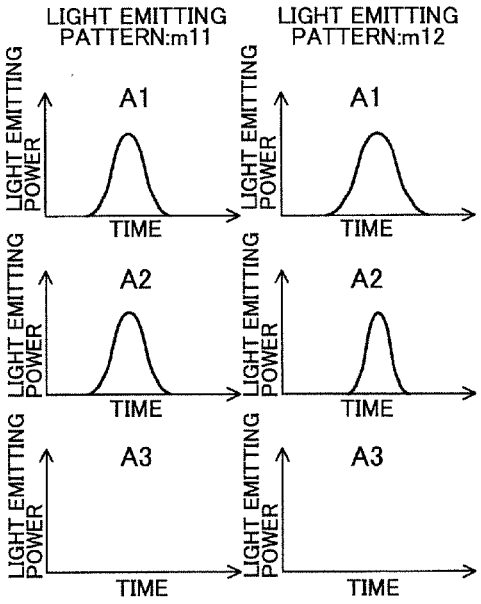
FIG.18D
LIGHT EMITTING PATTERN:m12
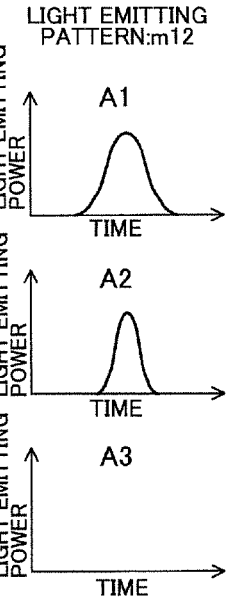
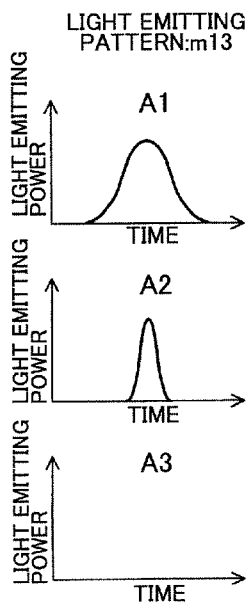
FIG.18E
LIGHT EMITTING PATTERN:m13
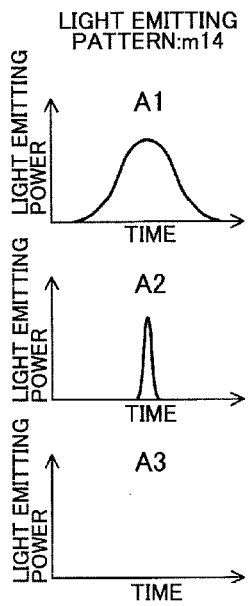
FIG.18F
LIGHT EMITTING PATTERN:m14
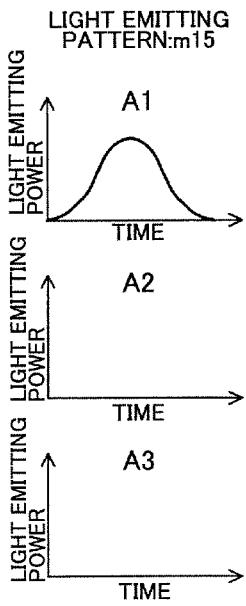
FIG.18G
LIGHT EMITTING PATTERN:m15

FIG.21A

| | PIXEL 1 | PIXEL 2 | PIXEL 3 | PIXEL 4 | PIXEL 5 | PIXEL 6 | PIXEL 7 | PIXEL 8 | PIXEL 9 | PIXEL 10 |
|---|---|---|---|---|---|---|---|---|---|---|
| SUB SCANNING DIRECTION POSITIONAL SHIFT AMOUNT | −8d/32 | −6d/32 | −4d/32 | −2d/32 | 0 | +2d/32 | +3d/32 | +4d/32 | +6d/32 | +8d/32 |

FIG.21B

| | PIXEL 1 | PIXEL 2 | PIXEL 3 | PIXEL 4 | PIXEL 5 | PIXEL 6 | PIXEL 7 | PIXEL 8 | PIXEL 9 | PIXEL 10 |
|---|---|---|---|---|---|---|---|---|---|---|
| LIGHT EMITTING PATTERN | m1 | m3 | m5 | m7 | m8 | m9 | m10 | m11 | m13 | m15 |

FIG.22
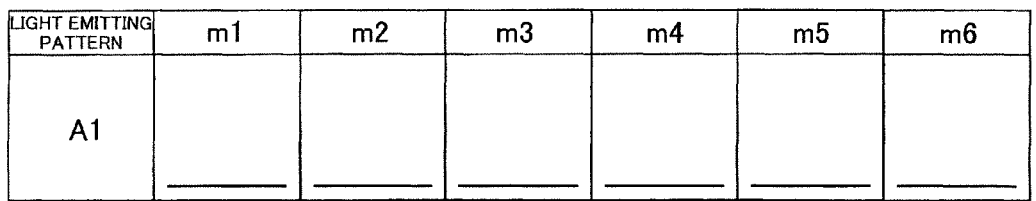
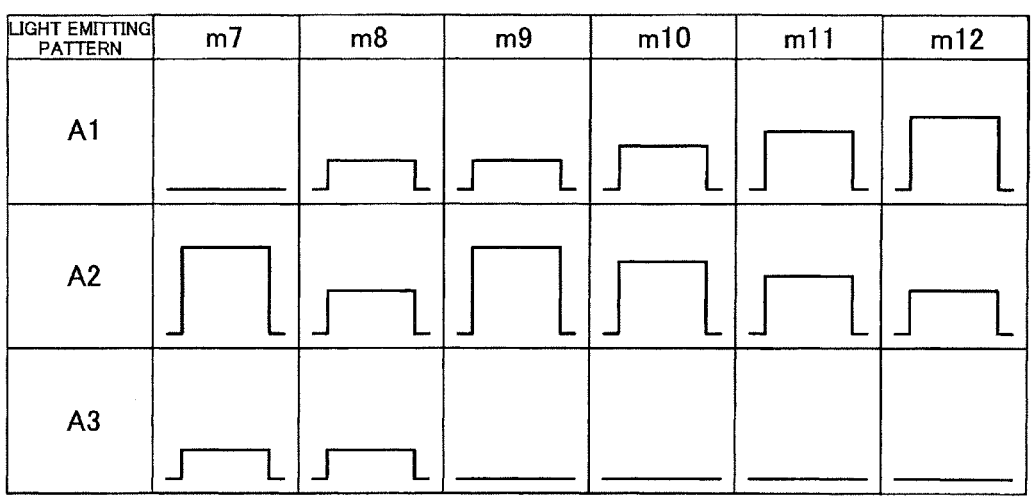
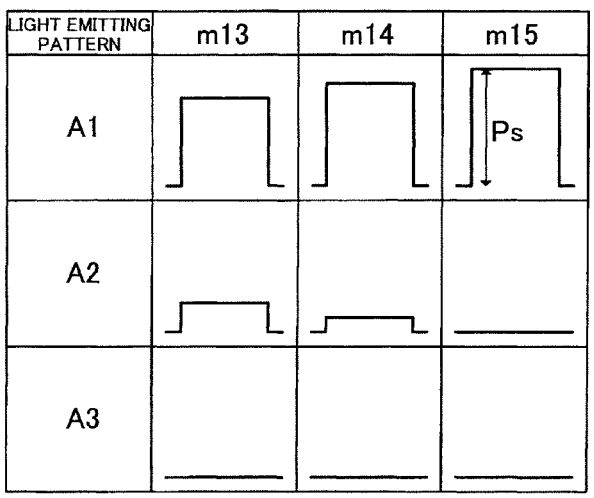

LIGHT EMITTING PATTERN:m1

LIGHT EMITTING PATTERN:m2

LIGHT EMITTING PATTERN:m3

LIGHT EMITTING PATTERN:m4

LIGHT EMITTING PATTERN:m5

LIGHT EMITTING PATTERN:m6

LIGHT EMITTING PATTERN:m7

LIGHT EMITTING PATTERN:m8

LIGHT EMITTING PATTERN:m9

LIGHT EMITTING PATTERN:m10

LIGHT EMITTING PATTERN:m11

LIGHT EMITTING PATTERN:m12

LIGHT EMITTING PATTERN:m13

LIGHT EMITTING PATTERN:m14

LIGHT EMITTING PATTERN:m15

FIG.35

|  | LIGHT SOURCE A | LIGHT SOURCE B |
|---|---|---|
| PATTERN 1 | 0 | 8 |
| PATTERN 2 | 2 | 6 |
| PATTERN 3 | 3 | 5 |
| PATTERN 4 | 4 | 4 |
| PATTERN 5 | 5 | 3 |
| PATTERN 6 | 6 | 2 |
| PATTERN 7 | 8 | 0 |

OPTICAL SCANNER AND IMAGE FORMING APPARATUS

BACKGROUND OF THE INVENTION

1. Field of the Invention

The present invention relates generally to optical scanners and image forming apparatuses, and more particularly to an optical scanner and an image forming apparatus for exposing a scan object surface by scanning a light beam to form an image.

2. Description of the Related Art

In image forming apparatuses such as laser printers and digital copiers, a light beam emitted from a light source is modulated according to image information. The light beam passes through a polygon mirror and scan lenses, etc., and focuses on a photoconductor. The light beam scans the surface of the photoconductor in a predetermined direction (main scanning direction) to form a latent image (electrostatic latent image) on the photoconductor. Toner adheres to the latent image to visualize the image information.

FIG. 54 is a configuration of a general image forming apparatus such as a laser printer or a digital copier employing the electrophotographic method. Referring to FIG. 54, a laser light beam emitted from a semiconductor laser unit 1001 functioning as a light source unit is deflected and scanned by a rotating polygon mirror 1002. The deflected laser beam forms a light spot on a photoconductor 1004 functioning as a scan object medium via a scanning lens (fθ lens) 1003. The photoconductor 1004 is exposed so that an electrostatic latent image is formed thereon. A phase synchronizing circuit 1009 applies modulation signals generated by a clock generating circuit 1008 to a phase in synchronization with a photo-detector 1005. The photo-detector 1005 detects the laser light beam emitted from the semiconductor laser unit 1001 and deflected and scanned by the polygon mirror 1002. Specifically, the phase synchronizing circuit 1009 generates an image clock (pixel clock) whose phase is synchronized based on output signals from the photo-detector 1005 for each line, and the image clock is supplied to an image processing unit 1006 and then to a laser driving circuit 1007. Accordingly, the light emitting time lengths of the semiconductor laser unit 1001 are controlled through the laser driving circuit 1007, in accordance with image data generated by the image processing unit 1006 and the image clock whose phase is set for each line by the phase synchronizing circuit 1009. Thus, the electrostatic latent image on the photoconductor (scan object medium) 1004 can be controlled.

In recent years, requirements for faster printing speed have been addressed by enhancing the rotational speed of the polygon mirror and frequencies of clock signals used for modulating light from the light source. However, the printing speed cannot be enhanced sufficiently by these methods. In an attempt to achieve even faster printing speed, a multi-beam method has been devised, which employs plural light sources.

In an optical scanning method using multiple beams, more light flux segments can be scanned simultaneously by deflecting the light flux segments with a deflecting unit. Therefore, it is possible to reduce the rotational speed of a polygon motor functioning as a deflecting unit, and to reduce pixel clock frequencies. Thus, optical scanning and image forming can be performed at high speed and in a stable manner.

The light source employed in the multi-beam method is realized by, for example, a combination of laser chips that each emit a single beam, or an LD array or a vertical cavity surface emitting laser made by incorporating plural light emitting elements into a single laser chip.

These semiconductor lasers such as LD arrays employed in the multi-beam method are widely used as light sources in laser printers, etc., as they are extremely small, and can directly perform modulation at high speed by using a driving current. However, the relationship between the driving current and light output of semiconductor lasers changes with temperature, making it difficult to fix the light intensity of semiconductor lasers at a desired level. Particularly, in vertical cavity surface emitting lasers, light emitting elements are spaced apart by short intervals on a single chip; therefore, the temperature rapidly changes due to light emission and light quenching, and temperature crosstalk occurs significantly, causing variations in light quantity.

For example, in an optical scanner disclosed in Patent Document 1, plural light sources are disposed two-dimensionally, and plural light flux segments from the light sources are deflected by a deflecting unit to scan a medium. Intervals between light emitting points are minimized without causing heat crosstalk between the light emitting points.

Patent Document 2 discloses a method of controlling pixels of electrostatic latent images in an image forming apparatus that employs a vertical cavity surface emitting laser, by changing light emission intensity of each chip by pixel units, and controlling the light emitting time length.

Patent Document 3 discloses a method of avoiding heat crosstalk and increasing the density of recorded images in an image forming apparatus employing a vertical cavity surface emitting laser, by prescribing the arrangement of light sources.

However, in the conventional methods employed in optical scanners including plural light sources such as an LD array or vertical cavity surface emitting lasers, each light source is generally used for creating one pixel. Therefore, unevenness in light emitting levels between the light sources directly causes unevenness in image density. Particularly, in the conventional methods, there are no means for correcting uneven pixels in a sub scanning direction. Furthermore, when one light source becomes degraded, the light emitting level thereof decreases. The decrease in the light emitting level directly causes a decrease in image density. Moreover, in the conventional methods, there are no effective means for precisely correcting scanning lines bent due to irregularities in optical systems or mechanical components.

Patent Document 1: Japanese Laid-Open Patent Application No. 2001-272615

Patent Document 2: Japanese Laid-Open Patent Application No. 2003-72135

Patent Document 3: Japanese Laid-Open Patent Application No. 2001-350111

SUMMARY OF THE INVENTION

The present invention provides an optical scanner and an image forming apparatus in which one or more of the above-described disadvantages is eliminated.

A preferred embodiment of the present invention provides an optical scanner that can precisely scan a scan object surface and an image forming apparatus that can produce high-quality images.

Further, a preferred embodiment of the present invention provides an optical scanner that can precisely correct scanning lines bent due to irregularities in optical systems or mechanical components.

An embodiment of the present invention provides an optical scanner, including a light source unit configured to emit light; and a control unit configured to control the light source unit; wherein the light emitted from the light source unit is scanned to expose a scan object surface and form an image on the scan object surface, and the light source unit includes plural light sources arranged at a density equal to N (N being an integer of two or more) times higher than a density of pixels on the scan object surface.

An embodiment of the present invention provides an optical scanner, including a light source unit configured to emit light; and a control unit configured to control the light source unit; wherein the light emitted from the light source unit is scanned to expose a scan object surface and form an image on the scan object surface, the light source unit includes plural light sources arranged at a density equal to N (N being an integer of two or more) times higher than a density of pixels on the scan object surface, and the control unit controls the light source unit such that one pixel is formed by at least two of the light sources.

An embodiment of the present invention provides an optical scanner including n (n≧2) light sources arranged at different positions in at least a sub scanning direction, wherein m (n≧m≧2) light sources among the n light sources are used for emitting light to form one pixel.

According to one embodiment of the present invention, an optical scanner that can precisely scan a scan object surface and an image forming apparatus that can produce high-quality images are provided.

Further, according to one embodiment of the present invention, an optical scanner is provided in which scanning lines bent due to irregularities in optical systems or mechanical components are precisely corrected.

BRIEF DESCRIPTION OF THE DRAWINGS

Other objects, features and advantages of the present invention will become more apparent from the following detailed description when read in conjunction with the accompanying drawings, in which:

FIGS. 4A-4C are diagrams for describing a semiconductor laser shown in FIG. 3;

FIGS. 10A-10I illustrate sub scanning direction positional shift amounts;

FIGS. 11A, 11B provide tables for describing sub scanning direction positional shift amounts and light emitting patterns to be selected accordingly;

FIG. 13 provides a table showing light emitting patterns used for correcting sub scanning direction positional shifts by adjusting light emitting powers of two light emitting units;

FIGS. 14A-14I provide graphs for describing the light emitting patterns shown in FIG. 13;

FIGS. 17A-17H provide graphs for describing the light emitting patterns shown in FIG. 16 (part 1);

FIGS. 18A-18G provide graphs for describing the light emitting patterns shown in FIG. 16 (part 2);

FIGS. 21A, 21B provide tables for describing sub scanning direction positional shift amounts and light emitting patterns to be selected accordingly;

FIG. 22 provides a table showing light emitting patterns used for correcting sub scanning direction positional shifts by adjusting light emitting powers of three light emitting units;

FIG. 35 is another diagram for describing the control operation performed by the light source driving control unit;

DETAILED DESCRIPTION OF THE PREFERRED EMBODIMENTS

A description is given, with reference to the accompanying drawings, of embodiments of the present invention.

Figure 1:
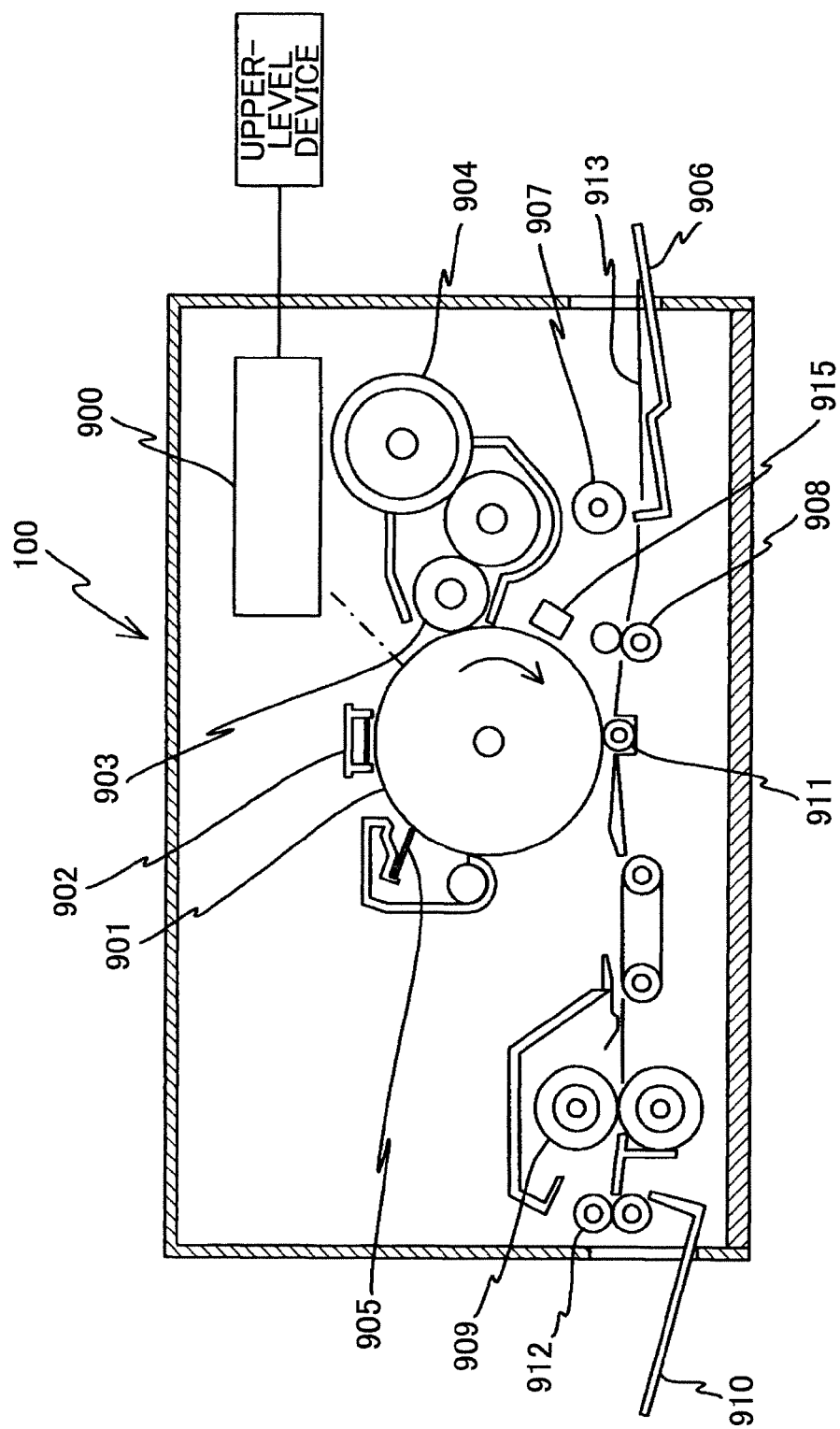
FIG. 1 is a schematic diagram of a laser printer according to an embodiment of the present invention.

An embodiment of the present invention is described with reference to FIGS. 1-11B. FIG. 1 is a schematic diagram of a laser printer 100 serving as an image forming apparatus according to an embodiment of the present invention.

The laser printer 100 shown in FIG. 1 includes an optical scanner 900, a photoconductive drum 901 that is an object of scanning, an electrostatic charger 902, a developing roller 903, a toner cartridge 904, a cleaning blade 905, a paper feeding tray 906, a paper feeding roller 907, a pair of registration rollers 908, a transfer charger 911, a pair of fixing rollers 909, a pair of paper discharge rollers 912, a paper discharge tray 910, and a positional shift sensor 915.

The electrostatic charger 902, the developing roller 903, the transfer charger 911, and the cleaning blade 905 are disposed near the surface of the photoconductive drum 901. They are disposed in the following order in a rotational direction of the photoconductive drum 901: the electrostatic charger 902→the developing roller 903→the transfer charger 911→the cleaning blade 905.

The surface of the photoconductive drum 901 is covered by a photoconductive layer. The photoconductive drum 901 is rotated in a clockwise direction (direction indicated by arrow) as viewed in FIG. 1.

The electrostatic charger 902 uniformly charges the surface of the photoconductive drum 901.

The optical scanner 900 emits a light beam onto the surface of the photoconductive drum 901 (scan object surface), which is charged by the electrostatic charger 902. The light beam is modulated based on image information from an upper-level device (for example, a personal computer). Accordingly, electric charges disappear from the parts where the photoconductive drum 901 is illuminated by the light beam, so that a latent image corresponding to the image information is formed on the surface of the photoconductive drum 901. The formed latent image moves toward the developing roller 903 as the photoconductive drum 901 rotates. The longitudinal direction (direction along rotational axis) of the photoconductive drum 901 is referred to as a "main scanning direction", and the direction of rotation of the photoconductive drum 901 is referred to as a "sub scanning direction". The length of a pixel in the main scanning direction in the latent image formed on the surface of the photoconductive drum 901 is also referred to as "pixel width", as a matter of convenience. The configuration of the optical scanner 900 will be described later.

Toner is stored in the toner cartridge 904, and the toner is supplied to the developing roller 903. The amount of toner stored in the toner cartridge 904 is checked when power of the laser printer 100 is turned on and when printing is completed. When the amount of toner remaining is small, a not shown display unit displays a message to prompt the user to replace the toner cartridge 904 with a new one.

As the developing roller 903 rotates, the surface of the developing roller 903 becomes uniformly covered with a thin layer of charged toner supplied from the toner cartridge 904. Voltage is applied to the developing roller 903 so that electric fields formed in charged parts (parts not illuminated by light) and non-charged parts (parts illuminated by light) are in opposite directions to each other. The voltage causes toner adhering to the surface of the developing roller 903 to adhere only to the parts illuminated by light on the surface of the photoconductive drum 901. In other words, the developing roller 903 makes the toner adhere to the latent image formed on the surface of the photoconductive drum 901, so as to visualize the image information. The latent image with toner adhering thereto moves toward the transfer charger 911, as the photoconductive drum 901 rotates.

Recording sheets 913, onto which the image is to be transferred, are stored in the paper feeding tray 906. The paper feeding roller 907 is disposed near the paper feeding tray 906. The paper feeding roller 907 retrieves one recording sheet 913 at a time from the paper feeding tray 906, and conveys the recording sheet 913 to the pair of registration rollers 908. The pair of registration rollers 908 is disposed near the transfer charger 911, and temporarily holds the recording sheet 913. In association with rotation of the photoconductive drum 901, the pair of registration rollers 908 sends out the recording sheet 913 in between the photoconductive drum 901 and the transfer charger 911.

In order to electrically attract toner from the surface of the photoconductive drum 901 to the recording sheet 913, the transfer charger 911 has applied to it a voltage of a polarity opposite to that of the toner. This voltage causes the latent image on the surface of the photoconductive drum 901 to be transferred onto the recording sheet 913. The recording sheet 913 onto which the image is transferred is then conveyed to the fixing rollers 909.

The fixing rollers 909 apply heat and pressure to the recording sheet 913, thereby fixing the toner onto the recording sheet 913. The recording sheet 913 onto which the toner is fixed is then conveyed to the paper discharge tray 910 via the paper discharge rollers 912. The recording sheets 913 are sequentially stacked onto the paper discharge tray 910.

The cleaning blade 905 removes toner (residual toner) remaining on the surface of the photoconductive drum 901. The removed residual toner is recycled. The surface of the photoconductive drum 901 from which the residual toner is removed returns to its original position, opposite the electrostatic charger 902.

The positional shift sensor 915 is disposed near the photoconductive drum 901, detects the position of an image formed on the photoconductive drum 901, and outputs signals including positional shift information.

A description is given of the configuration of the optical scanner 900.

Figure 2:
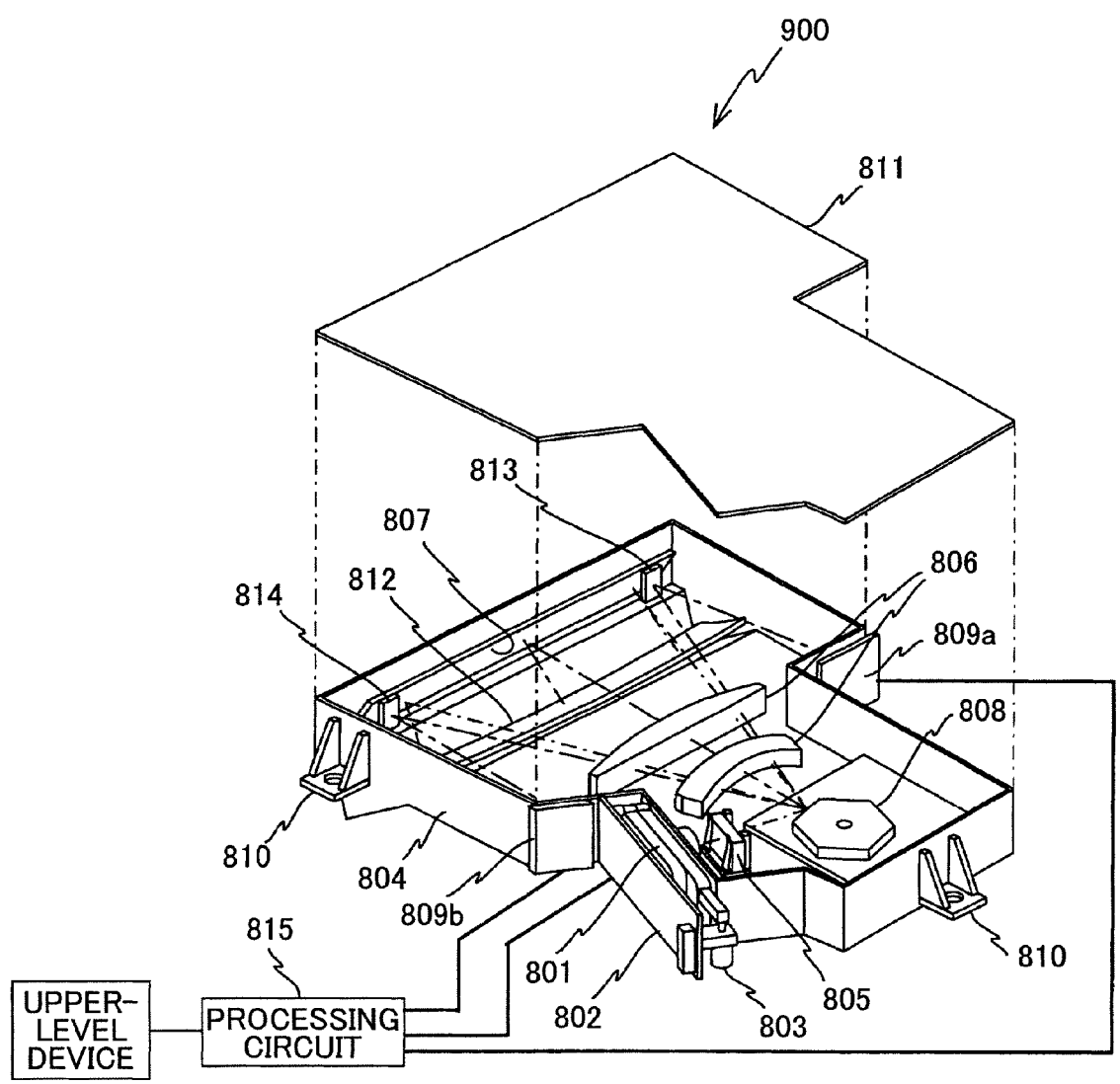
FIG. 2 is a perspective view (part 1) of an optical scanner shown in FIG. 1.

As shown in FIG. 2, the optical scanner 900 includes a light source 801, a collimate lens CL, a cylinder lens 805, a polygon mirror 808, a not shown polygon motor that rotates the polygon mirror 808, an fθ lens 806, a turn-back mirror 807, a toroidal lens 812, two reflection mirrors (813, 814), a print substrate 802, two PD substrates (809a, 809b), and a processing circuit 815.

Figure 3:
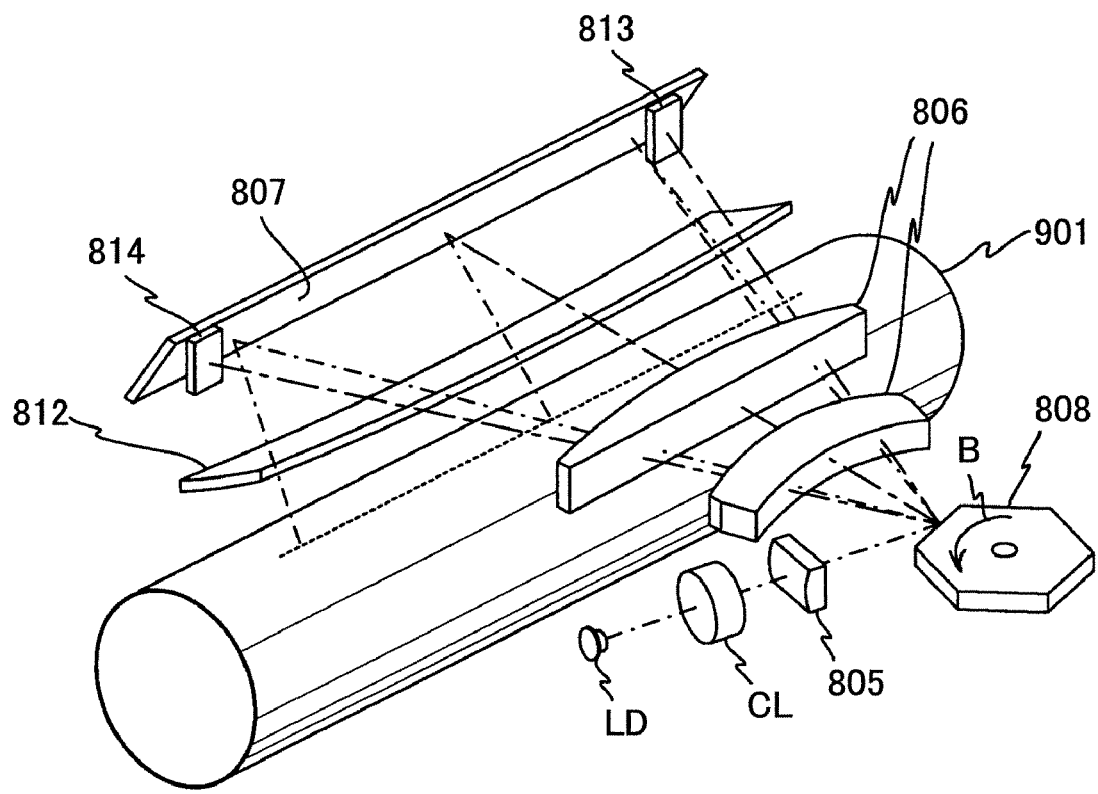
FIG. 3 is a perspective view (part 2) of the optical scanner shown in FIG. 1.

As shown in FIG. 3, the light source 801 includes a semiconductor laser LD that emits a laser beam, modulated according to image information, toward the polygon mirror 808. As shown in an example of FIG. 4A, the semiconductor laser LD includes 12 light emitting units having substantially the same light emitting properties. The light emitting units are formed on the same substrate. The semiconductor laser LD is a so-called vertical cavity surface emitting laser. Therefore, power consumption can be reduced.

The 12 light emitting units are arranged two-dimensionally along a direction (hereinafter also referred to as "α direction" as a matter of convenience; see FIG. 4B) tilted by an angle θ (0 degrees <θ<90 degrees) with respect to the main scanning direction (hereinafter also referred to as "dir_main direction" as a matter of convenience), and along a direction (hereinafter also referred to as "β direction" as a matter of convenience; see FIG. 4C) tilted by the above-mentioned angle θ with respect to the sub scanning direction (hereinafter also referred to as "dir_sub direction" as a matter of convenience).

In this example, there are three rows of light emitting units arranged in the α direction (corresponding to row A to row C from top to bottom as viewed in FIG. 4A), and four rows of light emitting units arranged in the β direction (corresponding to row 1 to row 4 from left to right as viewed in FIG. 4A). For example, the light emitting unit positioned in row A and row 2 is referred to as light emitting unit A2, and the light emitting unit positioned in row C and row 4 is referred to as light emitting unit C4. In the α direction, the direction from left to right as viewed in FIG. 4A is referred to as the + direction, and in the β direction, the direction from top to bottom as viewed in FIG. 4A is referred to as the + direction. The 12 light emitting units are equally spaced apart in both the α direction and the β direction.

Figure 5A:
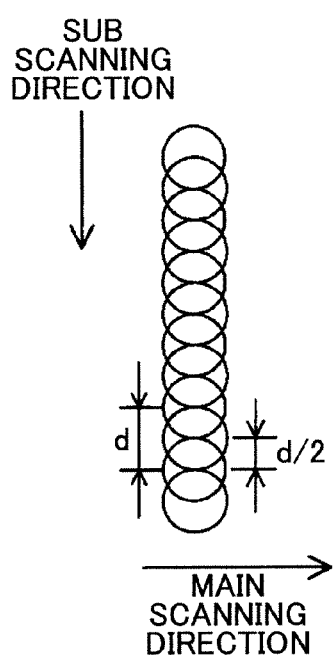
FIGS. 5A, 5B illustrate a relationship between pixel density and light source density when two light emitting units are used to form one pixel.
Figure 5B:
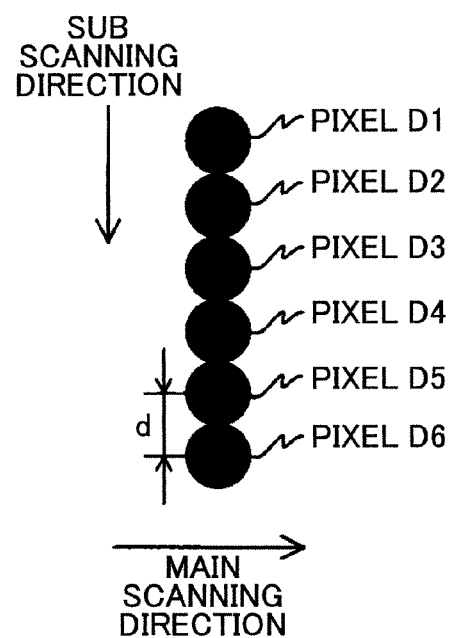

As illustrated in FIGS. 5A and 5B, plural light spots are formed on the photoconductive drum 901 by light beams emitted from the light emitting units. The light spots are arranged so that intervals therebetween in the sub scanning direction are ½ of an interval d, where the interval d is an interval between plural pixels in the sub scanning direction included in an image. That is, the density of light emitting units in the dir_sub direction corresponds to twice the density of pixels in the sub scanning direction. Therefore, when the pixel density of plural pixels in the sub scanning direction included in an image is 600 dpi, the light emitting units form light spots corresponding to 1,200 dpi. It is assumed that the distance between light emitting units in the dir_sub direction is Δy12. The interval d refers to an interval when there are no positional shifts of pixels in the sub scanning direction.

In this example, the semiconductor laser LD is designed so that the light emitting unit A1 and the light emitting unit A2 form a pixel D1, the light emitting unit A3 and the light emitting unit A4 form a pixel D2, the light emitting unit B1 and the light emitting unit B2 form a pixel D3, the light emitting unit B3 and the light emitting unit B4 form a pixel D4, the light emitting unit C1 and the light emitting unit C2 form a pixel D5, and the light emitting unit C3 and the light emitting unit C4 form a pixel D6. Accordingly, the optical scanner 900 can simultaneously scan six lines.

Positions of latent images formed on the surface of the photoconductive drum 901 are sometimes shifted due to scanning irregularities caused by properties of the fθ lens 806, plane tilting of deflecting reflection surfaces of the polygon mirror 808, unequal distances between the deflecting reflection surfaces and the rotational axis, irregular rotations of the polygon mirror 808, and/or variations in wavelengths of the laser beam emitted from the semiconductor laser LD. A positional shift in the main scanning direction is also referred to as a "main scanning direction positional shift", and a positional shift in the sub scanning direction is also referred to as a "sub scanning direction positional shift" in this specification, as a matter of convenience.

Referring back to FIG. 2, the print substrate 802 is attached to the backside of the light source 801, which is pressed against the wall of an optical housing 804 by a spring. It is possible to adjust the position of the light source 801 with respect to the wall of the optical housing 804, with an adjusting screw 803. Accordingly, the direction of a light beam emitted from the light source 801 can be adjusted. The adjusting screw 803 is screwed to a projection formed on the wall of the optical housing 804. As shown in FIG. 3, the collimate lens CL, the cylinder lens 805, the polygon mirror 808, the polygon motor (not shown), the fθ lens 806, the turn-back mirror 807, the toroidal lens 812, and the two reflection mirrors (813, 814), are supported inside the optical housing 804 at predetermined positions. Similar to the light source 801, the PD substrates (809a, 809b) are attached to the outside of the optical housing 804. A cover 811 seals the top of the optical housing 804, and the optical housing 804 is fixed to a frame member of the laser printer 100 with screws at plural attaching parts 810, protruding from the wall of the optical housing 804.

A light beam from the light source 801 passes through the collimate lens CL and the cylinder lens 805, and focuses at or around a deflecting surface of the polygon mirror 808. The polygon mirror 808 is rotated at a constant speed by the polygon motor (not shown) in a direction indicated by an arrow B shown in FIG. 3. Light beams focused at or around the deflecting surface are deflected at equal angular speeds as the polygon mirror 808 rotates. A light beam deflected by the polygon mirror 808 passes through the fθ lens 806, onto the turn-back mirror 807. The light beam reflects from the turn-back mirror 807, passes through the toroidal lens 812, and scans the surface of the photoconductive drum 901 in the main scanning direction. A scanning operation from a scan starting position to a scan ending position in the main scanning direction is referred to one "unit scanning" in this specification, as a matter of convenience.

One of the two reflection mirrors (813, 814) is provided on each side of the turn-back mirror 807 in the main scanning direction. A light beam reflected by the reflection mirror 813 is received by a light receiving element (PD1) mounted on the PD substrate 809a, and a light beam reflected by the reflection mirror 814 is received by a light receiving element (PD2) mounted on the PD substrate 809b. The light receiving elements are disposed at equal distances from the image surface. In this example, the reflection mirrors (813, 814) are disposed such that a light beam deflected by the polygon mirror 808 enters the light receiving element PD1 before a unit scanning, and enters the light receiving element PD2 after the unit scanning. The light receiving elements output signals corresponding to the light quantity received (photoelectric conversion signal).

Figure 6:
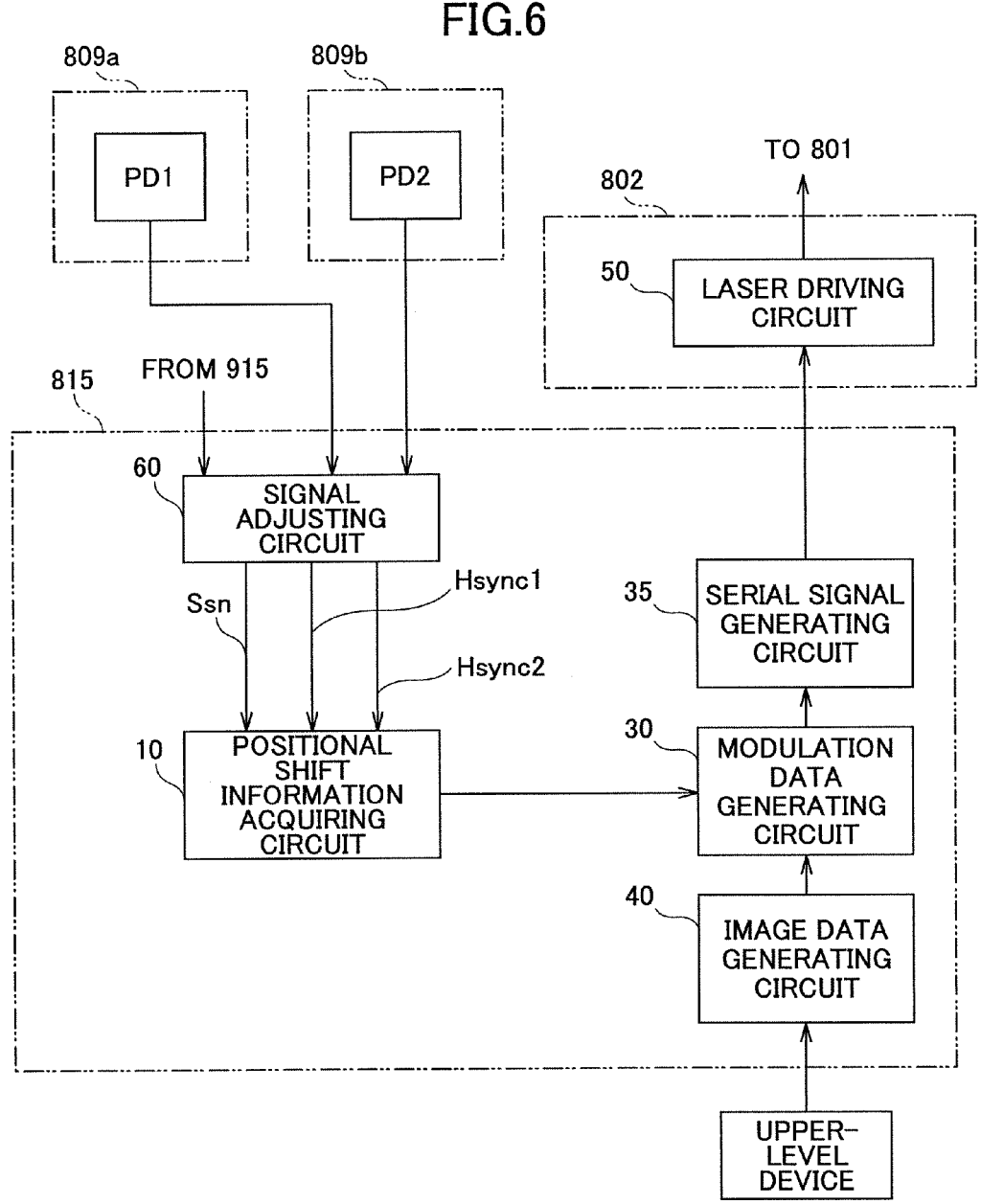
FIG. 6 is a block diagram of various circuits mounted on print substrates shown in FIG. 2.

As shown in FIG. 6, a laser driving circuit 50 is mounted on the print substrate 802. The laser driving circuit 50 generates driving signals for driving the light emitting units based on serial signals from the processing circuit 815, which will be described later. The generated driving signals are output to the light source 801. The light source 801 supplies the driving signals to the semiconductor laser LD.

As shown in FIG. 6, the processing circuit 815 includes a signal adjusting circuit 60, a positional shift information acquiring circuit 10, a modulation data generating circuit 30, a serial signal generating circuit 35, and an image data generating circuit 40.

The signal adjusting circuit 60 amplifies, inverts, and binarizes an output signal from the light receiving element PD1 to generate a signal Hsync1, and amplifies, inverts, and binarizes an output signal from the light receiving element PD2 to generate a signal Hsync2. When a light beam enters the light receiving element PD1, the signal Hsync1 changes from "H (high level)" to "L (low level)", and when a light beam enters the light receiving element PD2, the signal Hsync2 changes from "H" to "L". Further, the signal adjusting circuit 60 amplifies and binarizes an output signal from the positional shift sensor 915 to generate a signal Ssn.

The positional shift information acquiring circuit 10 acquires an amount and direction (+ side or − side) of a positional shift in the sub scanning direction based on the signal Ssn generated from a scanning operation performed for acquiring positional shift information. The amount and direction (+ side or − side) of a positional shift in the sub scanning direction are also collectively referred to as "sub scanning direction positional shift amount" in this specification as a matter of convenience.

When performing the actual scanning, the positional shift information acquiring circuit 10 generates correction information signals including correction information for correcting a pixel position in the sub scanning direction based on the acquired sub scanning direction positional shift amount. The correction information signals are output to the modulation data generating circuit 30.

The image data generating circuit 40 generates image data based on image information from the upper-level device.

The modulation data generating circuit 30 generates modulation data based on the correction information signals received from the positional shift information acquiring circuit 10 and the image data received from the image data generating circuit 40.

The serial signal generating circuit 35 converts the modulation data received from the modulation data generating circuit 30 into serial signals, and outputs the serial signals to the laser driving circuit 50. The serial signal generating circuit 35 can be, for example, a positional shift register.

<<Correction in the Sub Scanning Direction>>

Figure 7:
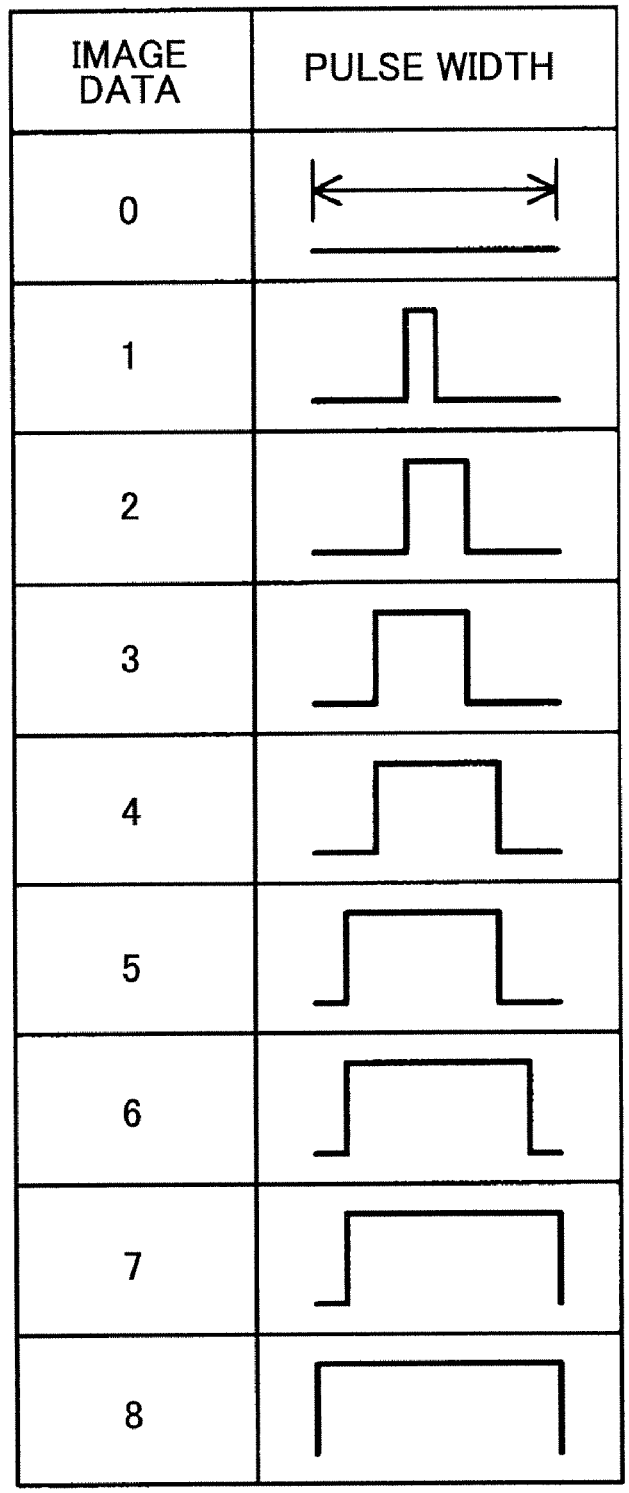
FIG. 7 provides a table showing relationships between image data and pulse widths.
Figure 8:
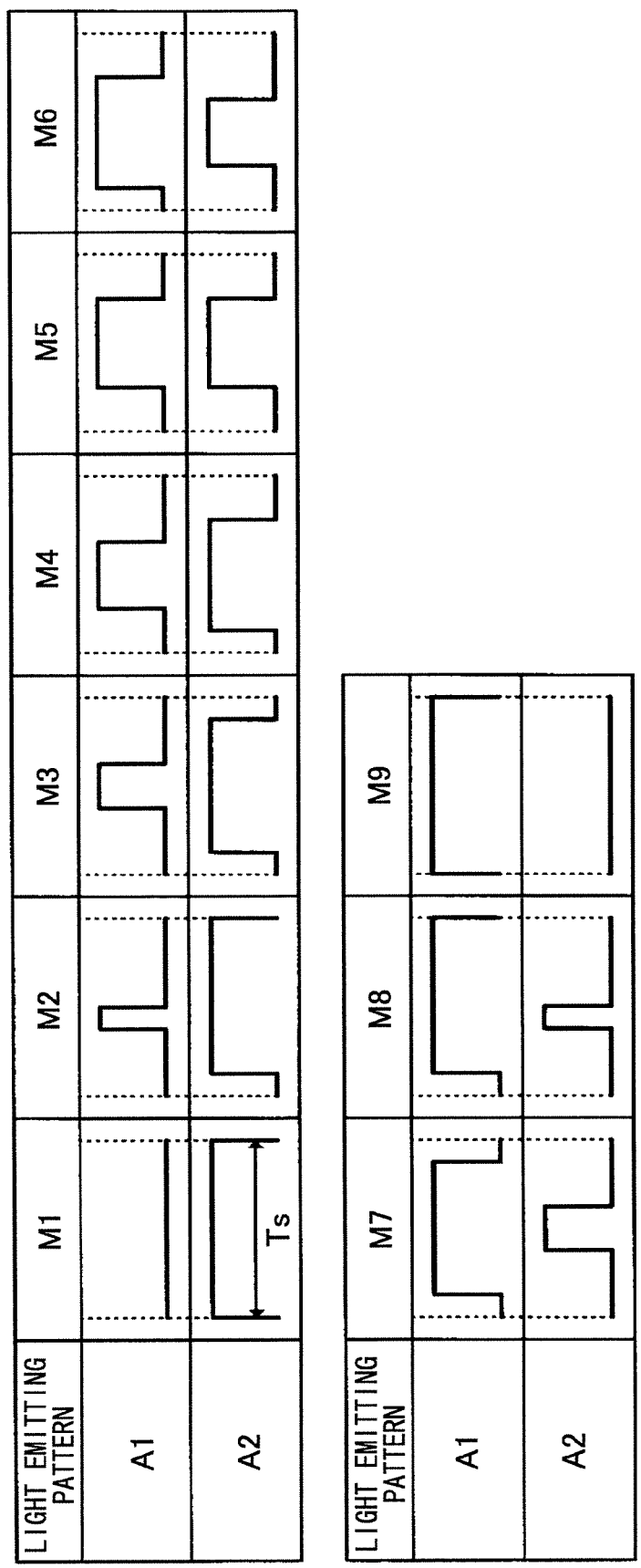
FIG. 8 provides a table showing light emitting patterns used for correcting sub scanning direction positional shifts by adjusting pulse widths of two light emitting units.
Figure 9A:
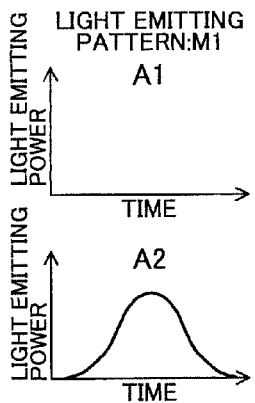
FIGS. 9A-9I provide graphs for describing the light emitting patterns shown in FIG. 8.
Figure 9B:
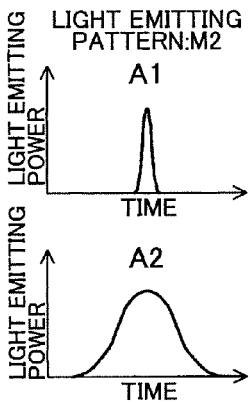
Figure 9C:
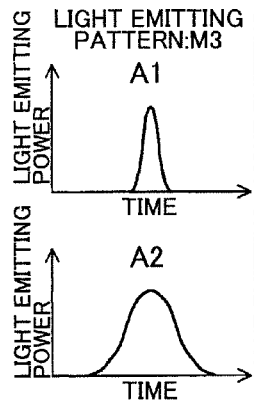
Figure 9D:
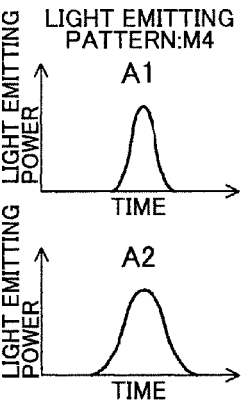
Figure 9E:
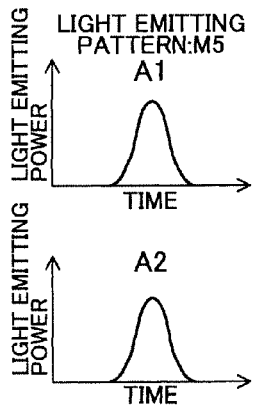
Figure 9F:
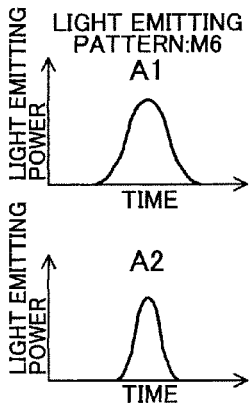
Figure 9G:
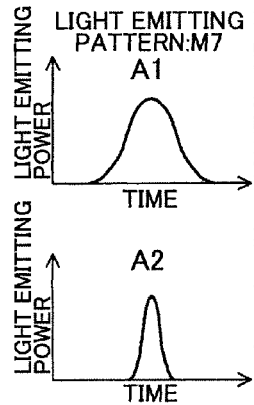
Figure 9H:
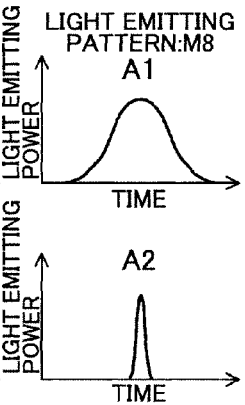
Figure 9I:
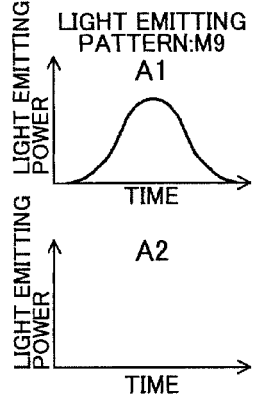

A description is given of the method of correcting a sub scanning direction positional shift performed by the modulation data generating circuit 30 based on the correction information signals. In one example of an embodiment of the present invention as illustrated in FIG. 7, the light emitting time length of each of the light emitting units can be controlled by a pulse width that is ⅛ of a time length Ts, where the time length Ts corresponds to one pixel. FIGS. 8-9I illustrate examples of nine types of light emitting patterns (M1 to M9). The modulation data generating circuit 30 selects a light emitting pattern from M1 to M9 based on the correction information signals. A description is given for a case of correcting the sub scanning direction positional shift of pixel D1. The light emitting timings of the light emitting unit A1 and the light emitting unit A2 are adjusted in consideration of intervals therebetween in the dir_main direction.

Light emitting pattern M1 is applied when the sub scanning direction positional shift amount is −(4d/16) with respect to a reference position S0 as shown in FIG. 10A. Specifically, the light emitting unit A2 emits light by a regular pulse width Ts and the light emitting unit A1 does not emit light. Accordingly, the pixel position on the photoconductive drum 901 is shifted by (4d/16) to the + side in the sub scanning position, thus matching the reference position S0.

Light emitting pattern M2 is applied when the sub scanning direction positional shift amount is −(3d/16) with respect to the reference position S0 as shown in FIG. 10B. Specifically, the light emitting unit A2 emits light by a pulse width of (⅞)Ts and the light emitting unit A1 emits light by a pulse width of (⅛)Ts. Accordingly, the pixel position on the photoconductive drum 901 is shifted by (3d/16) to the + side in the sub scanning position, thus matching the reference position S0.

Light emitting pattern M3 is applied when the sub scanning direction positional shift amount is −(2d/16) with respect to the reference position S0 as shown in FIG. 10C. Specifically, the light emitting unit A2 emits light by a pulse width of (6/8)Ts and the light emitting unit A1 emits light by a pulse width of (2/8)Ts. Accordingly, the pixel position on the photoconductive drum 901 is shifted by (2d/16) to the + side in the sub scanning position, thus matching the reference position S0.

Light emitting pattern M4 is applied when the sub scanning direction positional shift amount is −(d/16) with respect to the reference position S0 as shown in FIG. 10D. Specifically, the light emitting unit A2 emits light by a pulse width of (⅝)Ts and the light emitting unit A1 emits light by a pulse width of (⅜)Ts. Accordingly, the pixel position on the photoconductive drum 901 is shifted by (d/16) to the + side in the sub scanning position, thus matching the reference position S0.

Light emitting pattern M5 is applied when the sub scanning direction positional shift amount is 0 with respect to the reference position S0 as shown in FIG. 10E. Specifically, the light emitting unit A2 emits light by a pulse width of (4/8)Ts and the light emitting unit A1 emits light by a pulse width of (4/8)Ts. Accordingly, the pixel position on the photoconductive drum 901 is not shifted in the sub scanning position.

Light emitting pattern M6 is applied when the sub scanning direction positional shift amount is +(d/16) with respect to the reference position S0 as shown in FIG. 10F. Specifically, the light emitting unit A2 emits light by a pulse width of (⅜)Ts and the light emitting unit A1 emits light by a pulse width of (⅝)Ts. Accordingly, the pixel position on the photoconductive drum 901 is shifted by (d/16) to the − side in the sub scanning position, thus matching the reference position S0.

Light emitting pattern M7 is applied when the sub scanning direction positional shift amount is +(2d/16) with respect to the reference position S0 as shown in FIG. 10G. Specifically, the light emitting unit A2 emits light by a pulse width of (⅜)Ts and the light emitting unit A1 emits light by a pulse width of (⅝)Ts. Accordingly, the pixel position on the photoconductive drum 901 is shifted by (2d/16) to the − side in the sub scanning position, thus matching the reference position S0.

Light emitting pattern M8 is applied when the sub scanning direction positional shift amount is +(3d/16) with respect to the reference position S0 as shown in FIG. 10H. Specifically, the light emitting unit A2 emits light by a pulse width of (⅛)Ts and the light emitting unit A1 emits light by a pulse width of (⅞)Ts. Accordingly, the pixel position on the photoconductive drum 901 is shifted by (3d/16) to the − side in the sub scanning position, thus matching the reference position S0.

Light emitting pattern M9 is applied when the sub scanning direction positional shift amount is +(4d/16) with respect to the reference position S0 as shown in FIG. 10I. Specifically, the light emitting unit A1 emits light by a regular pulse width Ts and the light emitting unit A2 does not emit light. Accordingly, the pixel position on the photoconductive drum 901 is shifted by (4d/16) to the − side in the sub scanning position, thus matching the reference position S0.

For example, when sub scanning direction positional shift amounts as shown in FIG. 11A are detected in a scanning operation for acquiring positional shift information, light emitting patterns are selected as shown in FIG. 11B, so that each of the pixels is formed at a reference position in the sub scanning direction.

Whichever light emitting pattern is selected, the pixel position on the photoconductive drum 901 can be shifted (i.e., corrected) in the sub scanning direction while maintaining a fixed total time of the light emitting time length of the light emitting unit A1 and the light emitting time length of the light emitting unit A2.

As described above, the modulation data generating circuit 30 serves as a control device in the optical scanner 900 according to an embodiment of the present invention.

Further, a transfer device of the laser printer 100 according to an embodiment of the present invention includes the electrostatic charger 902, the developing roller 903, the toner cartridge 904, and the transfer charger 911.

In the optical scanner 900 according to an embodiment of the present invention, the modulation data generating circuit 30 controls the light source 801, so that two light emitting units among plural light emitting units form one pixel. Therefore, a pixel position can be finely adjusted in the sub scanning direction by a precision of (d/16).

Further, in the optical scanner 900 according to an embodiment of the present invention, plural light emitting units are formed on a single chip. Therefore, intervals between the light emitting units substantially conform to the design. Accordingly, positional shifts of pixels the sub scanning direction can be precisely corrected. Moreover, power consumption can be reduced compared to a configuration employing plural single light sources.

Further, in the optical scanner 900 according to an embodiment of the present invention, the light emitting units are equally spaced apart in the dir_sub direction. Therefore, the algorithm for correcting the sub scanning direction positional shifts can be simplified.

Further, in the optical scanner 900 according to an embodiment of the present invention, the modulation data generating circuit 30 controls pulse widths of driving signals of two light emitting units used for forming one pixel, in order to shift (correct) a position of an image to be formed on the photoconductive drum 901 in the sub scanning direction. Therefore, the algorithm for correcting the sub scanning direction positional shifts can be simplified.

Further, in an optical scanner 900 according to an embodiment of the present invention, the modulation data generating circuit 30 controls the total time of light emitting time lengths of two light emitting units used for forming one pixel, to match a predetermined value. Therefore, unevenness in density can be prevented.

The laser printer 100 according to an embodiment of the present invention is equipped with the optical scanner 900 capable of precisely scanning light onto the photoconductive drum 901. Accordingly, high-quality images can be formed.

In an embodiment of the present invention, when shifting (correcting) pixel positions in the sub scanning direction, the total time of light emitting time lengths of two light emitting units used for forming one pixel is controlled to match a predetermined value. The light emitting time lengths of the light emitting units are adjusted under such a condition. However, the present invention is not limited thereto. For example, the total exposing energy amount from the light source can be controlled to match a predetermined value, and the light emitting time lengths of the light emitting units can be adjusted under such a condition. Further, the total exposing time that the surface of the photoconductive drum 901 is exposed by the light source can be controlled to match a predetermined value, and the light emitting time lengths of the light emitting units can be adjusted under such a condition. Further, the total exposing area on the surface of the photoconductive drum 901 exposed by the light source can be controlled to match a predetermined value, and the light emitting time lengths of the light emitting units can be adjusted under such a condition. Further, the total area of a region corresponding to a developing threshold on the surface of the photoconductive drum 901 of the light source can be controlled to match a predetermined value, and the light emitting time lengths of the light emitting units can be adjusted under such a condition.

Figure 12:
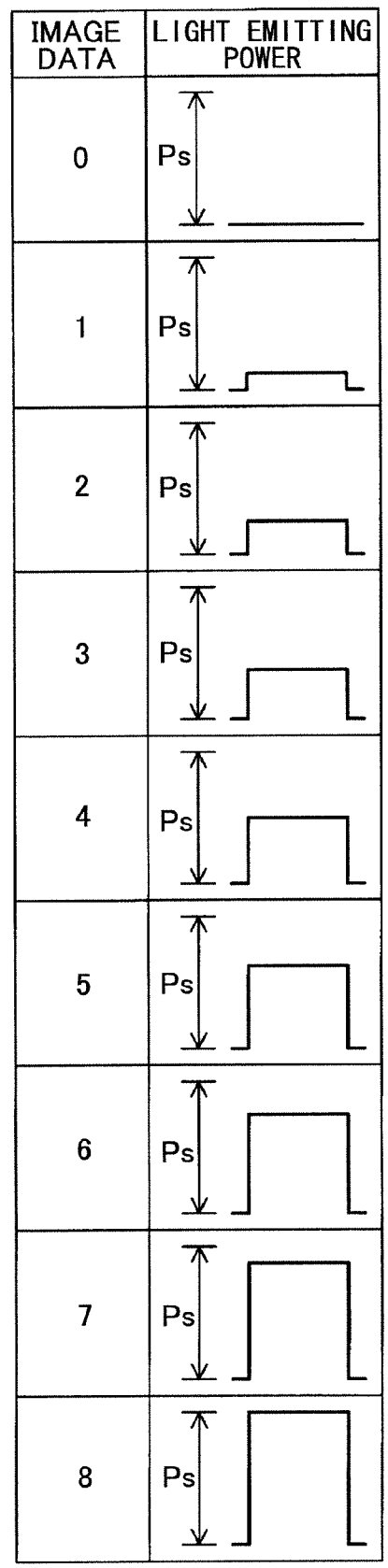
FIG. 12 provides a table showing relationships between image data and light emitting power.

In the above-described embodiment of the present invention, the light emitting time lengths of two light emitting units forming one pixel are adjusted in order to shift (correct) pixel positions in the sub scanning direction. However, the present invention is not limited thereto. The light emitting power of two light emitting units used for forming one pixel can be adjusted. For example, as shown in FIG. 12, the light emitting power of each of the light emitting units can be controlled by a power that is ⅛ of a light emitting power Ps, where the light emitting power Ps corresponds to one pixel. FIGS. 13-14I illustrate examples of light emitting patterns for such a case. A middle position between the light emitting unit A1 and the light emitting unit A2 in the dir_sub direction is A12.

In light emitting pattern M1, the light emitting unit A2 emits light by a regular light emitting power Ps, and the light emitting unit A1 does not emit light. The centroid of the light beam is denoted by a reference numeral G1 in FIG. 14A, which is at the position of +(4/8)×Δy12 with respect to A12 in the dir_sub direction. Accordingly, the pixel position on the photoconductive drum 901 is shifted by (4d/16) to the + side in the sub scanning position.

In light emitting pattern M2, the light emitting unit A2 emits light by a light emitting power of (⅞)Ps, and the light emitting unit A1 emits light by a light emitting power of (⅛)Ps. The centroid of the light beam is denoted by a reference numeral G2 in FIG. 14B, which is at the position of +(⅜)×Δy12 with respect to A12 in the dir_sub direction. Accordingly, the pixel position on the photoconductive drum 901 is shifted by (3d/16) to the + side in the sub scanning position.

In light emitting pattern M3, the light emitting unit A2 emits light by a light emitting power of (⅝)Ps, and the light emitting unit A1 emits light by a light emitting power of (⅜)Ps. The centroid of the light beam is denoted by a reference numeral G3 in FIG. 14C, which is at the position of +(²⁄₈)×Δy12 with respect to A12 in the dir_sub direction. Accordingly, the pixel position on the photoconductive drum 901 is shifted by (2d/16) to the + side in the sub scanning position.

In light emitting pattern M4, the light emitting unit A2 emits light by a light emitting power of (⅝)Ps, and the light emitting unit A1 emits light by a light emitting power of (⅜)Ps. The centroid of the light beam is denoted by a reference numeral G4 in FIG. 14D, which is at the position of +(⅛)×Δy12 with respect to A12 in the dir_sub direction. Accordingly, the pixel position on the photoconductive drum 901 is shifted by (d/16) to the + side in the sub scanning position.

In light emitting pattern M5, the light emitting unit A2 emits light by a light emitting power of (⁴⁄₈)Ps, and the light emitting unit A1 emits light by a light emitting power of (⁴⁄₈)Ps. The centroid of the light beam is denoted by a reference numeral G5 in FIG. 14E, which substantially matches A12. Accordingly, the pixel position on the photoconductive drum 901 is not shifted.

In light emitting pattern M6, the light emitting unit A2 emits light by a light emitting power of (⅜)Ps, and the light emitting unit A1 emits light by a light emitting power of (⅝)Ps. The centroid of the light beam is denoted by a reference numeral G6 in FIG. 14F, which is at the position of −(⅛)×Δy12 with respect to A12 in the dir_sub direction. Accordingly, the pixel position on the photoconductive drum 901 is shifted by (d/16) to the − side in the sub scanning position.

In light emitting pattern M7, the light emitting unit A2 emits light by a light emitting power of (²⁄₈)Ps, and the light emitting unit A1 emits light by a light emitting power of (⁶⁄₈)Ps. The centroid of the light beam is denoted by a reference numeral G7 in FIG. 14G, which is at the position of −(²⁄₈)×Δy12 with respect to A12 in the dir_sub direction. Accordingly, the pixel position on the photoconductive drum 901 is shifted by (2d/16) to the − side in the sub scanning position.

In light emitting pattern M8, the light emitting unit A2 emits light by a light emitting power of (⅛)Ps, and the light emitting unit A1 emits light by a light emitting power of (⅞)Ps. The centroid of the light beam is denoted by a reference numeral G8 in FIG. 14H, which is at the position of −(⅜)×Δy12 with respect to A12 in the dir_sub direction. Accordingly, the pixel position on the photoconductive drum 901 is shifted by (3d/16) to the − side in the sub scanning position.

In light emitting pattern M9, the light emitting unit A1 emits light by a regular light emitting power Ps, and the light emitting unit A2 does not emit light. The centroid of the light beam is denoted by a reference numeral G9 in FIG. 14I, which is at the position of −(⁴⁄₈)×Δy12 with respect to A12 in the dir_sub direction. Accordingly, the pixel position on the photoconductive drum 901 is shifted by (4d/16) to the − side in the sub scanning position.

The same effects as the previously described embodiment can be achieved.

Figure 15A:
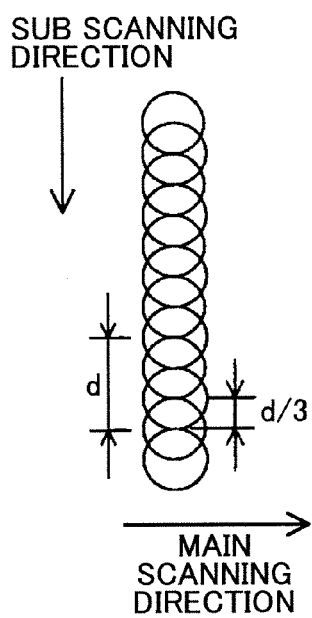
FIGS. 15A, 15B illustrate a relationship between pixel density and light source density when three light emitting units are used to form one pixel.
Figure 15B:
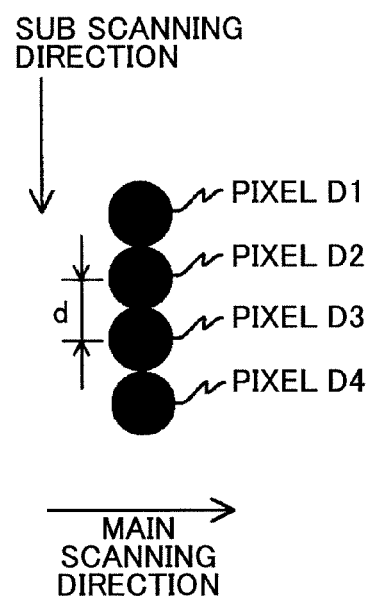
Figure 16:
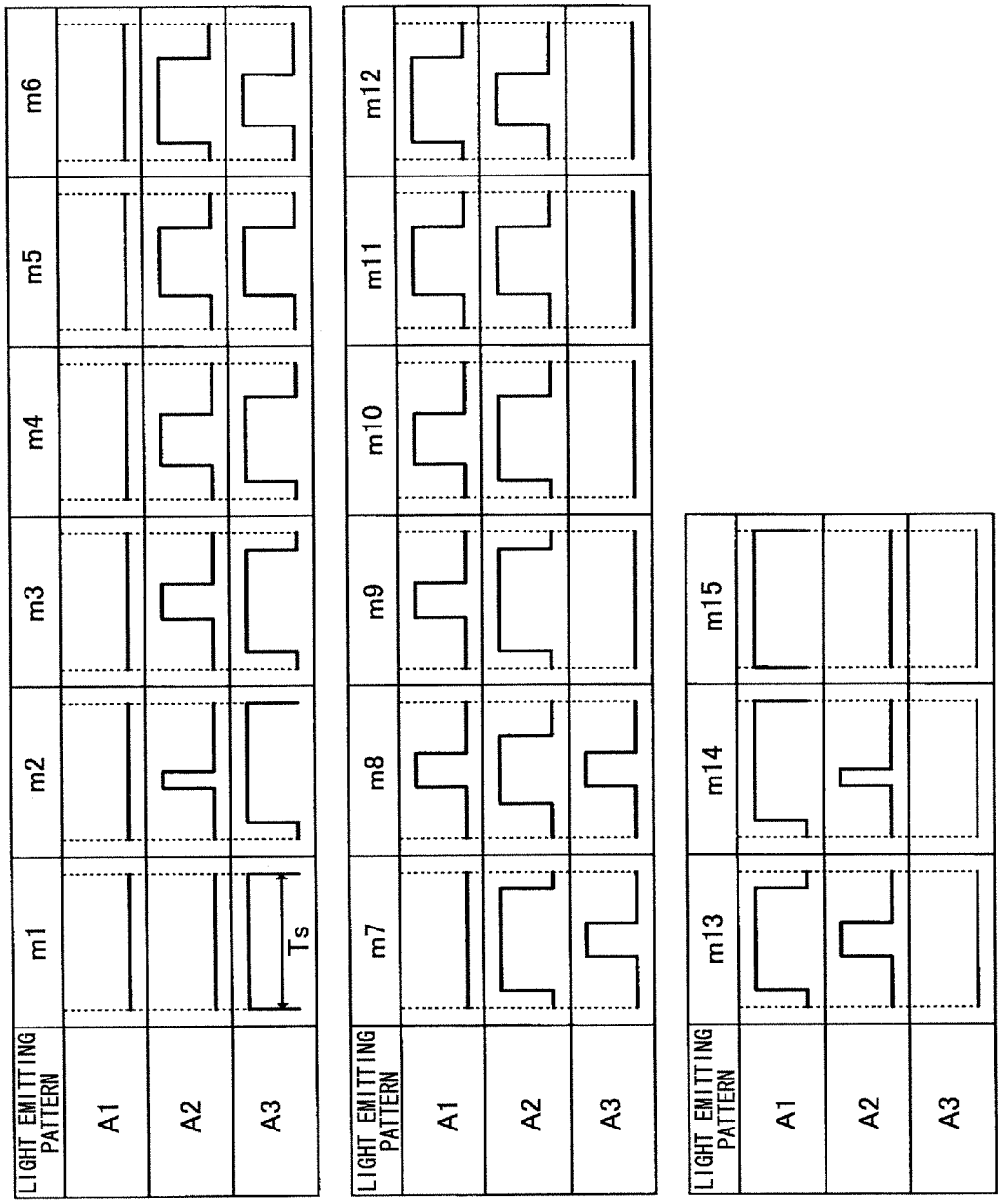
FIG. 16 provides a table showing light emitting patterns used for correcting sub scanning direction positional shifts by adjusting pulse widths of three light emitting units.

In the above embodiments, two light emitting units form one pixel. However, the present invention is not limited thereto. For example, as shown in FIGS. 15A and 15B, three light emitting units can be used to form one pixel. The light emitting unit A1, the light emitting unit A2, and the light emitting unit A3 form a pixel D1; the light emitting unit A4, the light emitting unit B1, and the light emitting unit B2 form a pixel D2; the light emitting unit B3, the light emitting unit B4, and the light emitting unit C1 form a pixel D3; and the light emitting unit C2, the light emitting unit C3, and the light emitting unit C4 form a pixel D4. Accordingly, the optical scanner 900 can simultaneously scan four lines.

In this example, plural light spots formed on the photoconductive drum 901 by light beams emitted from the light emitting units are arranged so that intervals therebetween in the sub scanning direction are ⅓ of an interval d, where the interval d is an interval between plural pixels in the sub scanning direction included in an image. That is, the density of light emitting units in the dir_sub direction corresponds to three times the density of pixels in the sub scanning direction. Therefore, when the pixel density of plural pixels in the sub scanning direction included in an image is 600 dpi, the light emitting units form light spots corresponding to 1,800 dpi.

Correction of the sub scanning direction positional shifts is described with reference to FIGS. 16-24G. A description is given for a case of correcting the sub scanning direction positional shift of pixel D1. The light emitting timings of the light emitting unit A1, the light emitting unit A2, and the light emitting unit A3 are adjusted in consideration of intervals therebetween in the dir_main direction.

First, an example of controlling the light emitting time length of the light emitting units is described. The modulation data generating circuit 30 selects a light emitting pattern from among 15 types of light emitting patterns (m1 to m15) shown in FIGS. 16-18G, based on correction information signals.

Figure 19A:
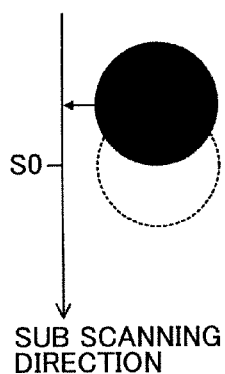
FIGS. 19A-19L illustrate sub scanning direction positional shift amounts (part 1)

Light emitting pattern m1 is applied when the sub scanning direction positional shift amount is −(8d/32) with respect to a reference position S0 as shown in FIG. 19A. Specifically, the light emitting unit A3 emits light by a regular pulse width Ts, and neither the light emitting unit A1 nor the light emitting unit A2 emits light. Accordingly, the pixel position on the photoconductive drum 901 is shifted by (8d/32) to the + side in the sub scanning position, thus matching the reference position S0.

Figure 19B:
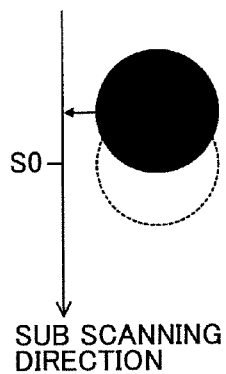

Light emitting pattern m2 is applied when the sub scanning direction positional shift amount is −(7d/32) with respect to a reference position S0 as shown in FIG. 19B. Specifically, the light emitting unit A3 emits light by a pulse width of (⅞)Ts, the light emitting unit A2 emits light by a pulse width of (⅛)Ts, and the light emitting unit A1 does not emit light. Accordingly, the pixel position on the photoconductive drum 901 is shifted by (7d/32) to the + side in the sub scanning position, thus matching the reference position S0.

Figure 19C:
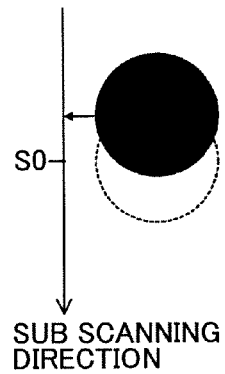

Light emitting pattern m3 is applied when the sub scanning direction positional shift amount is −(6d/32) with respect to a reference position S0 as shown in FIG. 19C. Specifically, the light emitting unit A3 emits light by a pulse width of (⁶⁄₈)Ts, the light emitting unit A2 emits light by a pulse width of (²⁄₈)Ts, and the light emitting unit A1 does not emit light. Accordingly, the pixel position on the photoconductive drum 901 is shifted by (6d/32) to the + side in the sub scanning position, thus matching the reference position S0.

Figure 19D:
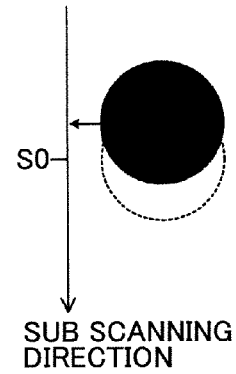

Light emitting pattern m4 is applied when the sub scanning direction positional shift amount is −(5d/32) with respect to a reference position S0 as shown in FIG. 19D. Specifically, the light emitting unit A3 emits light by a pulse width of (5/8)Ts, the light emitting unit A2 emits light by a pulse width of (3/8)Ts, and the light emitting unit A1 does not emit light. Accordingly, the pixel position on the photoconductive drum 901 is shifted by (5d/32) to the + side in the sub scanning position, thus matching the reference position S0.

Figure 19E:
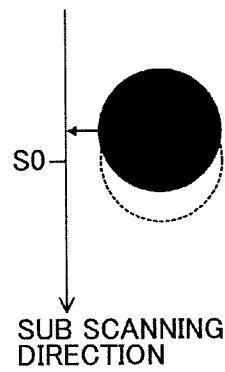

Light emitting pattern m5 is applied when the sub scanning direction positional shift amount is −(4d/32) with respect to a reference position S0 as shown in FIG. 19E. Specifically, the light emitting unit A3 emits light by a pulse width of (4/8)Ts, the light emitting unit A2 emits light by a pulse width of (4/8)Ts, and the light emitting unit A1 does not emit light. Accordingly, the pixel position on the photoconductive drum 901 is shifted by (4d/32) to the + side in the sub scanning position, thus matching the reference position S0.

Figure 19F:
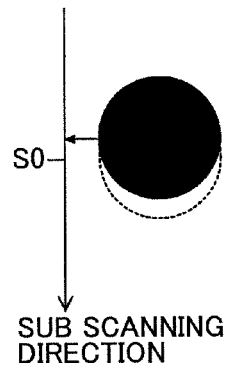

Light emitting pattern m6 is applied when the sub scanning direction positional shift amount is −(3d/32) with respect to a reference position S0 as shown in FIG. 19F. Specifically, the light emitting unit A3 emits light by a pulse width of (3/8)Ts, the light emitting unit A2 emits light by a pulse width of (5/8)Ts, and the light emitting unit A1 does not emit light. Accordingly, the pixel position on the photoconductive drum 901 is shifted by (3d/32) to the + side in the sub scanning position, thus matching the reference position S0.

Figure 19G:
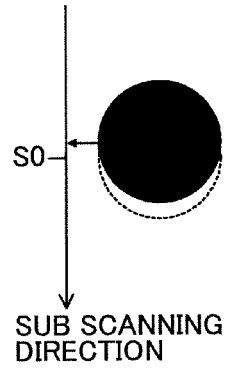

Light emitting pattern m7 is applied when the sub scanning direction positional shift amount is −(2d/32) with respect to a reference position S0 as shown in FIG. 19G. Specifically, the light emitting unit A3 emits light by a pulse width of (2/8)Ts, the light emitting unit A2 emits light by a pulse width of (6/8)Ts, and the light emitting unit A1 does not emit light. Accordingly, the pixel position on the photoconductive drum 901 is shifted by (2d/32) to the + side in the sub scanning position, thus matching the reference position S0.

Figure 19H:
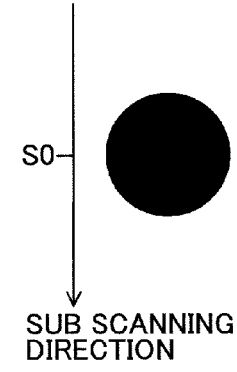

Light emitting pattern m8 is applied when the sub scanning direction positional shift amount is 0 with respect to a reference position S0 as shown in FIG. 19H. Specifically, the light emitting unit A3 emits light by a pulse width of (2/8)Ts, the light emitting unit A2 emits light by a pulse width of (4/8)Ts, and the light emitting unit A1 emits light by a pulse width of (2/8)Ts. Accordingly, the pixel position on the photoconductive drum 901 is not shifted in the sub scanning position. In this case, it is possible to only make the light emitting unit A2 emit light by a pulse width Ts, without making the light emitting unit A1 or the light emitting unit A3 emit light.

Figure 19I:
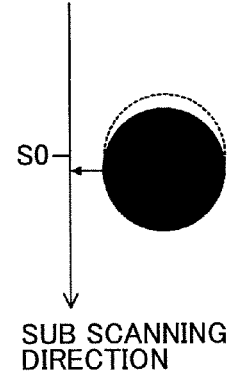

Light emitting pattern m9 is applied when the sub scanning direction positional shift amount is +(2d/32) with respect to a reference position S0 as shown in FIG. 19I. Specifically, the light emitting unit A1 emits light by a pulse width of (2/8)Ts, the light emitting unit A2 emits light by a pulse width of (6/8)Ts, and the light emitting unit A3 does not emit light. Accordingly, the pixel position on the photoconductive drum 901 is shifted by (2d/32) to the − side in the sub scanning position, thus matching the reference position S0.

Figure 19J:
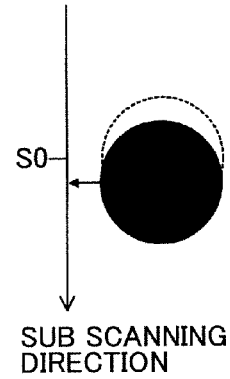

Light emitting pattern m10 is applied when the sub scanning direction positional shift amount is +(3d/32) with respect to a reference position S0 as shown in FIG. 19J. Specifically, the light emitting unit A1 emits light by a pulse width of (3/8)Ts, the light emitting unit A2 emits light by a pulse width of (5/8)Ts, and the light emitting unit A3 does not emit light. Accordingly, the pixel position on the photoconductive drum 901 is shifted by (3d/32) to the − side in the sub scanning position, thus matching the reference position S0.

Figure 19K:
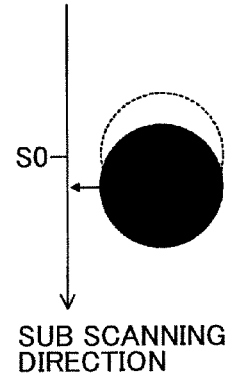

Light emitting pattern m11 is applied when the sub scanning direction positional shift amount is +(4d/32) with respect to a reference position S0 as shown in FIG. 19K. Specifically, the light emitting unit A1 emits light by a pulse width of (4/8)Ts, the light emitting unit A2 emits light by a pulse width of (4/8)Ts, and the light emitting unit A3 does not emit light. Accordingly, the pixel position on the photoconductive drum 901 is shifted by (4d/32) to the − side in the sub scanning position, thus matching the reference position S0.

Figure 19L:
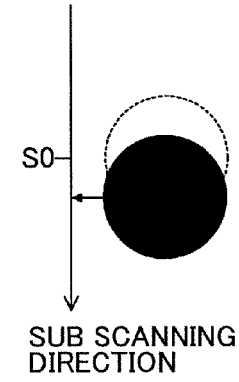

Light emitting pattern m12 is applied when the sub scanning direction positional shift amount is +(5d/32) with respect to a reference position S0 as shown in FIG. 19L. Specifically, the light emitting unit A1 emits light by a pulse width of (5/8)Ts, the light emitting unit A2 emits light by a pulse width of (3/8)Ts, and the light emitting unit A3 does not emit light. Accordingly, the pixel position on the photoconductive drum 901 is shifted by (5d/32) to the − side in the sub scanning position, thus matching the reference position S0.

Figure 20A:
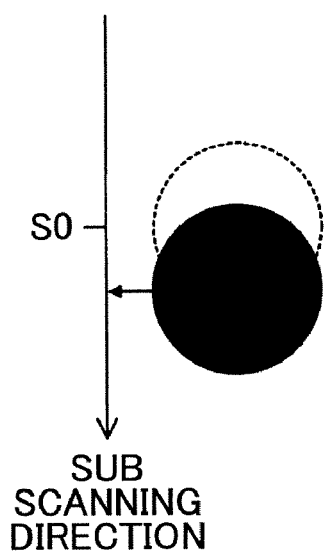
FIGS. 20A-20C illustrate sub scanning direction positional shift amounts (part 2)

Light emitting pattern m13 is applied when the sub scanning direction positional shift amount is +(6d/32) with respect to a reference position S0 as shown in FIG. 20A. Specifically, the light emitting unit A1 emits light by a pulse width of (6/8)Ts, the light emitting unit A2 emits light by a pulse width of (2/8)Ts, and the light emitting unit A3 does not emit light. Accordingly, the pixel position on the photoconductive drum 901 is shifted by (6d/32) to the − side in the sub scanning position, thus matching the reference position S0.

Figure 20B:
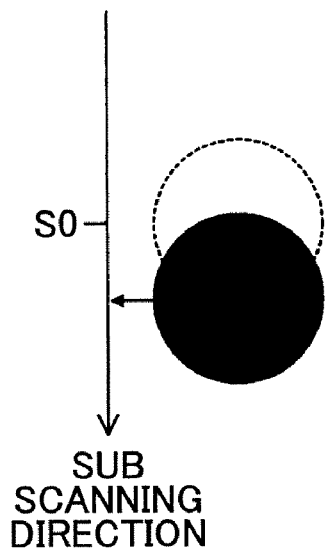

Light emitting pattern m14 is applied when the sub scanning direction positional shift amount is +(7d/32) with respect to a reference position S0 as shown in FIG. 20B. Specifically, the light emitting unit A1 emits light by a pulse width of (7/8)Ts, the light emitting unit A2 emits light by a pulse width of (1/8)Ts, and the light emitting unit A3 does not emit light. Accordingly, the pixel position on the photoconductive drum 901 is shifted by (7d/32) to the − side in the sub scanning position, thus matching the reference position S0.

Figure 20C:
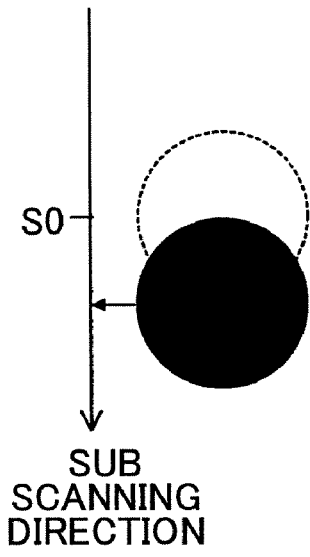
Figure 23A:
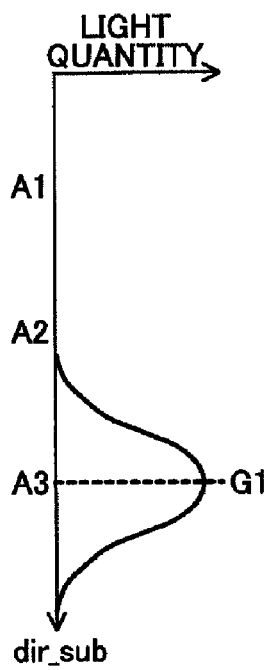
FIGS. 23A-23H provide graphs for describing the light emitting patterns shown in FIG. 22 (part 1)
Figure 23B:
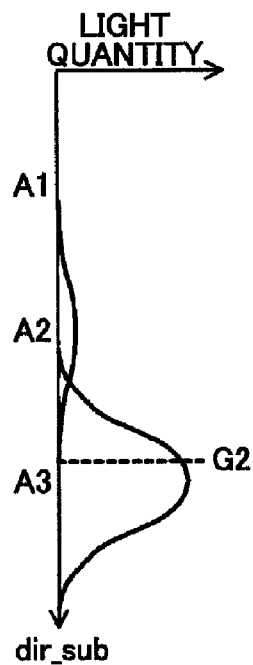
Figure 23C:
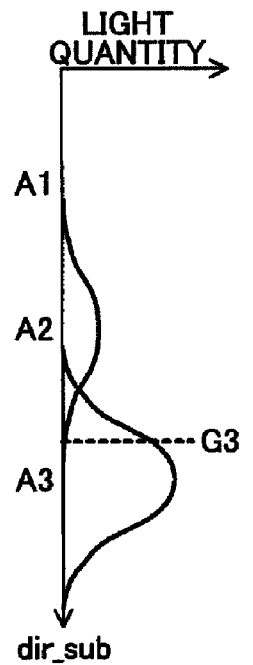
Figure 23D:
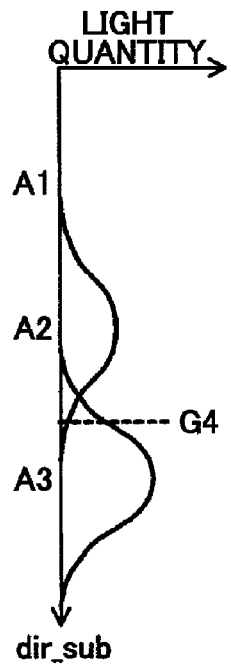
Figure 23E:
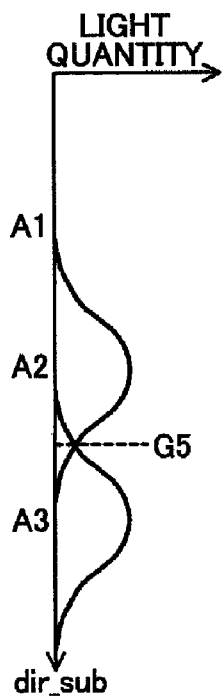
Figure 23F:
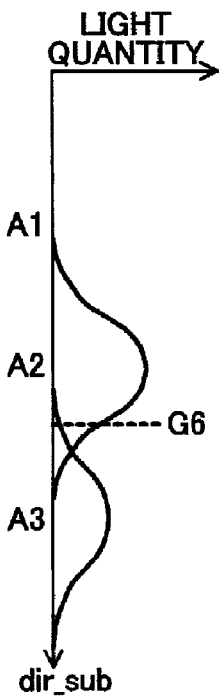
Figure 23G:
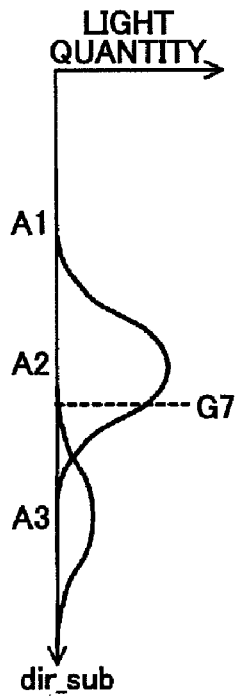
Figure 23H:
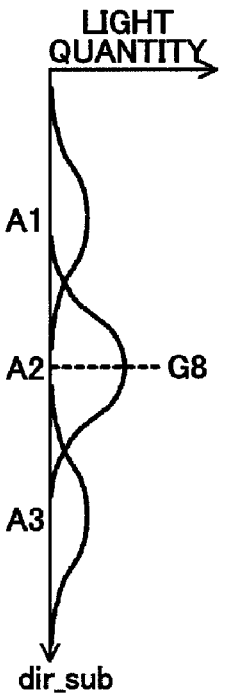
Figure 24A:
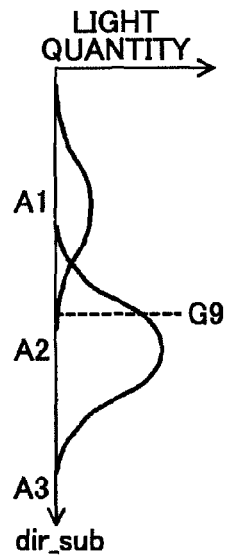
FIGS. 24A-24G provide graphs for describing the light emitting patterns shown in FIG. 22 (part 2)
Figure 24B:
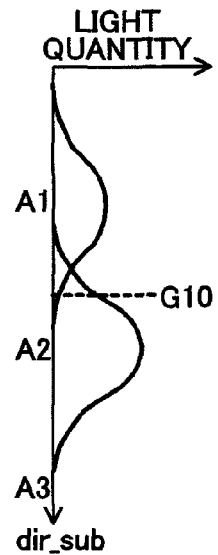
Figure 24C:
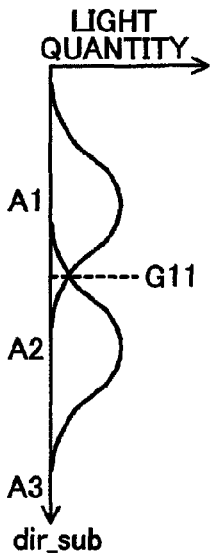
Figure 24D:
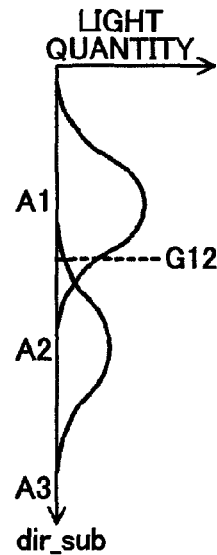
Figure 24E:
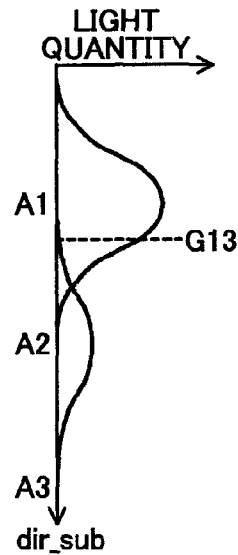
Figure 24F:
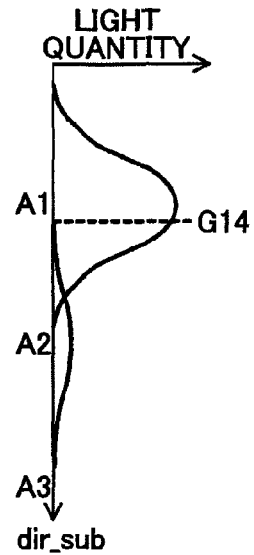
Figure 24G:
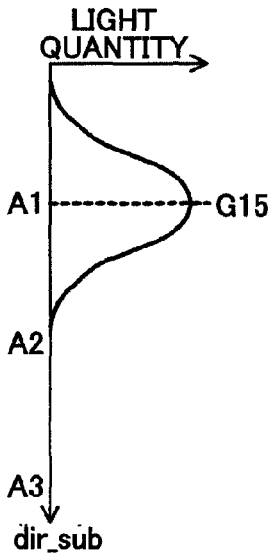

Light emitting pattern m15 is applied when the sub scanning direction positional shift amount is +(8d/32) with respect to a reference position S0 as shown in FIG. 20C. Specifically, the light emitting unit A1 emits light by a regular pulse width Ts, and neither the light emitting unit A2 nor the light emitting unit A3 emits light. Accordingly, the pixel position on the photoconductive drum 901 is shifted by (8d/32) to the − side in the sub scanning position, thus matching the reference position S0.

Accordingly, a pixel position can be finely adjusted in the sub scanning direction by a precision of (d/32).

When sub scanning direction positional shift amounts as shown in FIG. 21A are detected in a scanning operation for acquiring positional shift information, light emitting patterns are selected as shown in FIG. 21B, so that each of the pixels is formed at a reference position in the sub scanning direction.

Next, an example of controlling the light emitting power of the light emitting units is described. Light emitting patterns for this case are described with reference to FIGS. 22-24G. The distance between light emitting units in the dir_sub direction is Δy12.

In light emitting pattern m1, the light emitting unit A3 emits light by a regular light emitting power Ps, and neither the light emitting unit A2 nor the light emitting unit A3 emits light. The centroid of the light beam is denoted by a reference numeral G1 in FIG. 23A, which is at the position of +Δy12 with respect to A2 in the dir_sub direction. Accordingly, the pixel position on the photoconductive drum 901 is shifted by (8d/32) to the + side in the sub scanning position.

In light emitting pattern m2, the light emitting unit A3 emits light by a light emitting power of (7/8)Ps, the light emitting unit A2 emits light by a light emitting power of (1/8)Ps, and the light emitting unit A1 does not emit light. The centroid of the light beam is denoted by a reference numeral G2 in FIG. 23B, which is at the position of +(7/8)×Δy12 with respect to A2 in the dir_sub direction. Accordingly, the pixel position on the photoconductive drum 901 is shifted by (7d/32) to the + side in the sub scanning position.

In light emitting pattern m3, the light emitting unit A3 emits light by a light emitting power of (6/8)Ps, the light emitting unit A2 emits light by a light emitting power of (2/8)Ps, and the light emitting unit A1 does not emit light. The centroid of the light beam is denoted by a reference numeral G3 in FIG. 23C, which is at the position of +(6/8)×Δy12 with respect to A2 in the dir_sub direction. Accordingly, the pixel position on the photoconductive drum 901 is shifted by (6d/32) to the + side in the sub scanning position.

In light emitting pattern m4, the light emitting unit A3 emits light by a light emitting power of (5/8)Ps, the light emitting unit A2 emits light by a light emitting power of (3/8)Ps, and the light emitting unit A1 does not emit light. The centroid of the light beam is denoted by a reference numeral G4 in FIG. 23D, which is at the position of +(5/8)×Δy12 with respect to A2 in the dir_sub direction. Accordingly, the pixel position on the photoconductive drum 901 is shifted by (5d/32) to the + side in the sub scanning position.

In light emitting pattern m5, the light emitting unit A3 emits light by a light emitting power of (4/8)Ps, the light emitting unit A2 emits light by a light emitting power of (4/8)Ps, and the light emitting unit A1 does not emit light. The centroid of the light beam is denoted by a reference numeral G5 in FIG. 23E, which is at the position of +(4/8)×Δy12 with respect to A2 in the dir_sub direction. Accordingly, the pixel position on the photoconductive drum 901 is shifted by (4d/32) to the + side in the sub scanning position.

In light emitting pattern m6, the light emitting unit A3 emits light by a light emitting power of (3/8)Ps, the light emitting unit A2 emits light by a light emitting power of (5/8)Ps, and the light emitting unit A1 does not emit light. The centroid of the light beam is denoted by a reference numeral G6 in FIG. 23F, which is at the position of +(3/8)×Δy12 with respect to A2 in the dir_sub direction. Accordingly, the pixel position on the photoconductive drum 901 is shifted by (3d/32) to the + side in the sub scanning position.

In light emitting pattern m7, the light emitting unit A3 emits light by a light emitting power of (2/8)Ps, the light emitting unit A2 emits light by a light emitting power of (6/8)Ps, and the light emitting unit A1 does not emit light. The centroid of the light beam is denoted by a reference numeral G7 in FIG. 23G, which is at the position of +(2/8)×Δy12 with respect to A2 in the dir_sub direction. Accordingly, the pixel position on the photoconductive drum 901 is shifted by (2d/32) to the + side in the sub scanning position.

In light emitting pattern m8, the light emitting unit A3 emits light by a light emitting power of (2/8)Ps, the light emitting unit A2 emits light by a light emitting power of (4/8)Ps, and the light emitting unit A1 emits light by a light emitting power of (2/8)Ps. The centroid of the light beam is denoted by a reference numeral G8 in FIG. 23H, which matches the position of A2. Accordingly, the pixel position on the photoconductive drum 901 is not shifted in the sub scanning position. In this case, it is possible to only make the light emitting unit A2 emit light by a light emitting power of Ps, without making the light emitting unit A1 or the light emitting unit A3 emit light.

In light emitting pattern m9, the light emitting unit A1 emits light by a light emitting power of (2/8)Ps, the light emitting unit A2 emits light by a light emitting power of (6/8)Ps, and the light emitting unit A3 does not emit light. The centroid of the light beam is denoted by a reference numeral G9 in FIG. 24A, which is at the position of −(2/8)×Δy12 with respect to A2 in the dir_sub direction. Accordingly, the pixel position on the photoconductive drum 901 is shifted by (2d/32) to the − side in the sub scanning position.

In light emitting pattern m10, the light emitting unit A1 emits light by a light emitting power of (3/8)Ps, the light emitting unit A2 emits light by a light emitting power of (5/8)Ps, and the light emitting unit A3 does not emit light. The centroid of the light beam is denoted by a reference numeral G10 in FIG. 24B, which is at the position of −(3/8)×Δy12 with respect to A2 in the dir_sub direction. Accordingly, the pixel position on the photoconductive drum 901 is shifted by (3d/32) to the − side in the sub scanning position.

In light emitting pattern m11, the light emitting unit A1 emits light by a light emitting power of (4/8)Ps, the light emitting unit A2 emits light by a light emitting power of (4/8)Ps, and the light emitting unit A3 does not emit light. The centroid of the light beam is denoted by a reference numeral G11 in FIG. 24C, which is at the position of −(4/8)×Δy12 with respect to A2 in the dir_sub direction. Accordingly, the pixel position on the photoconductive drum 901 is shifted by (4d/32) to the − side in the sub scanning position.

In light emitting pattern m12, the light emitting unit A1 emits light by a light emitting power of (5/8)Ps, the light emitting unit A2 emits light by a light emitting power of (3/8)Ps, and the light emitting unit A3 does not emit light. The centroid of the light beam is denoted by a reference numeral G12 in FIG. 24D, which is at the position of −(5/8)×Δy12 with respect to A2 in the dir_sub direction. Accordingly, the pixel position on the photoconductive drum 901 is shifted by (5d/32) to the − side in the sub scanning position.

In light emitting pattern m13, the light emitting unit A1 emits light by a light emitting power of (6/8)Ps, the light emitting unit A2 emits light by a light emitting power of (2/8)Ps, and the light emitting unit A3 does not emit light. The centroid of the light beam is denoted by a reference numeral G13 in FIG. 24E, which is at the position of −(6/8)×Δy12 with respect to A2 in the dir_sub direction. Accordingly, the pixel position on the photoconductive drum 901 is shifted by (6d/32) to the − side in the sub scanning position.

In light emitting pattern m14, the light emitting unit A1 emits light by a light emitting power of (7/8)Ps, the light emitting unit A2 emits light by a light emitting power of (1/8)Ps, and the light emitting unit A3 does not emit light. The centroid of the light beam is denoted by a reference numeral G14 in FIG. 24F, which is at the position of −(7/8)×Δy12 with respect to A2 in the dir_sub direction. Accordingly, the pixel position on the photoconductive drum 901 is shifted by (7d/32) to the − side in the sub scanning position.

In light emitting pattern m15, only the light emitting unit A1 emits light by a light emitting power Ps, and neither the light emitting unit A2 nor the light emitting unit A3 emits light. The centroid of the light beam is denoted by a reference numeral G15 in FIG. 24G, which is at the position of −Δy12 with respect to A2 in the dir_sub direction. Accordingly, the pixel position on the photoconductive drum 901 is shifted by (8d/32) to the − side in the sub scanning position.

In the above-described embodiments, the light source 801 includes 12 light emitting units. However, the present invention is not limited thereto. For example, the light source 801 can include only two light emitting units such as the light emitting unit A1 and the light emitting unit A2. In this case, all light emitting units of the light source 801 are used for forming one pixel.

In the above-described embodiments, the light source 801 includes plural light emitting units arranged to have twice the density of pixels on the photoconductive drum 901. However, the present invention is not limited thereto; the light source 801 can include plural light emitting units arranged to have a density that is N (N being an integer of three or more) times higher than that of pixels on the photoconductive drum 901.

The processing circuit 815 in the above-described embodiments is one example; the circuit configuration is not limited thereto as long as similar processes can be performed.

At least part of the processing circuit 815 in the above-described embodiments can be mounted on the print substrate 802.

By providing an optical scanner according to an embodiment of the present invention configured to form color images in a color image forming apparatus, high-quality color images can be obtained.

The image forming apparatus according to an embodiment of the present invention can be a tandem type color image forming apparatus including photoconductive drums each provided for different sets of image information (different colors).

Figure 25:
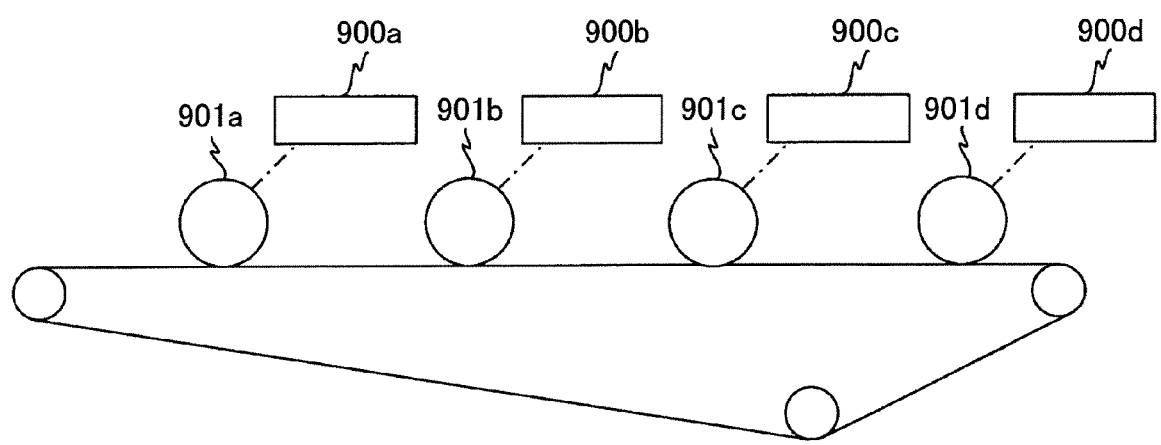
FIG. 25 is a schematic diagram of a tandem type color image forming apparatus.

An example of a tandem type color image forming apparatus is shown in FIG. 25. This image forming apparatus includes an optical scanner 900*a* that forms a latent image corresponding to Y image information on a photoconductive drum 901*a* used for Y image information, an optical scanner 900*b* that forms a latent image corresponding to M image information on a photoconductive drum 901*b* used for M image information, an optical scanner 900*c* that forms a latent image corresponding to C image information on a photoconductive drum 901*c* used for C image information, and an optical scanner 900*d* that forms a latent image corresponding to K image information on a photoconductive drum 901*d* used for K image information. Sub scanning direction positional shifts are corrected similarly to the above embodiments, so that high-quality images can be formed.

In an embodiment of the present invention, the laser printer 100 serves as the image forming apparatus; however, the present invention is not limited thereto. For example, the image forming apparatus can be a digital copier, a scanner, a facsimile machine, or a multifunction machine including the optical scanner 900. As long as the image forming apparatus includes an optical scanner in accordance with an embodiment of the present invention, high-quality images can be formed.

In the following description, one pixel simply means one pixel (for example, a pixel of 1200 dpi is a pixel of approximately 21 μm square). One pixel does not mean a pixel obtained by combining plural pixels such as a dither matrix (e.g., 4×4 pixels).

Figure 26:
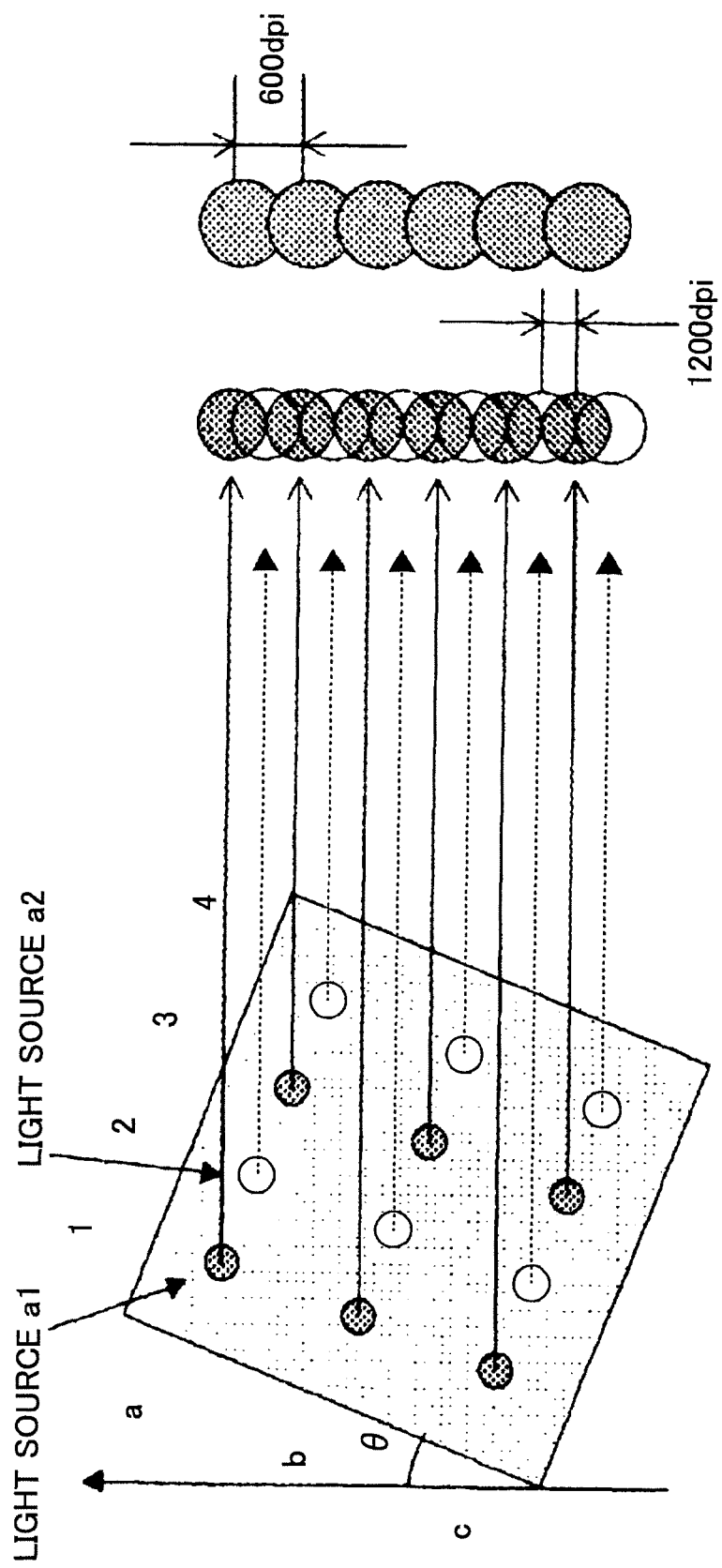
FIG. 26 is an example of a light source unit according to a first embodiment of the present invention.

Furthermore, when n light sources are "arranged at different positions in at least a sub scanning direction", it does not necessarily mean that the light sources are simply arranged in one row along the sub scanning direction. The light sources can be arranged as shown in FIG. 26 (light source arrangement tilted at an angle θ with respect to the sub scanning direction).

First Embodiment

A first embodiment according to the present invention concerns a pixel forming apparatus. The pixel forming apparatus according to the first embodiment includes n light sources (n≧2) that are arranged at different positions in at least the sub scanning direction. Among the n light sources, m light sources (n≧m≧2) are used for forming one pixel.

A detailed description is given of the pixel forming apparatus according to the first embodiment.

Figure 54:
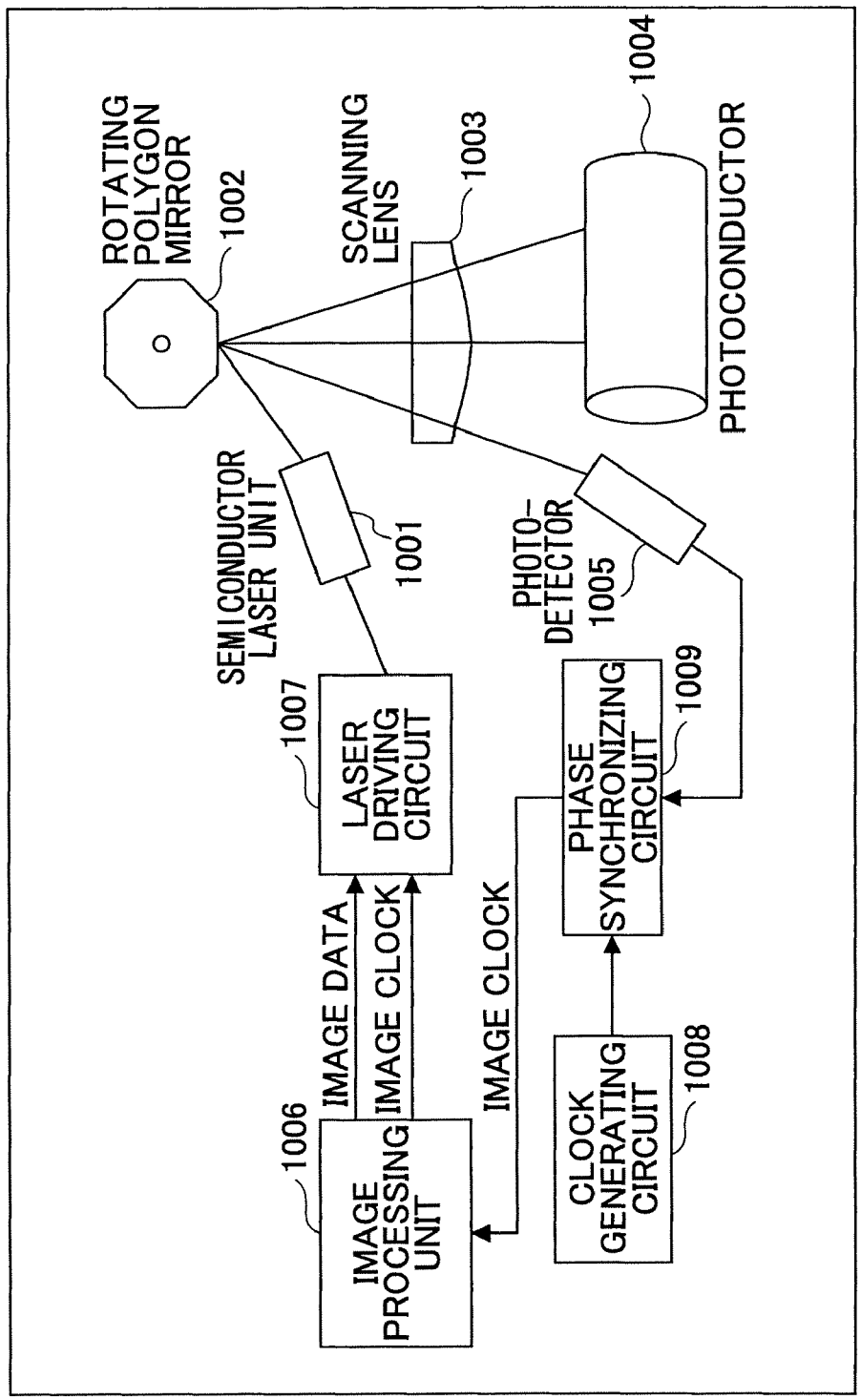
FIG. 54 is a configuration of a typical image forming apparatus.

The semiconductor laser unit 1001 (hereinafter referred to as light source unit 1001) in the typical image forming apparatus (writing optical system) shown in FIG. 54 has a configuration as shown in FIG. 26. Namely, the light source unit 1001 can be a semiconductor laser array with plural light sources arranged in a lattice (plural semiconductor lasers), or a vertical cavity surface emitting laser with plural light sources arranged in a lattice on the same chip (VCSEL, vertical cavity surface emitting semiconductor laser). The position and the tilt angle of the light source unit 1001 are adjusted so that the direction of arrangement of the plural light sources is titled at an angle θ with respect to the rotational axis of a deflecting unit such as the polygon mirror 1002 shown in FIG. 54.

In FIG. 26, the vertical direction of light sources is denoted by a to c, and the horizontal direction of light sources is denoted by 1 to 4. For example, the top left light source is denoted by a1.

In this example, the light source unit 1001 is tilted at an angle θ, and therefore, the light source a1 and the light source a2 expose different scanning positions, and these two light sources are used to form one pixel. Specifically, in FIG. 26, two light sources are used for realizing one pixel. Thus, the light sources a1, a2 form one pixel, light sources a3, a4 form one pixel, and so forth. As a result, pixels are formed as shown on the right side as viewed in FIG. 26. Assuming that the vertical direction is the sub scanning direction, distances between centers of pixels, each being formed by two light sources, correspond to a density of 600 dpi. Distances between centers of two light sources that form one pixel together correspond to a density of 1,200 dpi, i.e., the density of the light sources corresponds to twice the density of pixels. Accordingly, by changing the ratio of light quantity between the light sources that form one pixel together, the centroid of the pixel can be shifted in the sub scanning direction, so that pixels can be formed highly precisely.

Second Embodiment

Figure 27:
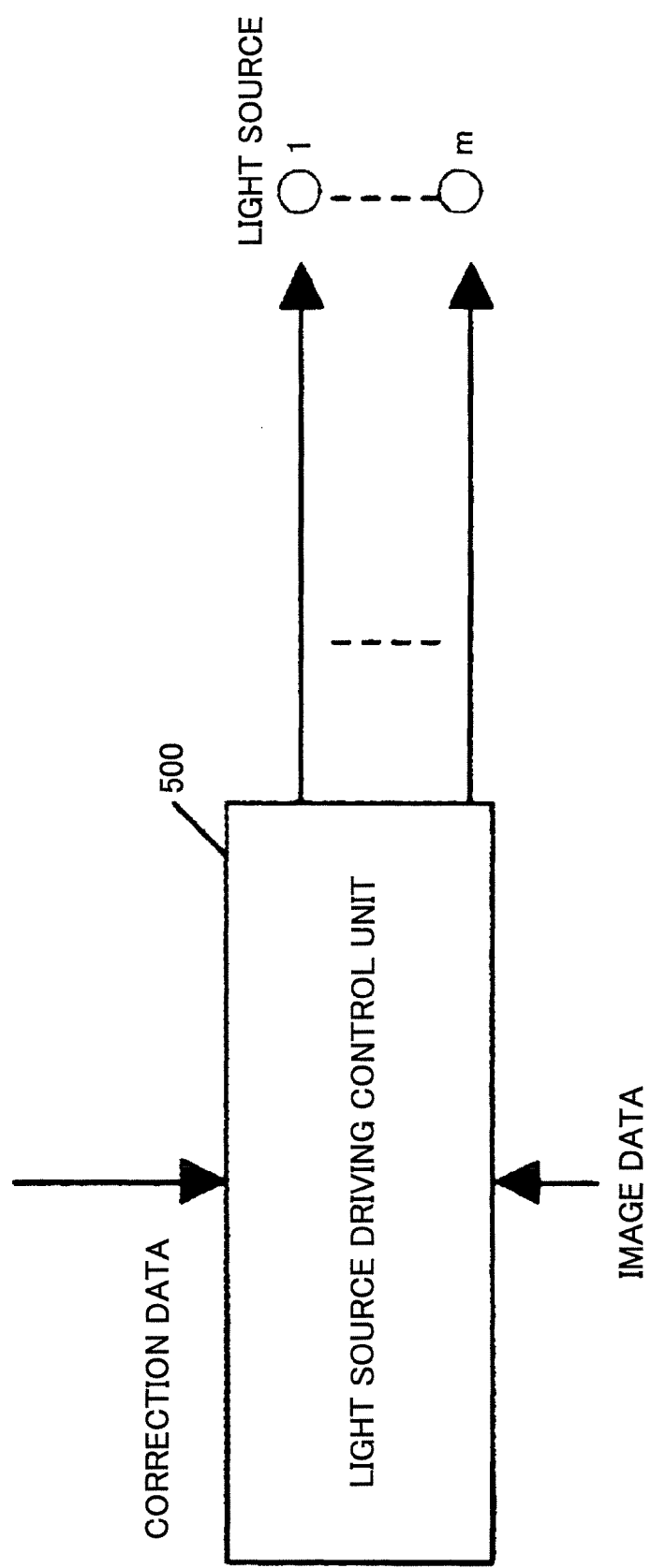
FIG. 27 is a diagram for describing an optical scanner according to a second embodiment of the present invention.

A second embodiment according to the present invention concerns an optical scanner. The optical scanner according to the second embodiment includes n light sources (n≧2) that are arranged at different positions in at least the sub scanning direction. Among the n light sources, m light sources (n≧m≧2) are used for forming one pixel. As shown in FIG. 27, the optical scanner receives correction data for moving the centroid of one pixel in the sub scanning direction. The optical scanner includes a light source driving control unit 500 that changes the driving status of m light sources to move the centroid of a pixel in the sub scanning direction by a distance corresponding to the correction data.

Figure 28:
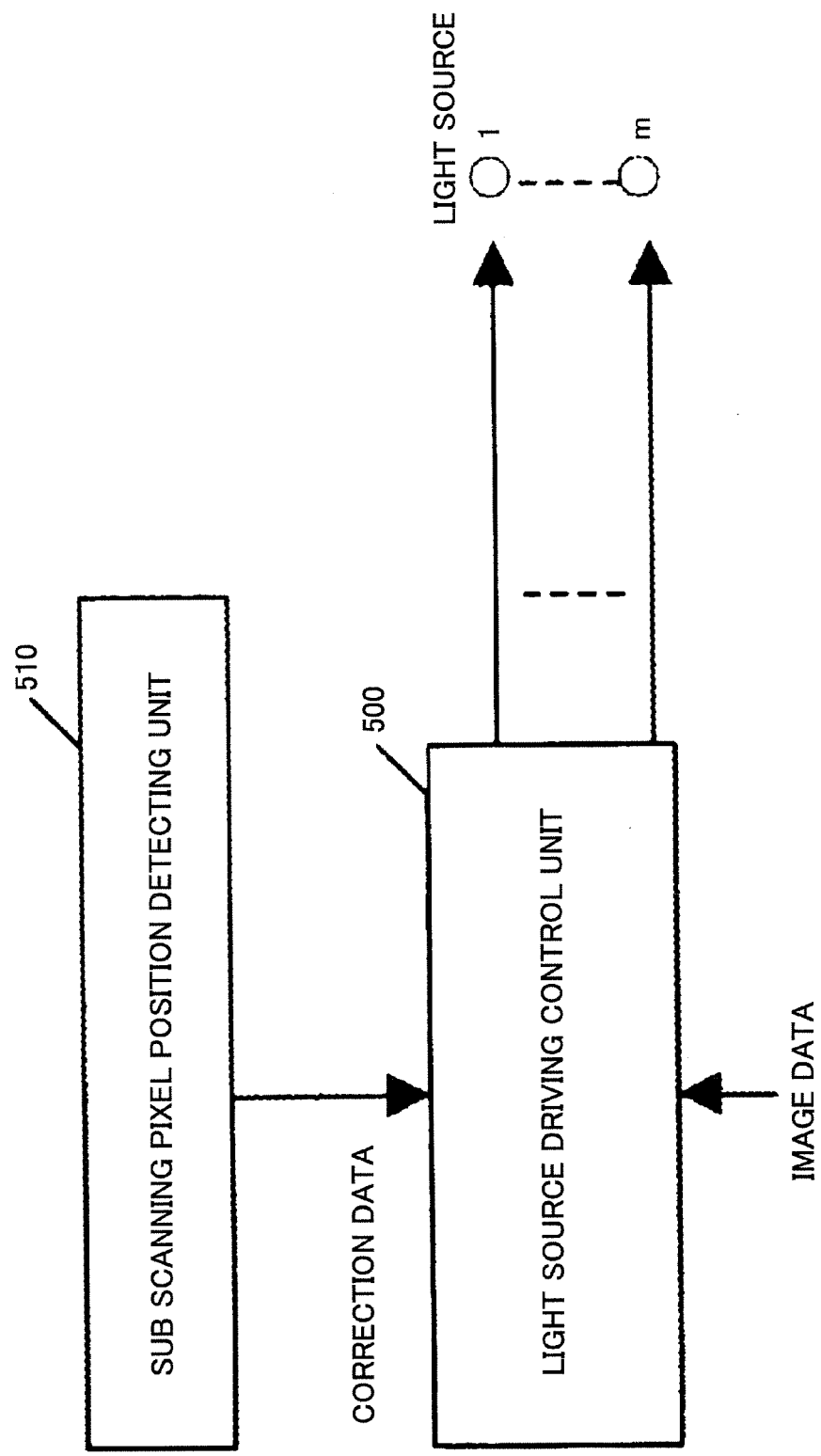
FIG. 28 is another diagram for describing the optical scanner according to the second embodiment of the present invention.

More specifically, as shown in FIG. 28, the optical scanner according to the second embodiment of the present invention includes a sub scanning pixel position detecting unit 510 that detects a sub scanning pixel position and outputs correction data for correcting the pixel position in the sub scanning direction. The light source driving control unit 500 changes the driving status of m light sources to move the centroid of a pixel in the sub scanning direction by a distance corresponding to the correction data received from the sub scanning pixel position detecting unit 510.

The technology disclosed in Japanese Patent No. 3644923 can be applied to the sub scanning pixel position detecting unit 510.

A color image forming apparatus disclosed in Japanese Patent No. 3644923 includes the following elements. Plural image forming units are arranged along a direction of movement of a conveying belt for forming images of different colors by an electrophotographic method. At least three or more sensors are arranged at positions including the middle and both edges of a main scanning direction orthogonal to the direction of movement of the conveying belt. A toner mark creating unit causes the image forming unit to form toner marks corresponding to each color to be used for position detection. The toner marks are created at positions on the conveying belt to be read by all of the sensors. A positional shift amount detecting unit detects positional shift amounts of colors with respect to a reference color at each position of the sensors, based on output from the sensors having read the toner marks for position detection. This positional shift amount detecting unit can be used as the sub scanning pixel position detecting unit 510 according to an embodiment of the present invention.

More precisely, the sub scanning pixel position detecting unit 510 according to an embodiment of the present invention outputs correction data for correcting the pixel position in the sub scanning direction based on positional shift amounts detected by the positional shift amount detecting unit disclosed in Japanese Patent No. 3644923.

In the optical scanner according to the second embodiment, similar to the pixel forming apparatus according to the first embodiment, among n light sources (n≧2) that are arranged in the sub scanning direction, m light sources (n≧m≧2) are used for forming one pixel. Methods of changing the driving status of m light sources include changing the ratio of light emitting time lengths of the m light sources while maintaining a fixed total light emitting length or total exposing area of the m light sources. Another method is to change the ratio of exposing energy of the m light sources by changing the ratio of light emitting levels of the m light sources while maintaining a fixed total exposing energy of the m light sources.

FIGS. 29-33 illustrate concrete examples of how the light source driving control unit 500 changes the driving status of m light sources.

Figure 29:
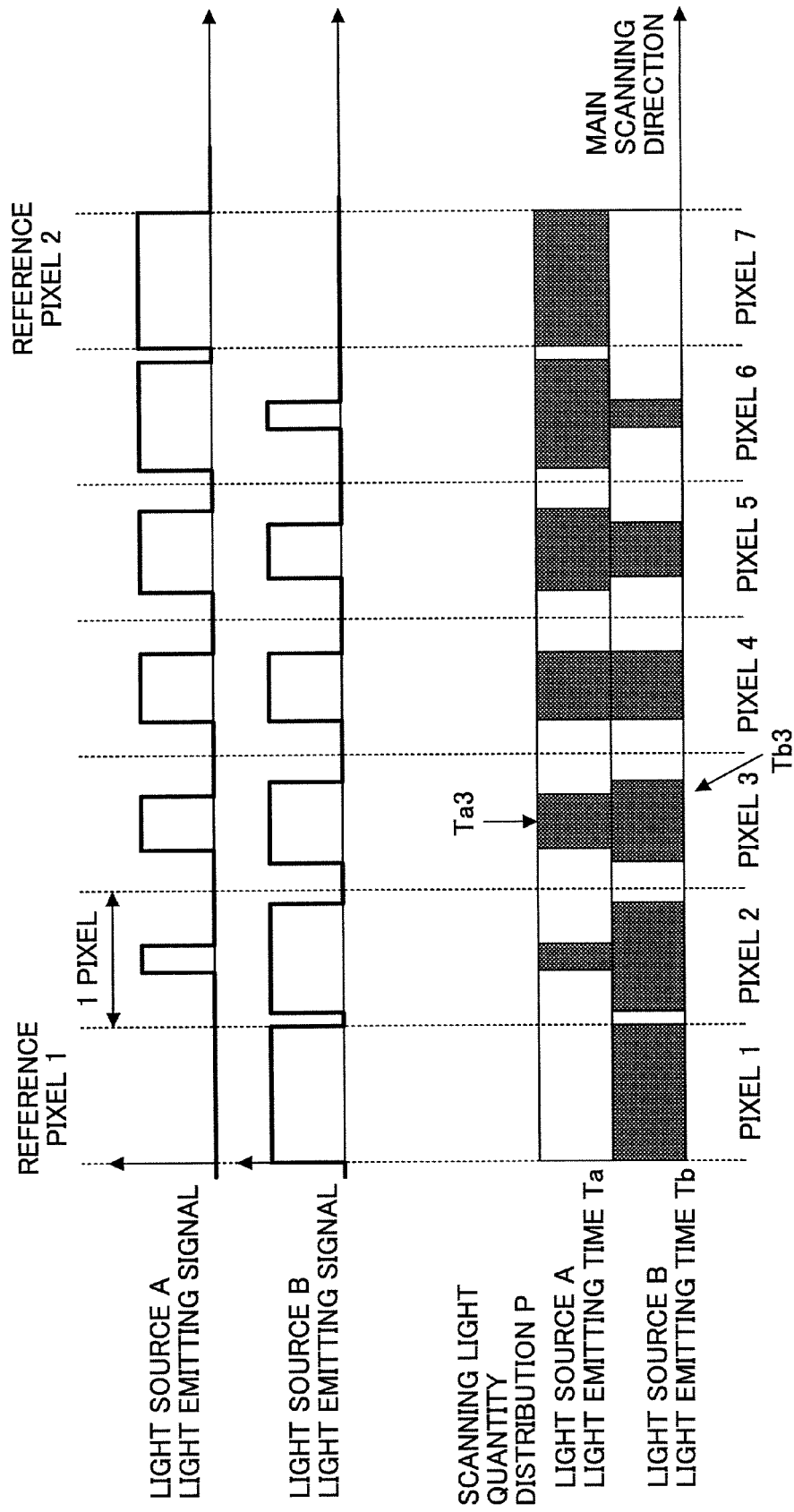
FIG. 29 illustrates a concrete example of a method of changing a driving status of m light sources.

FIG. 29 illustrates a concrete example of changing the ratio of light emitting time lengths of the m light sources while maintaining a fixed total light emitting length. FIG. 29 illustrates a case where two light sources A and B form one pixel. At the top of the figure, light emitting signals of two light sources A, B are indicated. At the bottom of the figure, scanning light amount distributions of light flux segments scanned on a scan object medium by the two light sources are indicated, in which the direction toward right is the main scanning direction.

For example, it is assumed that the light source a1 in FIG. 26 is the light source A in FIG. 29, and the light source a2 in FIG. 26 is the light source B in FIG. 29. For pixel 1, only the light source B emits light. For subsequent pixels 2, 3, and so forth, the light emitting time length of the light source B gradually becomes shorter, and the light emitting time length of the light source A gradually becomes longer. For example, for pixel 4, the light sources A, B emit light for the same light emitting time lengths. Assuming that pixel 4 is designated as the reference pixel, the centroid positions of pixels 5, 6, 7 are shifted in the sub scanning direction toward the top as viewed in the figure. On the other hand, the centroid positions of pixels 3, 2, 1 are increasingly shifted in the sub scanning direction toward the bottom as viewed in the figure. The ratio of light emitting time lengths of the light sources A, B is changed while maintaining a fixed total light emitting length of the light sources A, B. Accordingly, the centroid of a pixel can be shifted in the sub scanning direction. For example, for pixel 3, the light emitting time length of the light source A is Ta3, and the light emitting time length of the light source B is Tb3. The light emitting time length ratio between the light sources A, B is changed so that the sum of light emitting time lengths Ta11=Ta3+Tb3=Tan+Tbn (n being an integer) is fixed. The technology disclosed in Japanese Patent No. 3644923 can be used for measuring a positional shift of a toner image in the sub scanning direction by patch measurement, outputting correction data for correcting a positional shift amount, and changing the ratio of the light emitting time lengths, so that the positional shift of the pixel is corrected in the sub scanning direction.

Figure 30:
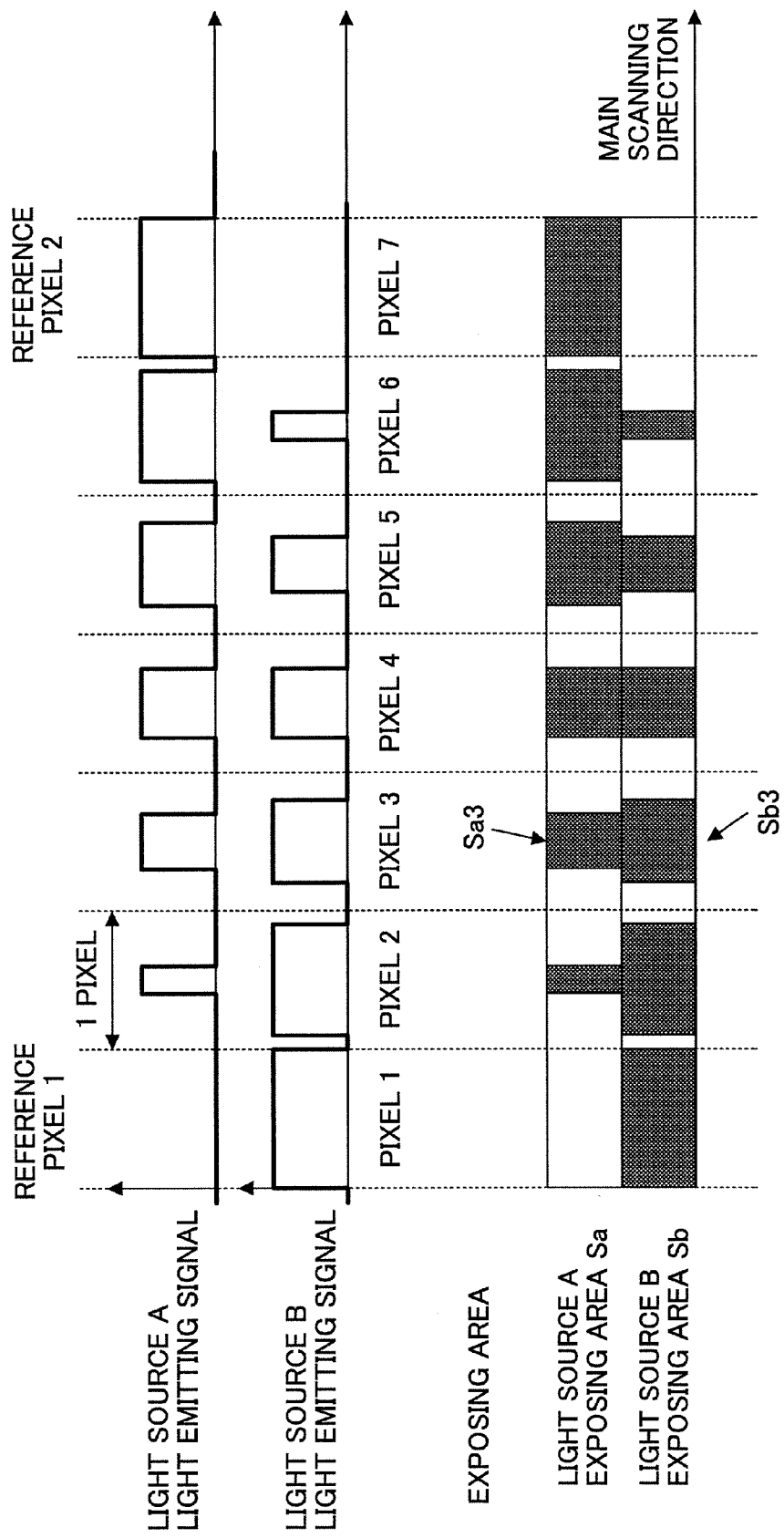
FIG. 30 illustrates another concrete example of a method of changing a driving status of m light sources.

FIG. 30 illustrates a concrete example of changing the ratio of light emitting time lengths of the m light sources while maintaining a fixed total exposing area. FIG. 30 illustrates a case where two light sources A and B form one pixel. Exposing areas Sa, Sb on the photoconductor in accordance with changes in the ratio of light emitting signals from the two light sources A, B are indicated, in which the direction toward right is the main scanning direction.

The photoconductor in the optical scanner is exposed based on light emitting signals from the light sources A and B. In FIG. 30, when the light emitting time lengths of light emitting signals are changed between the light sources A and B, the exposing area exposed by the light sources A, B are referred to as exposing areas Sa, Sb, respectively. Assuming that the exposing areas for pixel 3 is Sa3, Sb3, the light emitting signals are controlled so that the sum of the exposing areas Sa11=Sa3+Sb3=Sai+Sbi (i being an integer) is fixed. The centroid of the exposing area can be shifted in the sub scanning direction by changing the light emitting time length ratio based on the light emitting signals of the light sources A and B, without changing the exposing area per pixel. Similar to the case of FIG. 29, in FIG. 30, the positional shift of the pixel can be corrected in the sub scanning direction by determining the ratio of light emitting time lengths based on the light emitting signals so that the positional shift amount in the sub scanning direction is corrected.

Figure 31:
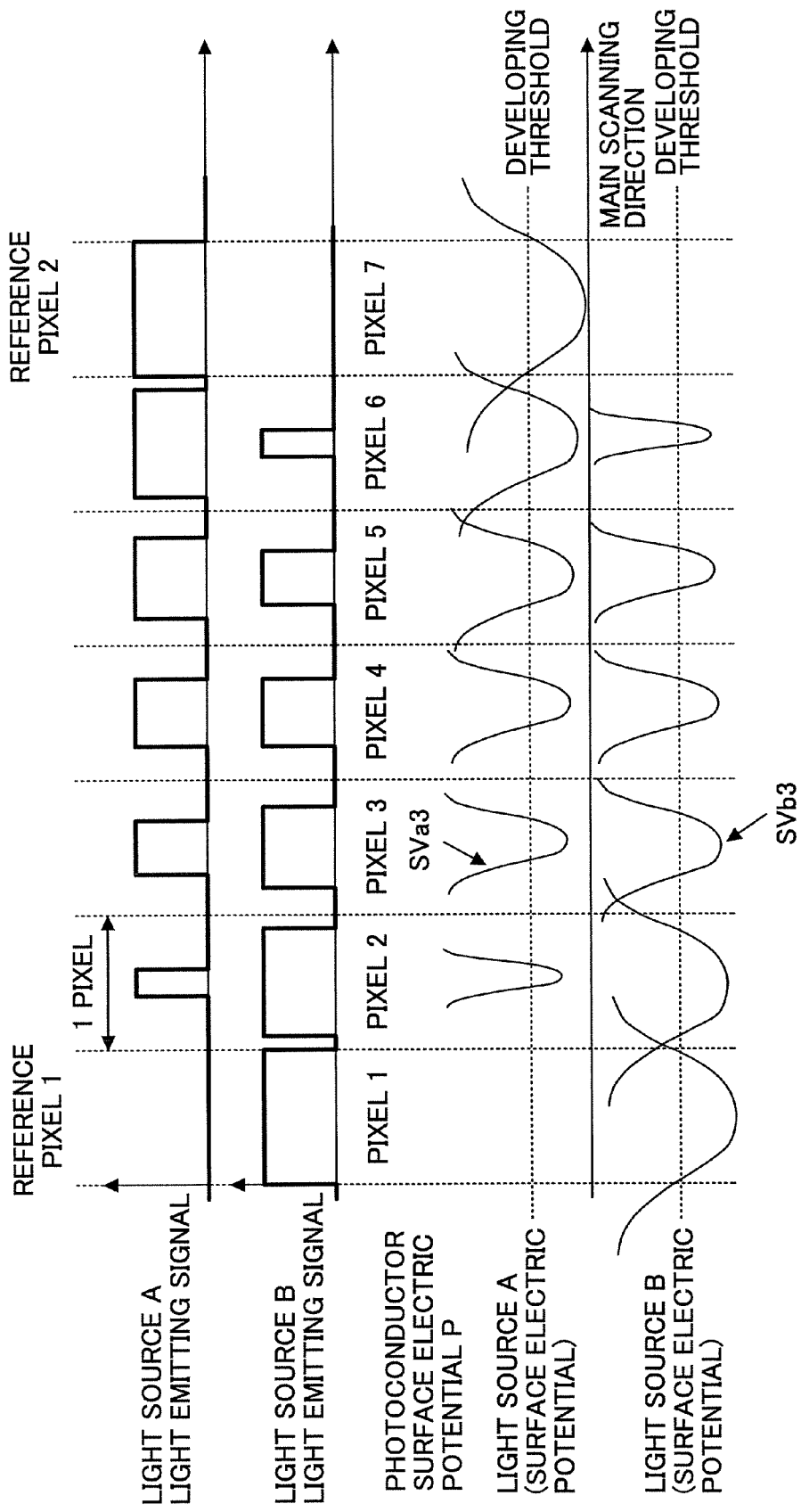
FIG. 31 illustrates yet another concrete example of a method of changing a driving status of m light sources.

FIG. 31 illustrates surface electric potentials on the photoconductor when light emitting signals of two light sources are changed.

In the example shown in FIG. 31, the m light sources are the two light sources A, B. The light emitting time lengths based on light emitting signals are changed between the light source A and the light source B. The photoconductor is exposed based on the light emitting signals from the light sources A, B. When a light quantity exceeds a developing threshold according to light emitting time lengths and light emitting levels, a surface electric potential sufficient for forming an image is formed on the photoconductor. The areas of the regions (hereinafter, "region area") where the light quantity is below the developing threshold for the light sources A, B are referred to as SVa, SVb, respectively. Assuming that the region areas for pixel 3 is Sva3, Svb3, the light emitting signals are controlled so that the sum of the region areas SVa11=SVa3+SVb3=SVai+SVbi (i being an integer) is fixed. Accordingly, the total region area determined by surface electric potential of the two light sources can be fixed. The centroid of the region area can be shifted in the sub scanning direction by changing the light emitting signals (light emitting time length ratio, light emitting level, etc.) of the light sources A and B, without changing the region area per pixel, thereby shifting the centroid of one pixel. Similar to the case of FIG. 29, in FIG. 31, the positional shift of the pixel can be corrected in the sub scanning direction by determining the ratio of light emitting time lengths of the light emitting signals so that the positional shift amount in the sub scanning direction is corrected.

Figure 32:
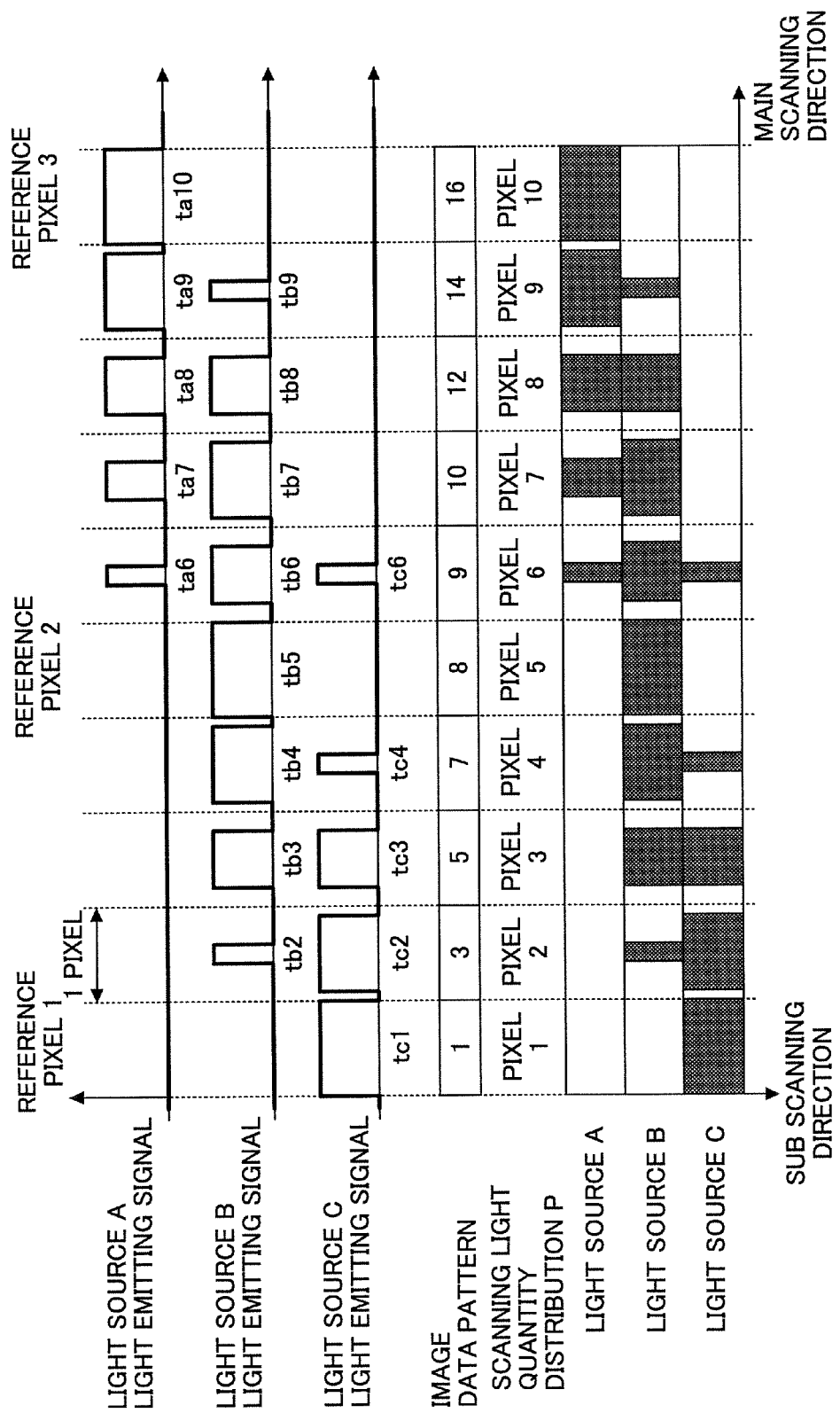
FIG. 32 illustrates yet another concrete example of a method of changing a driving status of m light sources.

FIG. 32 illustrates an example where three light sources are employed. In FIGS. 29, 30, the ratio of light emitting time lengths based on the light emitting signals of two light sources is changed while maintaining a substantially fixed total light emitting time length and total exposing area of two light sources, thereby correcting the pixel positional shift in the sub scanning direction. However, in the example shown in FIG. 32, a light source C is used in addition to light sources A, B, so that one pixel is formed by three light sources, as in the case of pixel 6 in FIG. 32. When the position of pixel 6 is shifted in the sub scanning direction as the other pixels shown in FIG. 32, the light emitting signals of the light sources A, B, C are controlled, so that the centroid of one pixel is shifted in the sub scanning direction. Similar to the case of FIG. 29, in FIG. 32, the positional shift of the pixel can be corrected in the sub scanning direction by determining the ratio of light emitting time lengths of the light emitting signals so that the positional shift amount in the sub scanning direction is corrected.

Figure 33:
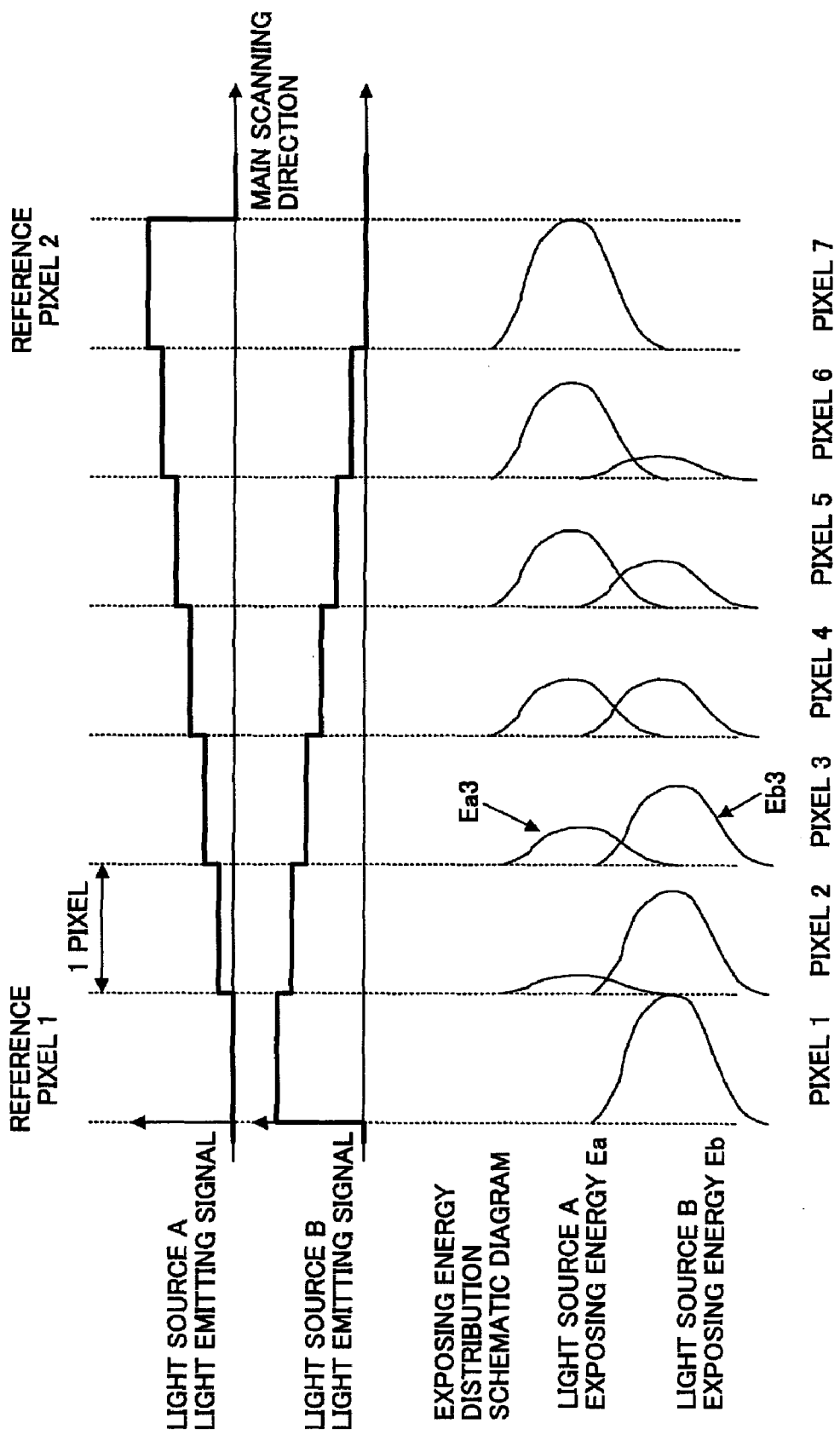
FIG. 33 illustrates yet another concrete example of a method of changing a driving status of m light sources.

FIG. 33 illustrates changes in exposing energy of scanning light beams on the photoconductor according to changes in the ratio of light emitting levels based on light emitting signals of plural light sources. That is, FIG. 33 illustrates a concrete example of changing the ratio of exposing energy of m light sources by changing the ratio of light emitting levels of the m light sources so that a centroid of a pixel is shifted in the sub scanning direction while maintaining a fixed total exposing energy of the m light sources.

In the example of FIG. 33, the ratio of exposing energy amounts is changed by changing the ratio of light emitting levels. For pixel 3, assuming that the exposing energy of the light source A is Ea3, and the exposing energy of the light source B is Eb3, the light emitting levels are determined so that the sum of the exposing energy Ea11=Ea3+Eb3=Eai+Ebi (i being an integer) is fixed. Accordingly, the total exposing energy of the two light sources can be substantially fixed. The centroid of the exposing energy can be shifted in the sub scanning direction by changing the ratio of the light emitting levels of the light sources A, B, C without changing the exposing energy per pixel. Similar to the case of FIG. 29, in FIG. 33, the positional shift of the pixel can be corrected in the sub scanning direction by determining the ratio of light emitting time lengths of the light emitting signals so that the positional shift amount in the sub scanning direction is corrected.

Figure 34:
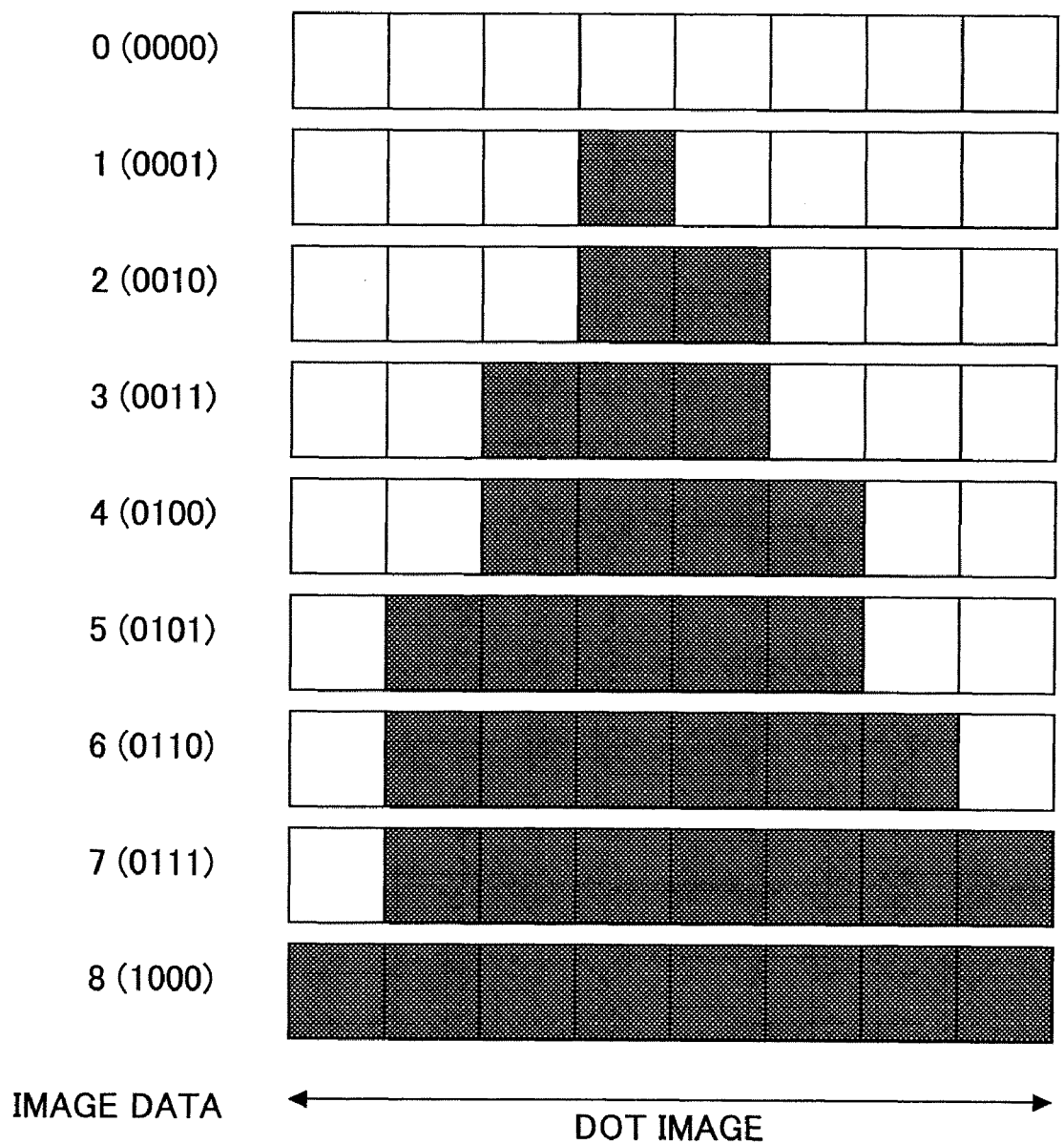
FIG. 34 is a diagram for describing a control operation performed by a light source driving control unit.

FIGS. 34, 35 illustrate the method of changing the light emitting time lengths of two light sources A, B in the example shown in FIG. 29 (example of control operations of the light source driving control unit 500). As shown in FIG. 34, it is assumed that one dot (for example, pixel 1, pixel 2, pixel 3 and so forth in FIG. 29) includes eight pulses, and dot images corresponding to image data are formed by pulses generated by the light source driving control unit 500. As shown in FIG. 34, pulses are formed from the middle of one dot. The dot images represent a width of one dot. For example, image data 1 is defined by a time length of ⅛ of the dot width, image data 2 is defined by a time length of ⅔ of the dot width, and image data 8 is defined by a time length of ⅝ of the dot width. FIG. 35 is a table illustrating patterns selected for controlling light emitting time lengths of the two light sources A, B as shown in FIG. 29, based on relationships between image data and dot image output shown in FIG. 34. The left column indicates seven control patterns 1-7 to be applied to the two light sources A, B, and the values under each light source represent image data shown in FIG. 34.

The light source driving control unit 500 selects patterns according to correction data received. Specifically, when correction data (000) are received, pattern 1 of FIG. 35 is selected; when correction data (001) are received, pattern 2 of FIG. 35 is selected; when correction data (010) are received, pattern 3 of FIG. 35 is selected; when correction data (011) are received, pattern 4 of FIG. 35 is selected; when correction data (100) are received, pattern 5 of FIG. 35 is selected; when correction data (101) are received, pattern 6 of FIG. 35 is selected; and when correction data (111) are received, pattern 7 of FIG. 35 is selected. One pattern out of the seven patterns is selected. For example, when correction data are sequentially received as (000), (001), (010), (011), (100), (101), (111), the light source driving control unit 500 changes the driving statuses of the two light sources A, B as shown in FIG. 29.

By changing the control patterns shown in FIG. 35 in accordance with the sub scanning dot positional shift amount of the pixel, the centroid positions of the pixels can be shifted (corrected) in the sub scanning direction as shown in FIG. 29. The sub scanning dot positional shifts can be corrected by selecting control patterns that correct the positional shift amounts.

Figure 36:
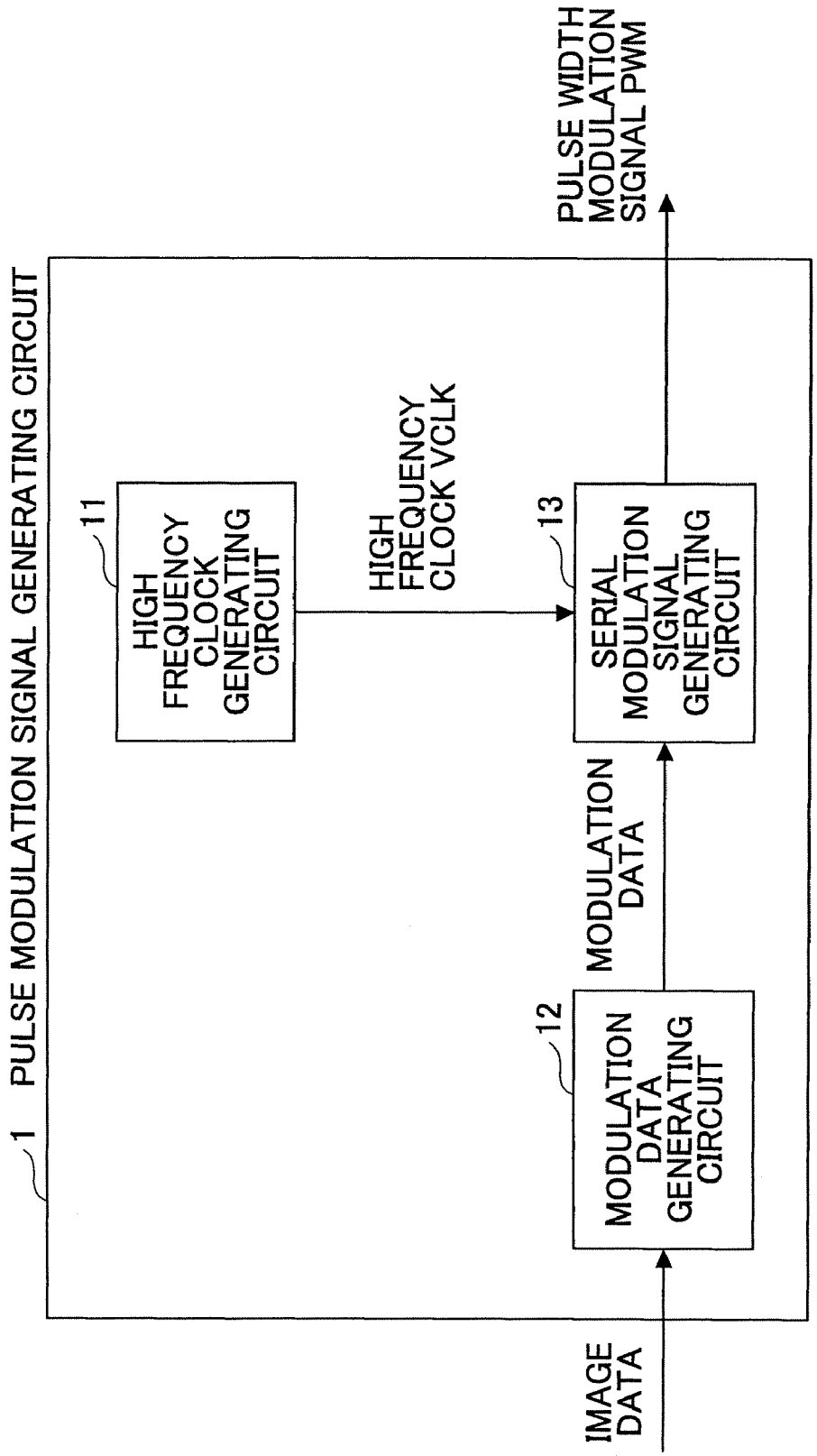
FIG. 36 is a block diagram of a basic configuration of a pulse modulation signal generating circuit.

The image data shown in FIG. 34 are typically generated as pulse width modulation signals PWM from a pulse modulation signal generating circuit 1 as shown in FIG. 36. The pulse modulation signal generating circuit 1 shown in FIG. 36 includes a high frequency clock generating circuit 11, a modulation data generating circuit 12, and a serial modulation signal generating circuit 13. The high frequency clock generating circuit 11 generates a considerably faster high frequency clock VCLK than a basic period representing a pixel clock of one dot generally required in image forming apparatuses. The modulation data generating circuit 12 generates modulation data representing a desired bit pattern based on image data received from outside, such as a not shown image processing unit. The serial modulation signal generating circuit 13 receives the modulation data output from the modulation data generating circuit 12, converts the modulation data into serial pulse pattern rows (pulse rows) based on the high frequency clock VCLK, and outputs the pulse rows as pulse width modulation signals PWM. It is possible to omit the modulation data generating circuit 12 if modulation data from outside are directly input to the serial modulation signal generating circuit 13.

The most significant feature of the pulse modulation signal generating circuit 1 is that modulation data are input to the serial modulation signal generating circuit 13, and based on a high frequency clock that is considerably faster than a pixel clock, pulse rows corresponding to bit patterns of modulation data are serially output, thereby generating pulse width modulation signals PWM. For example, a shift register can be used as the serial modulation signal generating circuit 13.

Figure 37:
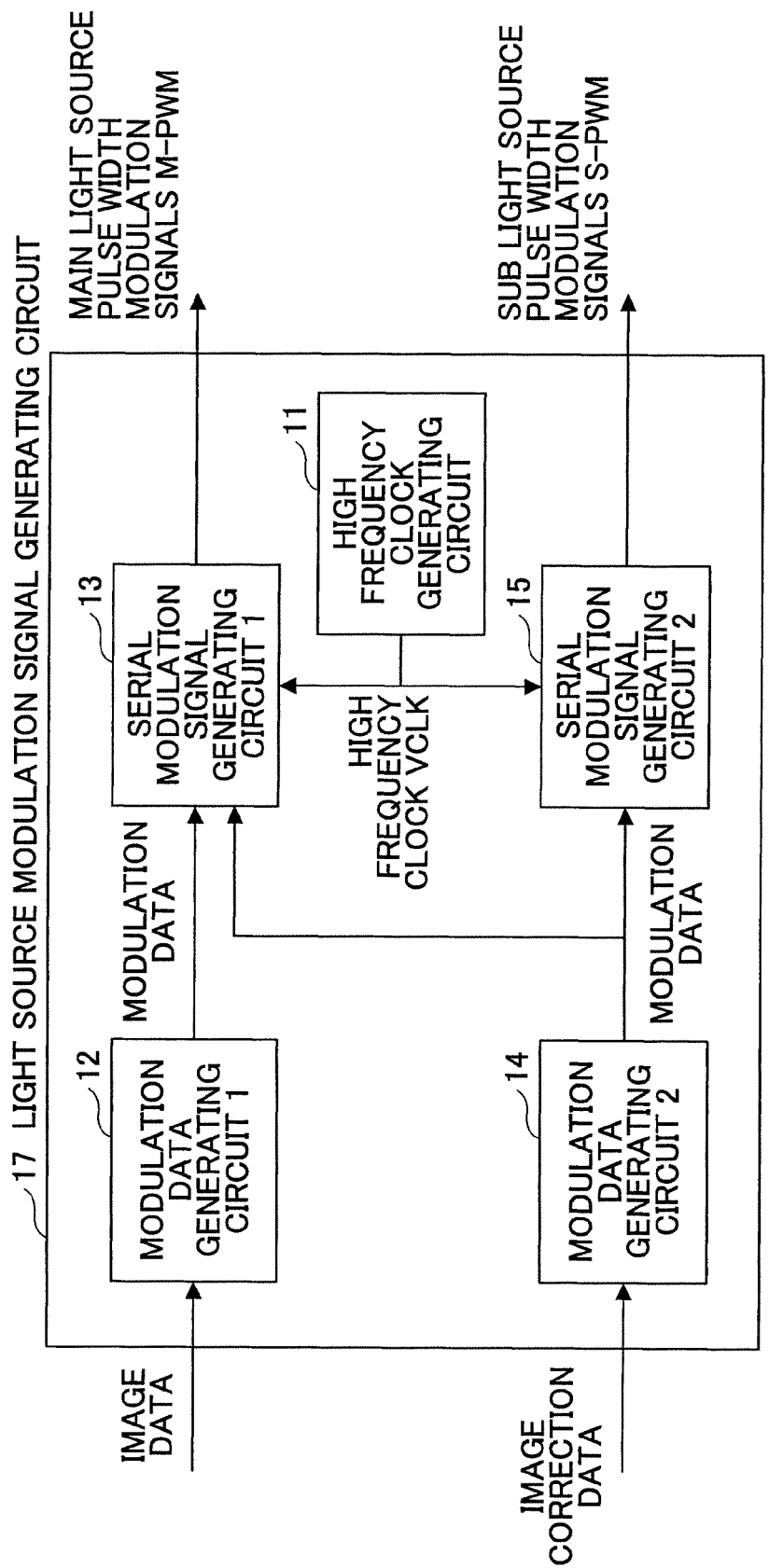
FIG. 37 is a block diagram of a light source modulation signal generating circuit employing the basic configuration of the pulse modulation signal generating circuit shown in FIG. 36.

A light source modulation signal generating circuit 17 shown in FIG. 37 can be used for generating pulse width modulation signals PWM from image data as shown in FIG. 34, and use control patterns as shown in FIG. 35 for drive control. The light source modulation signal generating circuit 17 employs the basic concept of the pulse modulation signal generating circuit 1 shown in FIG. 36.

The light source modulation signal generating circuit 17 shown in FIG. 37 uses image data and correction data as control data for controlling the two light sources A, B. The image data correspond to a scanner image of a copier or data used when printing. The correction data correspond to data used for correcting pixel positions in the subs scanning direction in the image data, such as correction data output from the sub scanning pixel position detecting unit 510 for correcting pixel positions in the sub scanning direction.

In the light source modulation signal generating circuit 17 shown in FIG. 37, image data are converted to modulation data by the modulation data generating circuit 1 (12), and are input to the serial modulation signal generating circuit 1 (13). Similarly, correction data are converted into modulation data by the modulation data generating circuit 2 (14), and are input to the serial modulation signal generating circuits 1, 2 (13, 15). The serial modulation signal generating circuits 1, 2 (13, 15) output pulse width modulation signals (main light source pulse width modulation signals M-PWM, sub light source pulse width modulation signals S-PWM) based on the modulation data from the modulation data generating circuits 1, 2 (12, 14) and the high frequency clock output from the high frequency clock generating circuit 11. FIG. 34 provides an idea of relationships between the image data and the PWM signals. Based on image data input in four bits, pulse modulation signals for dot images shown in FIG. 34 are output. The main light source pulse width modulation signals M-PWM are used as drive control signals of the light source B shown in FIG. 29, and the sub light source pulse width modulation signals S-PWM are used as drive control signals of the light source A shown in FIG. 29.

One of the seven patterns shown in FIG. 35 can be selected based on correction data. The pulse width of image data 8 (1000) is designated as the reference light emitting time, and therefore, the sum of pulse width time lengths of each pattern is fixed as eight in FIG. 35, in which image data of the two light sources are associated with output patterns. By providing a LUT (look up table) as shown in FIG. 35 for selecting a pattern from seven patterns based on a value of correction data, it is possible to correct positional shifts in the sub scanning direction for two light sources. Specifically, when the correction data are (000), pattern 1 shown in FIG. 35 is selected, and the light sources A, B are driven and controlled based on image data 0, 8 shown in FIG. 34. When the correction data are (010), pattern 3 shown in FIG. 35 is selected, and the light sources A, B are driven and controlled based on image data 3, 5 shown in FIG. 34.

Accordingly, by using the pulse modulation signal generating circuit 1 shown in FIG. 36 (more specifically, the light source modulation signal generating circuit 17 shown in FIG. 37) in the light source driving control unit 500, the driving status of the two light sources A, B can be changed as shown in FIG. 29.

In the above examples, specific circuit configurations are described for driving and controlling light sources as shown in FIG. 29. However, for driving and controlling light sources as shown in FIG. 33, a power modulation signal generating circuit 18 shown in FIG. 38 can be used as the basic circuit configuration instead of the pulse modulation signal generating circuit 1 shown in FIG. 36. In the power modulation signal generating circuit 18 shown in FIG. 38, image data input to the modulation data generating circuit 12 indicate the light quantity of each light source. The modulation data generating circuit 12 performs intensity modulation on the image data, thereby generating modulation data. The high frequency clock generating circuit 11 generates a high frequency clock that is considerably faster than a pixel clock. Based on the high frequency clock, power signals corresponding to light intensity of the modulation data are serially output, thereby generating power modulation signals PM.

Figure 38:
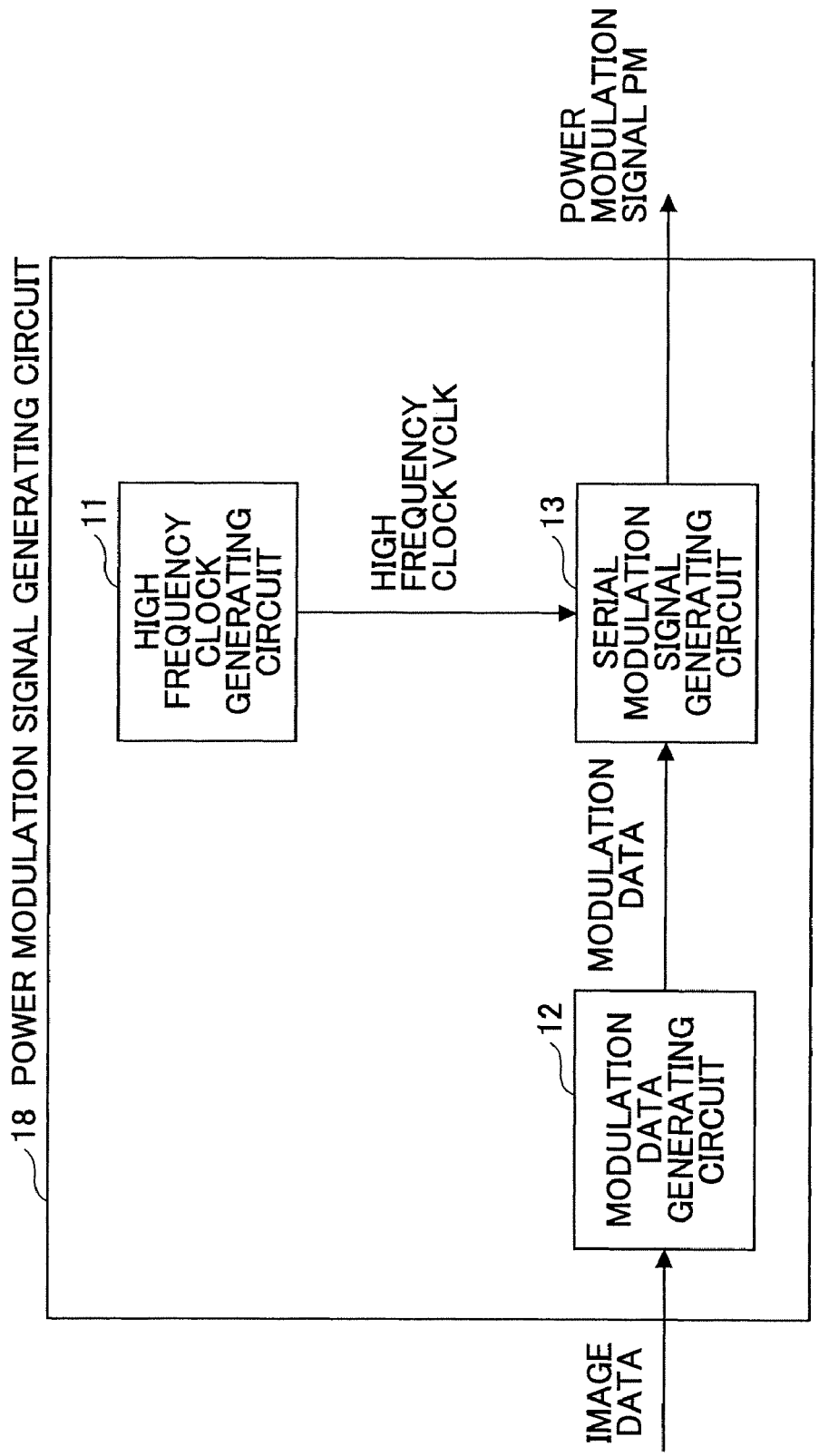
FIG. 38 is a block diagram of a basic configuration of a power modulation signal generating circuit.

By using a circuit configuration similar to that shown in FIG. 37 employing the circuit shown in FIG. 38, it is possible to drive and control light signals as shown FIG. 33.

When there are three or more light sources to be driven and controlled (e.g., as shown in FIG. 32), the drive control can be easily realized by expanding the circuit configuration shown in FIG. 37.

According to embodiments of the present invention, it is possible to drive and control light sources in various manners other than that of the above descriptions.

Third Embodiment

An optical scanner according to a third embodiment of the present invention has the same configuration as those shown in FIG. 27 or 28. The optical scanner according to the third embodiment includes n light sources (n≧2) that are arranged at different positions in at least the sub scanning direction. Among the n light sources, m light sources (n≧m≧2) are used for forming one pixel. At a certain image height in the main scanning direction, one of the light sources used for emitting light is changed so that the pixel position is moved in a predetermined direction in the sub scanning direction by a distance equal to the length of the pitch of one light source. The light source driving control unit 500 according to the third embodiment changes the driving status of light sources in this manner.

The method of driving and controlling light sources according to the third embodiment is employed for a typical image that is not a line image. That is, all pixels in the image have a meaning (i.e., represent a value); the image does not include meaningless (blank) pixels (pixel corresponding to 0) as in the case of line images.

Figure 39:
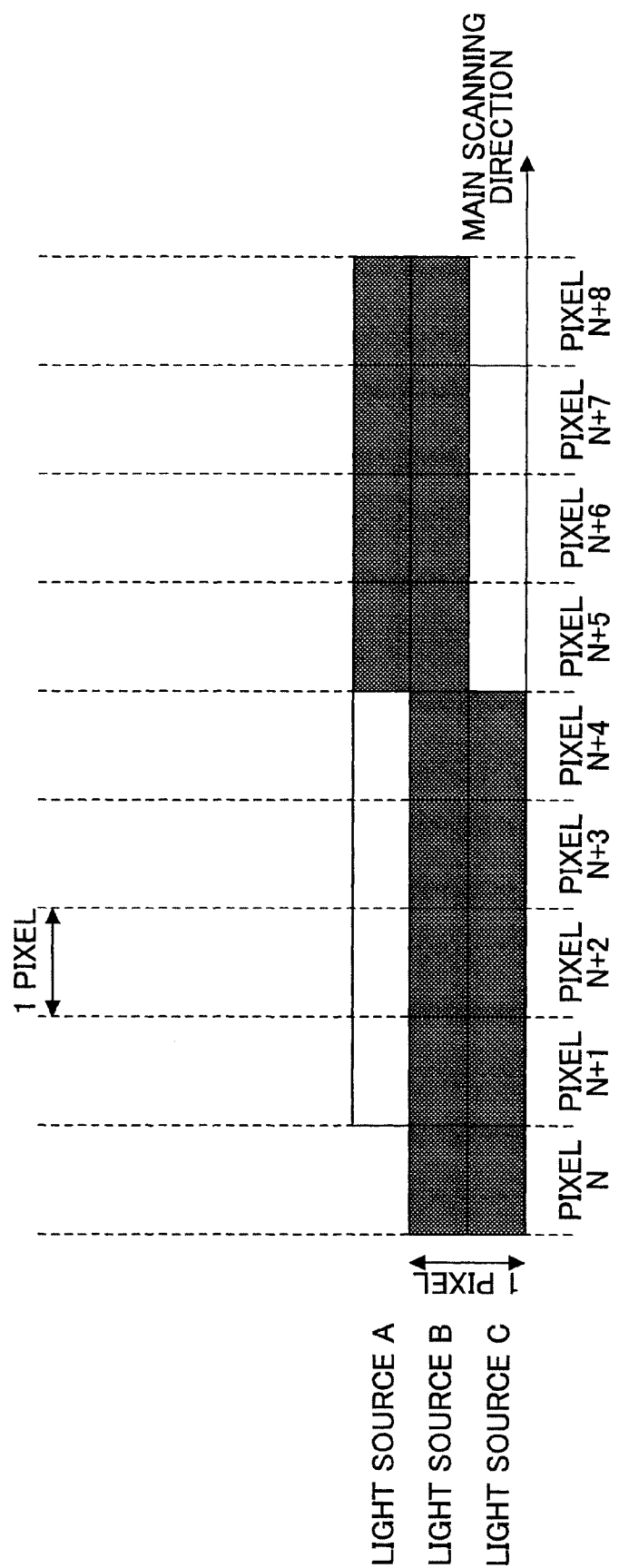
FIG. 39 illustrates a concrete example of driving and controlling light sources according to a third embodiment of the present invention, when three light sources A, B, C are used for forming one pixel.

FIG. 39 illustrates a concrete example of driving and controlling light sources according to the third embodiment. In the example shown in FIG. 39, two light sources B and C are used for forming one pixel in the sub scanning direction. This example illustrates a case of writing a line in the main scanning direction having a width of one pixel. The line is bent due to irregularities in optical systems or mechanical components. The line is bent downward as viewed in FIG. 39. In order to correct the bend, the pixels are to be moved upward as viewed in FIG. 39 (by changing a light source used for emitting light from the light source C to the light source A), so as to correct a bent scanning line. In FIG. 39, the downward bend is corrected by preventing positional shifts in the sub scanning direction. In order to correct the bent line in the opposite direction, instead of changing the light source used from the light source C to the light source A, the light source used is changed from light source B to a light source below the light source C.

Figure 40:
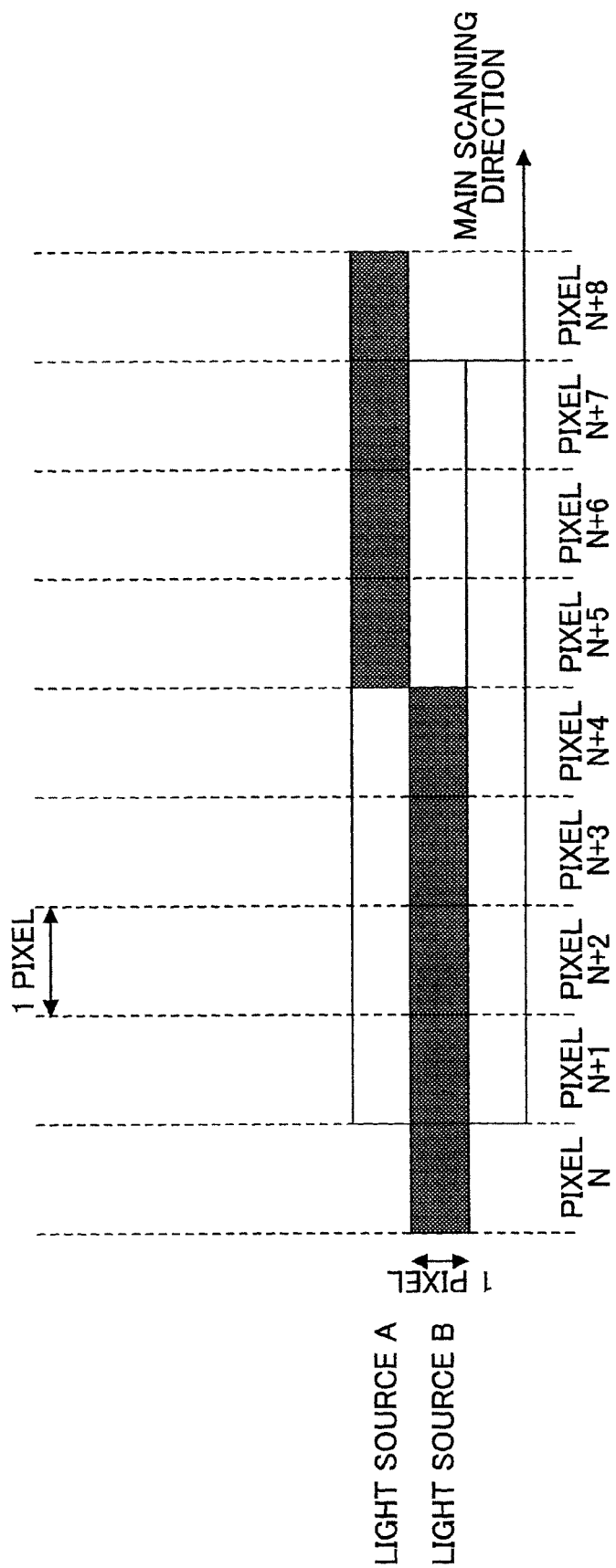
FIG. 40 illustrates an example of correcting a bent line when one light source is used for forming one pixel in the sub scanning direction.

FIG. 40 illustrates an example of correcting a bent line when one light source is used for forming one pixel in the sub scanning direction. In this case, the light source B is first used for writing one pixel line in the main scanning direction, and from the N+5 th pixel in the main scanning direction, the light source A is used for writing the pixel line. As the pixel position is changed in the sub scanning direction, the bent scanning line is corrected. Precision of the correction is determined by the pixel pitch. For example, when one pixel is written at 600 dpi, the precision of correcting a bent scanning line becomes 600 dpi≅42.5 µm. When the scanning line is bent extensively, it is possible to correct the bend to some extent. However, in general, with a precision of 42.5 µm for moving a pixel, the positional shift is perceived as a bent line by human eyesight.

With a considerably fine pixel density, such as 2,400 dpi, 4,800 dpi, the precision of correcting pixel positions becomes 10 µm, 5 µm, respectively. When the precision is 5 µm or less, a corrected bend of a scanning line appears to be corrected with human eyesight. However, from the viewpoint of creating an image, without considering correcting an image, a pixel density of 4,800 dpi provides excessively high quality. If all systems use 4,800 dpi or more, the data amount becomes enormous, and is therefore not practical.

The example shown in FIG. 40 has the above-described problems. However, in the example shown in FIG. 39, the light source used for writing can have a resolution of 2,400 dpi or 4,800 dpi, while the image data are written at 600 dpi or 1,200 dpi. That is, the writing resolution and the resolution of the image data are different, and the system is configured so that the writing resolution is higher than the resolution of the image data. Accordingly, it is possible to construct an optical writing system in which the image data are of sufficient resolution, while using a finer writing resolution for correcting positions such as bent scanning lines.

As described above, in the third embodiment, in typical images other than line images, scanning lines bent due to irregularities in optical systems or mechanical components can be corrected highly precisely.

Figure 41:
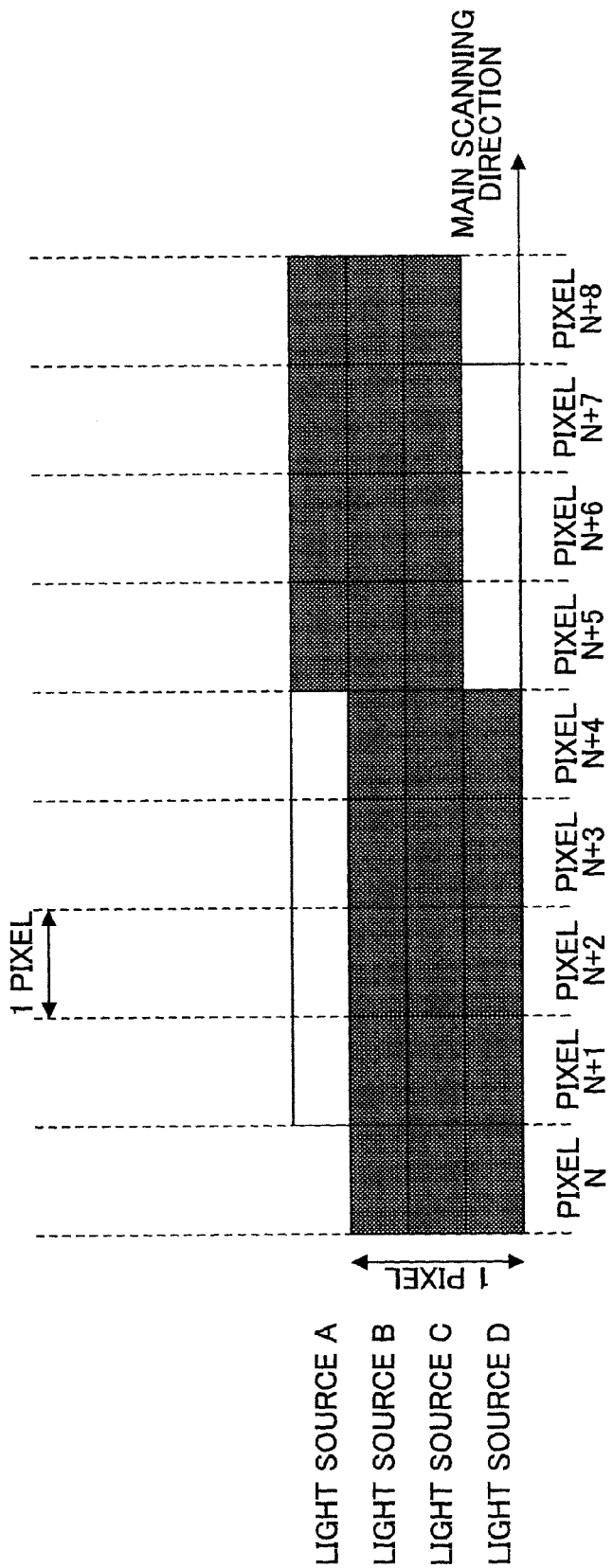
FIG. 41 illustrates another concrete example of driving and controlling light sources according to the third embodiment, when four light sources A, B, C, D are used for forming one pixel.

FIG. 41 illustrates another concrete example of driving and controlling light sources according to the third embodiment. In the example shown in FIG. 41, three light sources B, C, and D are used for forming one pixel in the sub scanning direction, and from the N+5 th pixel in the main scanning direction, the light sources A, B, C are used for emitting light. Similar to the case of FIG. 39, in typical images other than line images, scanning lines bent due to irregularities in optical systems or mechanical components can be corrected highly precisely.

Fourth Embodiment

An optical scanner according to a fourth embodiment of the present invention has the same configuration as those shown in FIG. 27 or 28. In a first pattern, among n light sources (n≧2) that are arranged at different positions in at least the sub scanning direction, first, m light sources (n≧m≧2) are used for forming one pixel up to a certain image height in the main scanning direction. Beyond the certain image height, (m+1) light sources are used for forming one pixel. At a subsequent image height in the main scanning direction, the pixel position is moved from the initial pixel position by a distance equal to the length of the pitch of one light source in a predetermined direction in the sub scanning direction. That is, beyond the subsequent image height, one pixel is formed by m light sources that have moved in the sub scanning direction by one light source. The light source driving control unit 500 provided in the optical scanner according to the fourth embodiment changes the driving status of light sources in this manner.

In a second pattern, among n light sources (n≧2) that are arranged at different positions in at least the sub scanning direction, first, m light sources (n≧m≧2) are used for forming one pixel up to a certain image height in the main scanning direction. Beyond the certain image height, (m+1) light sources are used for forming one pixel. The light source driving control unit 500 provided in the optical scanner according to the fourth embodiment changes the driving status of light sources in this manner.

In the first pattern and the second pattern, the light source driving control unit 500 performs a smoothing process for smoothing edges of pixels. Specifically, the light source driving control unit 500 changes the driving status of at least a light source at one edge among the (m+1) light sources in a step-wise manner while one pixel is being formed by (m+1) light sources.

For performing the smoothing process, PWM (pulse width modulation) or PM (power modulation) can be employed, or PWM (pulse width modulation) and PM (power modulation) can be employed in combination.

The method of driving and controlling light sources according to the fourth embodiment is employed when the image is a line image with meaningless (blank) pixels (pixel corresponding to 0) on the outside.

Figure 42:
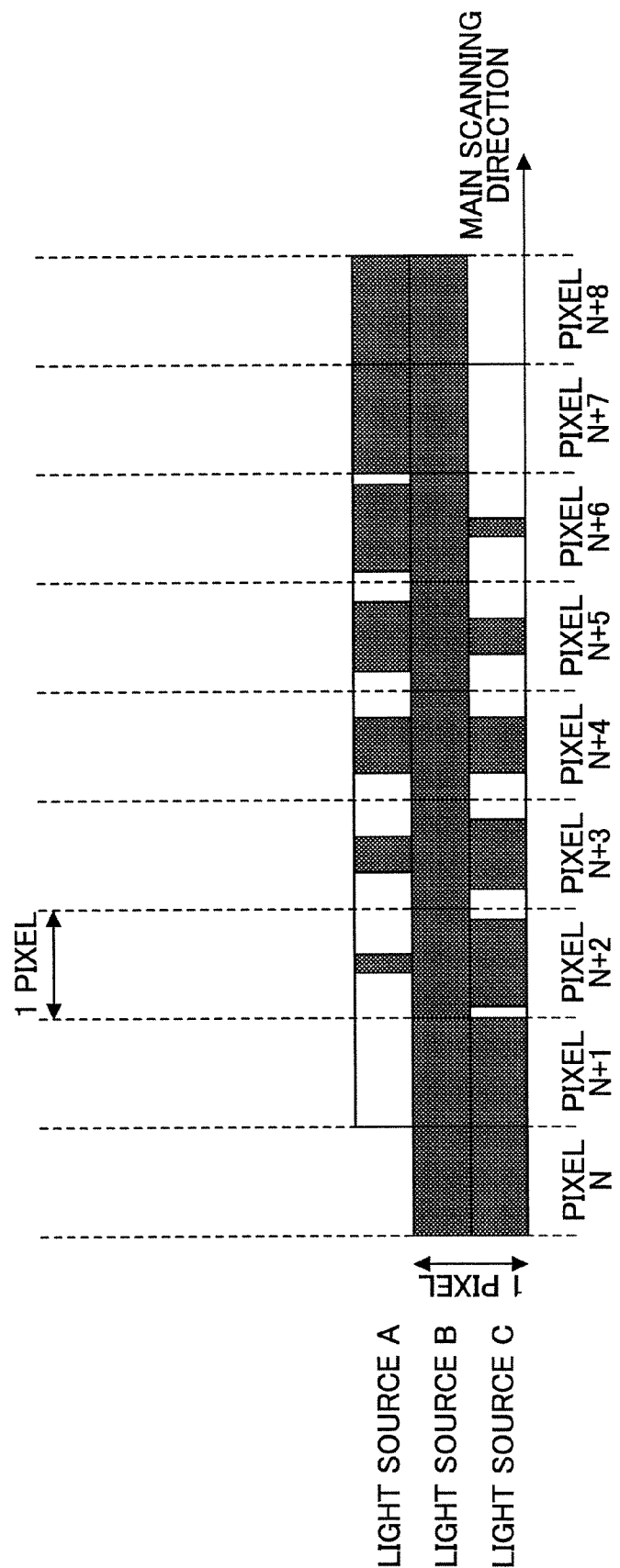
FIG. 42 illustrates a concrete example of driving and controlling light sources according to a fourth embodiment of the present invention.

FIG. 42 illustrates a concrete example of driving and controlling light sources according to the fourth embodiment (first pattern in fourth embodiment). In the example shown in FIG. 42, similar to the example shown in FIG. 39, first, two light sources B, C are used for forming one pixel in the sub scanning direction. However, in the example shown in FIG. 42, the light source driving control unit 500 does not suddenly change the light source used for emitting light from the light source C to the light source A at the N+5 th pixel as in FIG. 39. In the example shown in FIG. 42, the light source C and the light source A are operated in association with each other to perform pulse width modulation, so that edges of pixels can be smoothed (i.e., pixel positions can be corrected by finer pitches than the pitch between light sources). In the example shown in FIG. 42, it is assumed that there are 12 values representing pulse widths. By controlling the light sources as indicated below, pixel positions can be corrected more smoothly for correcting a bent scanning line.

| | |
|---|---|
| Before Pixel N + 1 | light source C: PWM value 12 |
| | light source A: PWM value 0 (i.e., no light emitted) |
| Pixel N + 2 | light source C: PWM value 10 |
| | light source A: PWM value 2 |
| Pixel N + 3 | light source C: PWM value 8 |
| | light source A: PWM value 4 |
| Pixel N + 4 | light source C: PWM value 6 |
| | light source A: PWM value 6 |
| Pixel N + 5 | light source C: PWM value 4 |
| | light source A: PWM value 8 |
| Pixel N + 6 | light source C: PWM value 2 |
| | light source A: PWM value 10 |
| Pixel N + 7 | light source C: PWM value 0 |
| | light source A: PWM value 12 |

In FIG. 42, among (m+1) light sources, in this case three light sources A, B, C, the driving status of the light sources A, C on both edges is changed in a step-wise manner, so that pixel edges are smoothed.

FIGS. 43-46 illustrate other concrete examples of driving and controlling light sources according to the fourth embodiment (first pattern in fourth embodiment).

Figure 43:
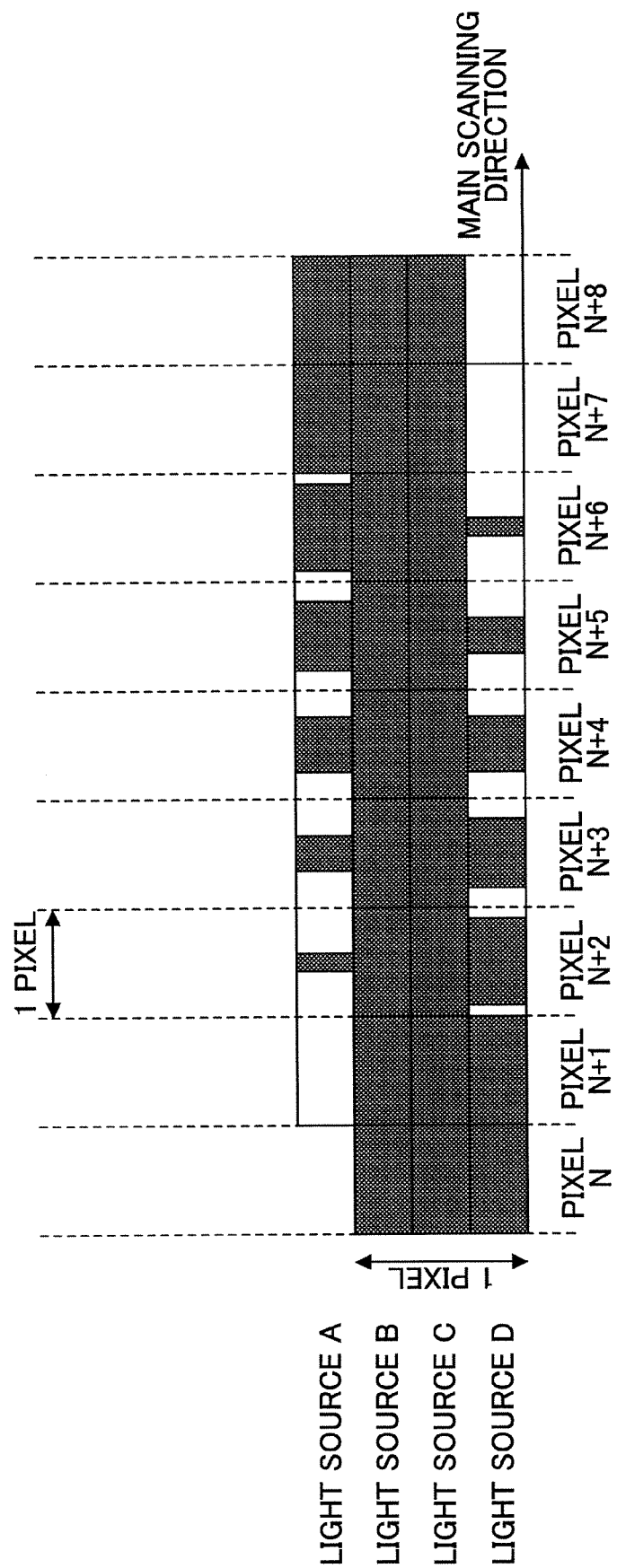
FIG. 43 illustrates another concrete example of driving and controlling light sources according to the fourth embodiment of the present invention.

FIG. 43 illustrates an example according to the fourth embodiment in which three light sources B, C, D are first used for forming one pixel, then four light sources A, B, C, D are used for forming one pixel, and then three light sources A, B, C are first used for forming one pixel. In the example shown in FIG. 43, similar to the example shown in FIG. 42, among (m+1) light sources, in this case four light sources A, B, C, D, the driving status of the light sources A, D on both edges is changed in a step-wise manner, so that pixel edges are smoothed.

Figure 44:
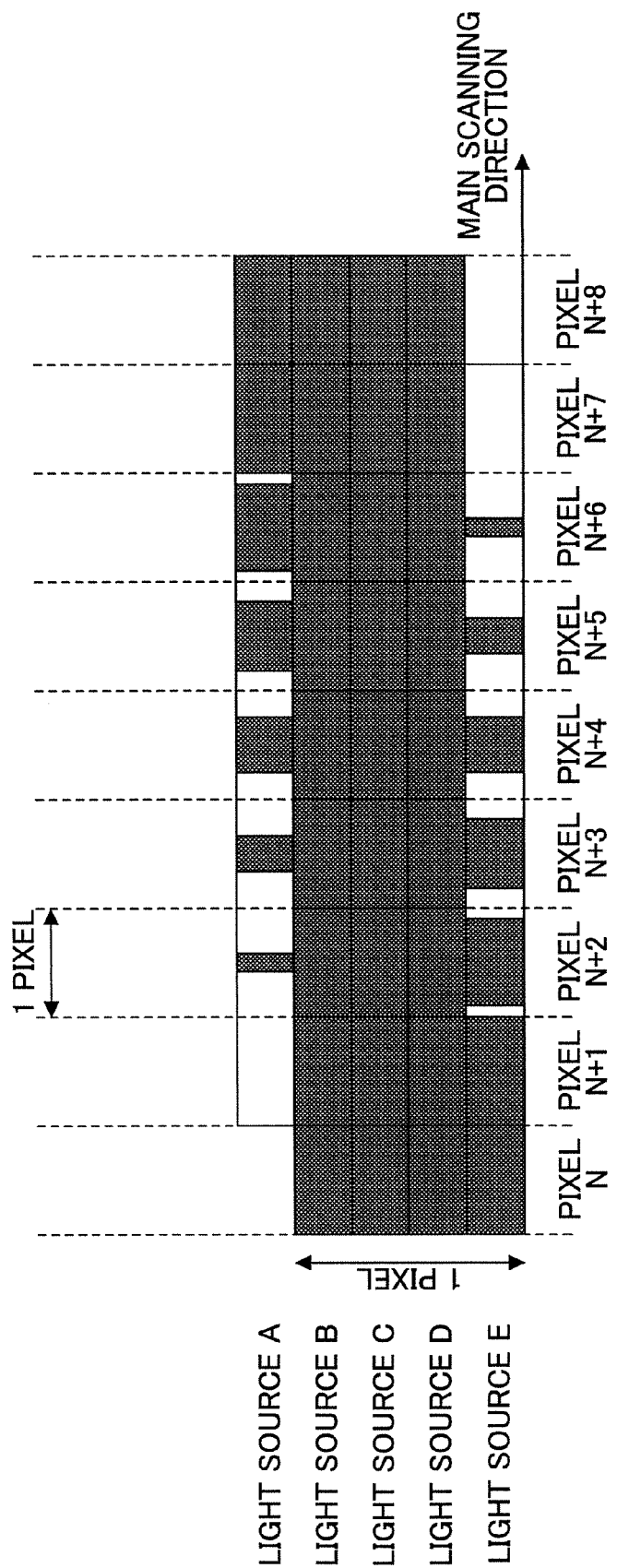
FIG. 44 illustrates yet another concrete example of driving and controlling light sources according to the fourth embodiment of the present invention.

FIG. 44 illustrates an example according to the fourth embodiment in which four light sources B, C, D, E are first used for forming one pixel, then five light sources A, B, C, D, E are used for forming one pixel, and then four light sources A, B, C, D are used for forming one pixel. In the example shown in FIG. 44, when one pixel is 600 dpi in the sub scanning direction, the light sources are arranged at pitches of 2,400 dpi. Even if the light source used for emitting light is suddenly changed at a certain pixel as in the case of FIG. 41, a sufficient level of precision can be achieved because the pitch is 2,400 dpi. However, by further applying PWM (pulse width modulation) as in the case of FIG. 43, pixel positions can be corrected even more smoothly.

Figure 45:
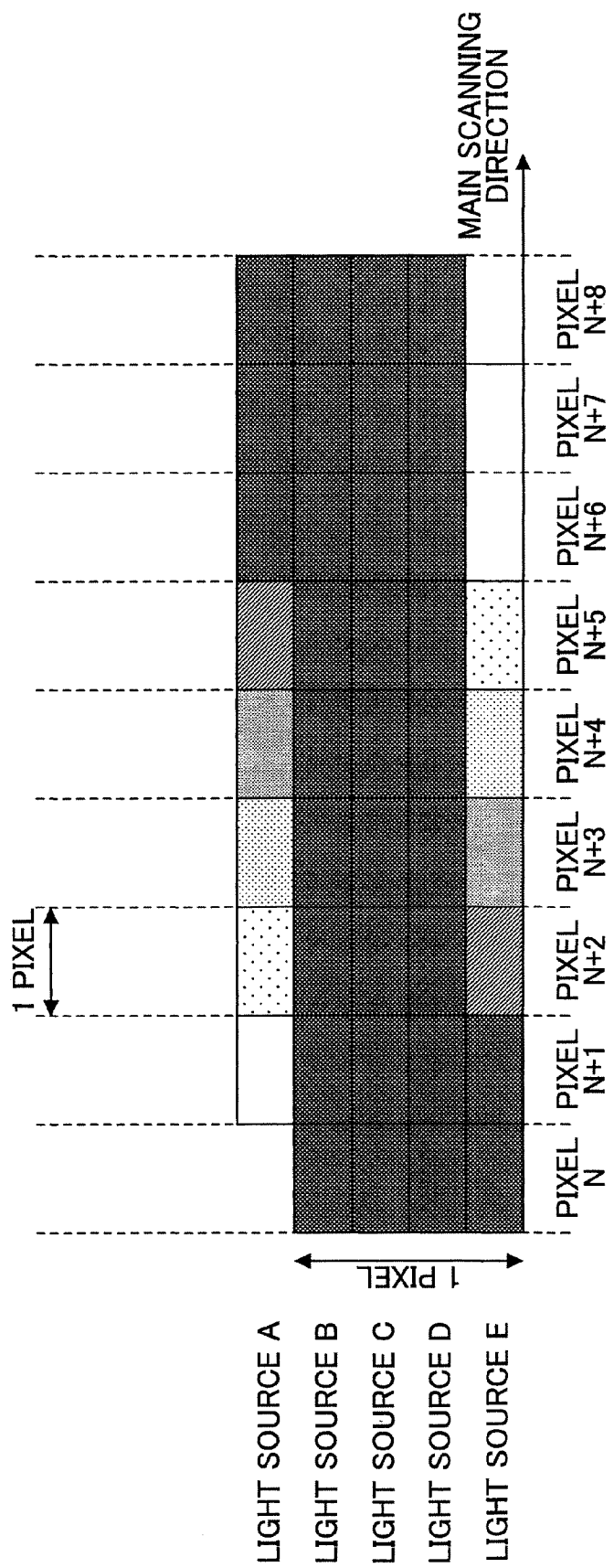
FIG. 45 illustrates yet another concrete example of driving and controlling light sources according to the fourth embodiment of the present invention.

In FIG. 44, PWM (pulse width modulation) is applied to correct pixel positions smoothly, where as in FIG. 45, PM (power modulation) is applied to correct pixel positions smoothly. In the case of PM, corrections can be made as shown in FIG. 45 by providing the light source unit with, e.g., a DAC unit for specifying a desired driving current.

Figure 46:
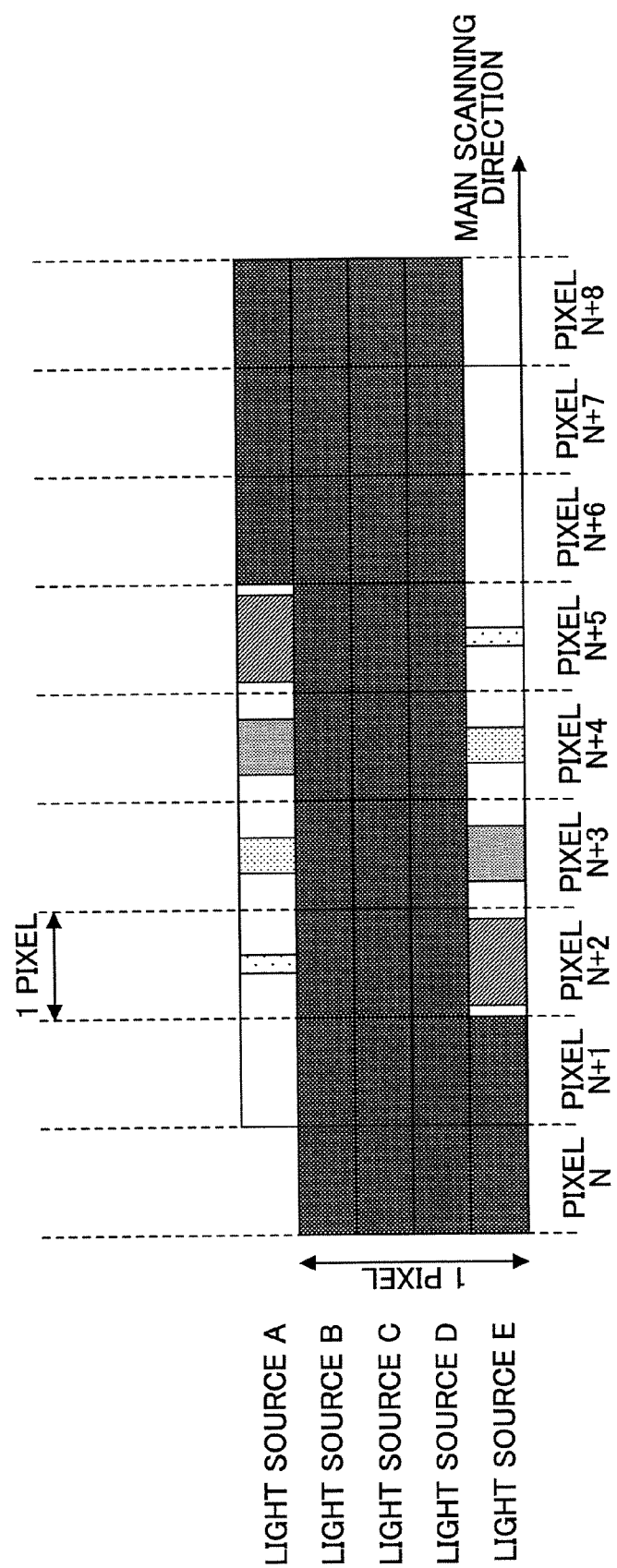
FIG. 46 illustrates yet another concrete example of driving and controlling light sources according to the fourth embodiment of the present invention.

FIG. 46 illustrates an example of driving and controlling light sources by applying both PWM and PM to correct pixel positions even more smoothly.

In the above concrete examples described with reference to FIGS. 42-46 for the first pattern of the fourth embodiment, the driving status of light sources at both edges among the (m+1) light sources is changed in a step-wise manner while one pixel is being formed by (m+1) light sources, thereby smoothing pixel edges.

Figure 47:
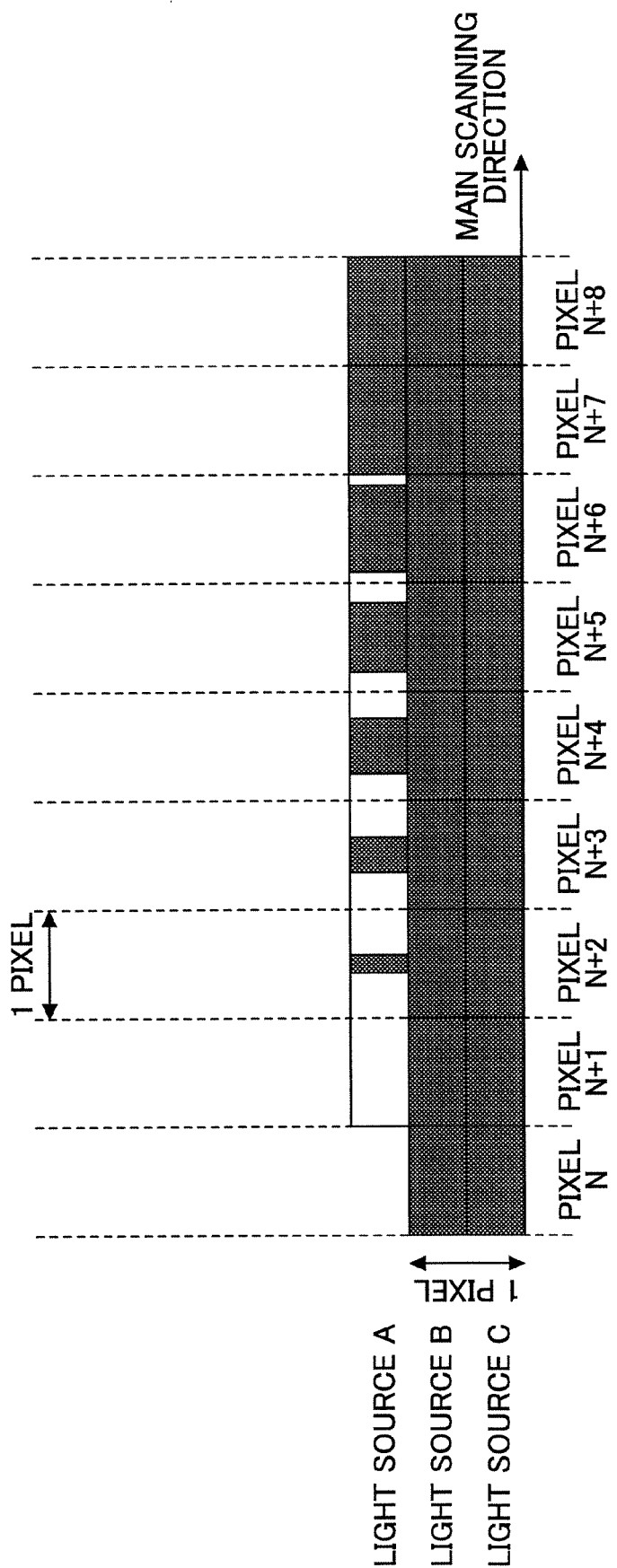
FIG. 47 illustrates yet another concrete example of driving and controlling light sources according to the fourth embodiment of the present invention.

FIG. 47 illustrates a concrete example of the second pattern of the fourth embodiment. In the concrete example of the second pattern, the driving status of the light source A at one edge of the (m+1) light sources (three light sources A, B, C in the example shown in FIG. 47) is changed in a step-wise manner while one pixel is being formed by the (m+1) light sources, i.e., three light sources A, B, C, so that pixel edges are smoothed.

The first pattern of the fourth embodiment can be realized by changing in a step-wise manner the driving status of only one light source at one edge of the (m+1) light sources. However, in order to attain smoother pixel edges, it is more preferable to perform smoothing on both sides of a pixel by changing in a step-wise manner the driving status of light sources on both edges of the m+1 light sources as described with reference to FIGS. 42-46.

The light source driving control unit 500 can be configured to switch between performing drive control according to the fourth embodiment and the third embodiment, based on whether the image is a line image or a typical image other than a line image.

In the above-described embodiments, the n light sources are preferably vertical cavity surface emitting lasers arranged on a single chip (more preferably a vertical cavity surface emitting array in which n vertical cavity surface emitting lasers are arranged in an array).

When vertical cavity surface emitting lasers are used as light sources of an optical scanner, power consumption can be reduced compared to the case of using regular semiconductor lasers. Further, plural light sources can be arranged arbitrarily, and therefore, it is possible to provide light sources according to resolution and speed. Accordingly, optical scanning can be performed with reduced power consumption and high precision.

Fifth Embodiment

A fifth embodiment according to the present invention is an image forming apparatus employing the optical scanner according to an embodiment of the present invention.

Figure 48:
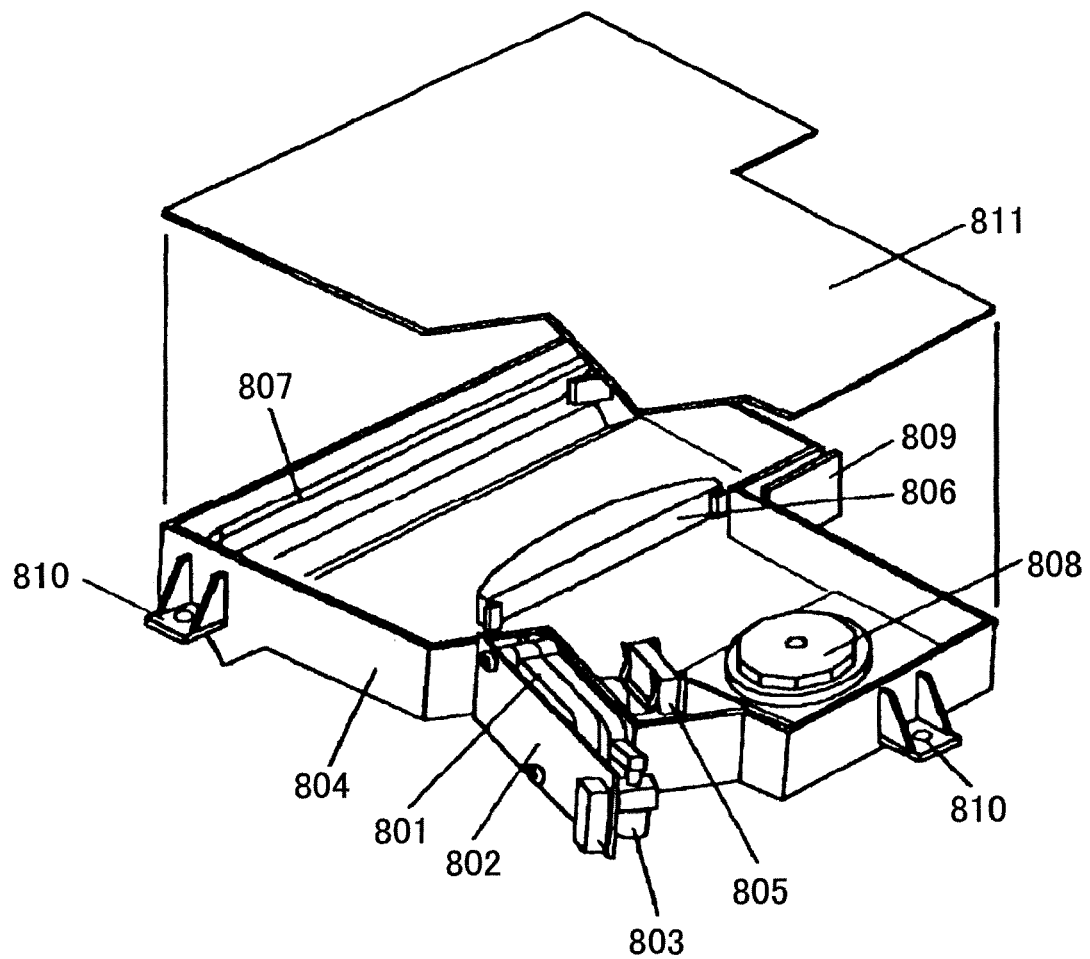
FIG. 48 is a perspective view of an example of an image forming apparatus employing the optical scanner according to an embodiment of the present invention.

FIG. 48 is a perspective view of an example of an image forming apparatus employing the optical scanner according to an embodiment of the present invention.

Referring to FIG. 48, the print substrate 802 is attached to the backside of the light source 801, which is pressed against the wall of the optical housing 804 orthogonal to the light axis by a spring. A driving circuit that controls semiconductor lasers and a pixel clock generating device are provided on the print substrate 802. It is possible to adjust the position of the light source 801 with respect to the wall of the optical housing 804, with the adjusting screw 803. The adjusting screw 803 is screwed to a projection formed on the wall of the optical housing 804. The cylinder lens 805, the polygon motor for rotating the polygon mirror 808, the fθ lens 806, the toroidal lens, and the turn-back mirror 807 are supported inside the optical housing 804 at predetermined positions. Similar to the light source 801, the PD substrate 809 for mounting a synchronization detecting sensor is attached to the outside of the optical housing 804. The cover 811 seals the top of the optical housing 804, and the optical housing 804 is fixed to a frame member of the image forming apparatus with screws at the plural attaching parts 810, protruding from the wall of the optical housing 804.

The semiconductor laser array including plural light sources as shown in FIG. 26 (for example, vertical cavity surface emitting lasers (vertical cavity surface emitting laser array)) can be used as the semiconductor laser in the optical scanner. A light beam emitted from the semiconductor laser is deflected and scanned by the rotation of the polygon mirror 808, via the cylinder lens 805. The deflected and scanned light flux segment is incident on a not shown photoconductive drum via the fθ lens 806, the toroidal lens, and the turn-back mirror 807. The scanned light beam is detected by a sensor based on areas not scanned on the photoconductor or as a reflection light reflected by a mirror. A signal can be detected by the sensor as follows. The synchronization detecting sensor detects a time interval between two points in the main scanning direction, which is the scanning direction accompanying rotation of the polygon mirror 808. A position detecting sensor can measure positional shift amounts in the sub scanning direction, which is a direction rotated by 90 degrees with respect to the main scanning direction. The measured value can be used for performing LD control or feedback control on a modulation circuit or a modulation data generating unit at a previous stage, in order to correct pixel positions.

Next, a description is given of a multi-beam scanning device (multi-beam optical system) including plural light sources.

Figure 49:
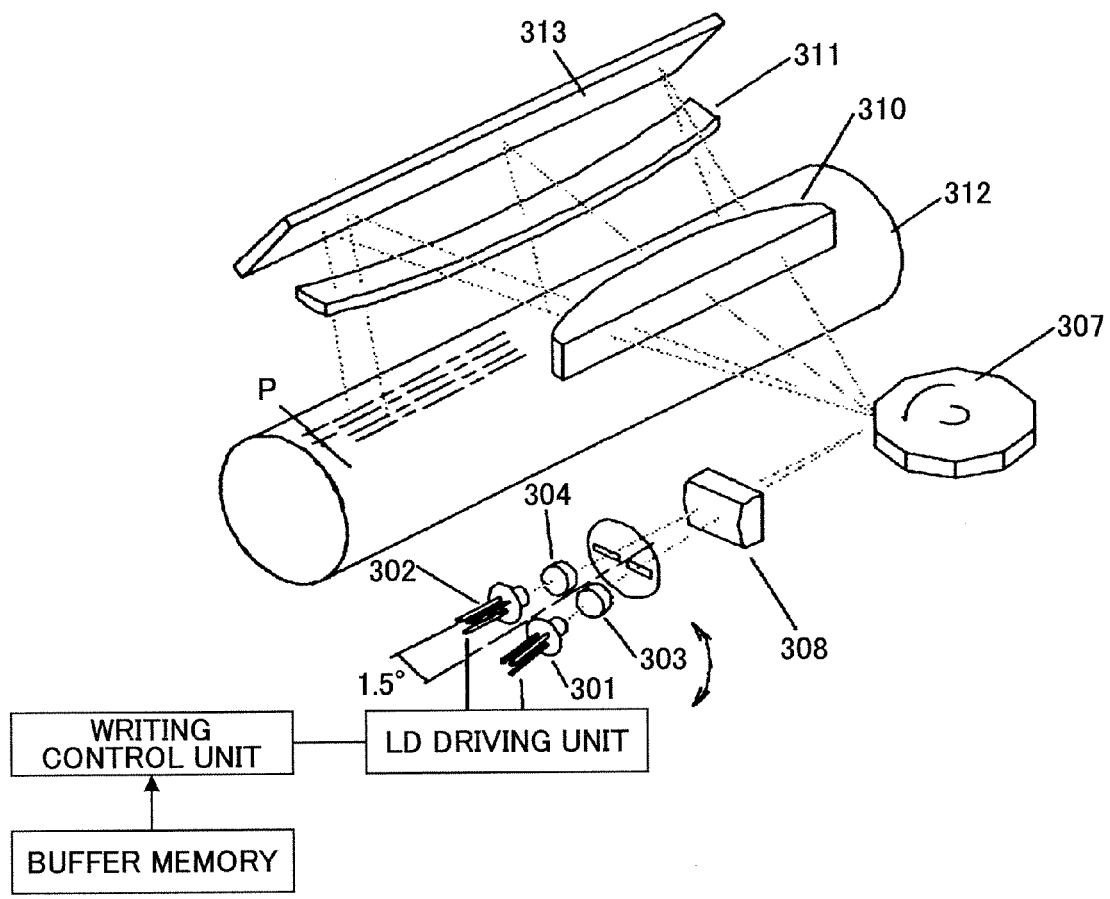
FIG. 49 is an example of a multi-beam scanning device.

FIG. 49 is an example of a multi-beam scanning device. The example shown in FIG. 49 is provided with two semiconductor laser arrays (301, 302), each including four channels arranged monolithically with intervals of ds=25 μm, so that the total number of light sources is eight.

In FIG. 49, the semiconductor laser arrays 301, 302 are laid out so that light axes match those of collimate lenses 303, 304, emission angles are symmetrical in the main scanning direction, and emission axes intersect at a reflection point of a polygon mirror 307. Plural light beams emitted from the semiconductor laser arrays 301, 302 are simultaneously scanned by the polygon mirror 307 via a cylinder lens 308, and are focused on a photoconductor 312 by an fθ lens 310 and a toroidal lens 311. Printing data corresponding to one line are loaded in a buffer memory for each light emitting source. For each surface of the polygon mirror 307, the printing data are read from the buffer memory, so that four lines are simultaneously recorded.

It is possible to correct differences in optical scanning lengths and differences in magnification caused by wavelength errors of the LDs of the multi-beams by shifting phases of the pixel clock. Accordingly, differences in scanning lengths can be corrected and irregularities in scanning light beams can be mitigated with precision corresponding to the phases.

Figure 50:
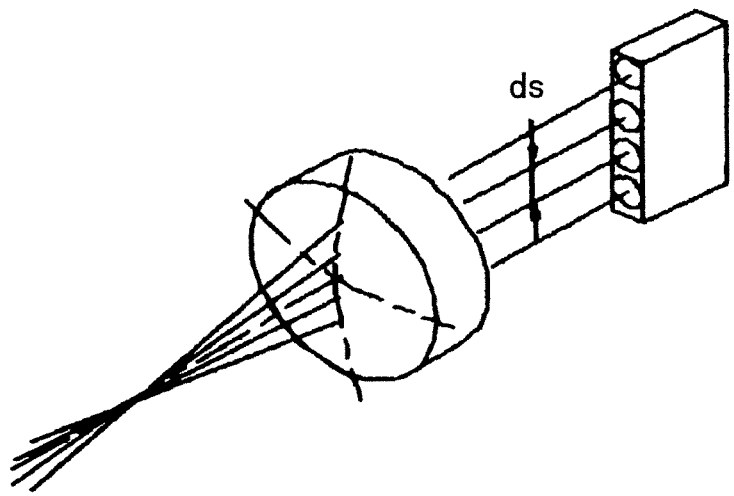
FIG. 50 is a perspective view of a laser array employed as the light source of the optical scanner.

FIG. 50 is a perspective view of a laser array employed as the light source of the optical scanner. The laser array includes four light emitting sources arranged in the sub scanning direction, assuming that the vertical direction as viewed in FIG. 50 is the sub scanning direction of the optical system.

Figure 51:
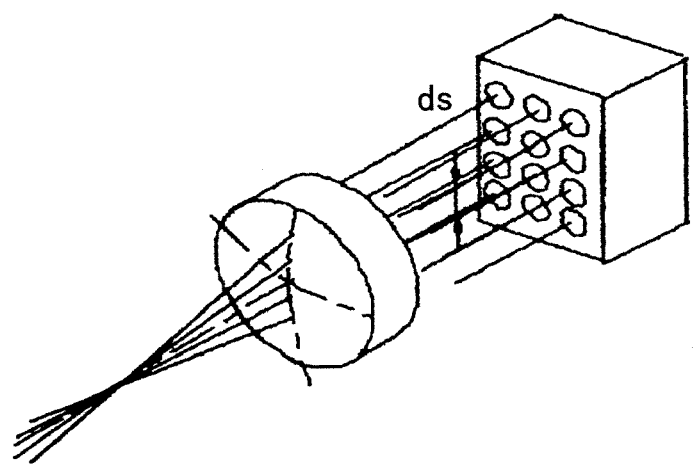
FIG. 51 is a perspective view of another laser array employed as the light source of the optical scanner.

FIG. 51 is a perspective view of another example of a laser array employed as the light source of the optical scanner. The laser array is a vertical cavity surface emitting laser array in which plural vertical cavity surface emitting lasers are arranged. The vertical cavity surface emitting laser array includes at total of 12 light emitting sources (vertical cavity surface emitting lasers), three in a horizontal direction and four in a vertical direction.

Figure 52:
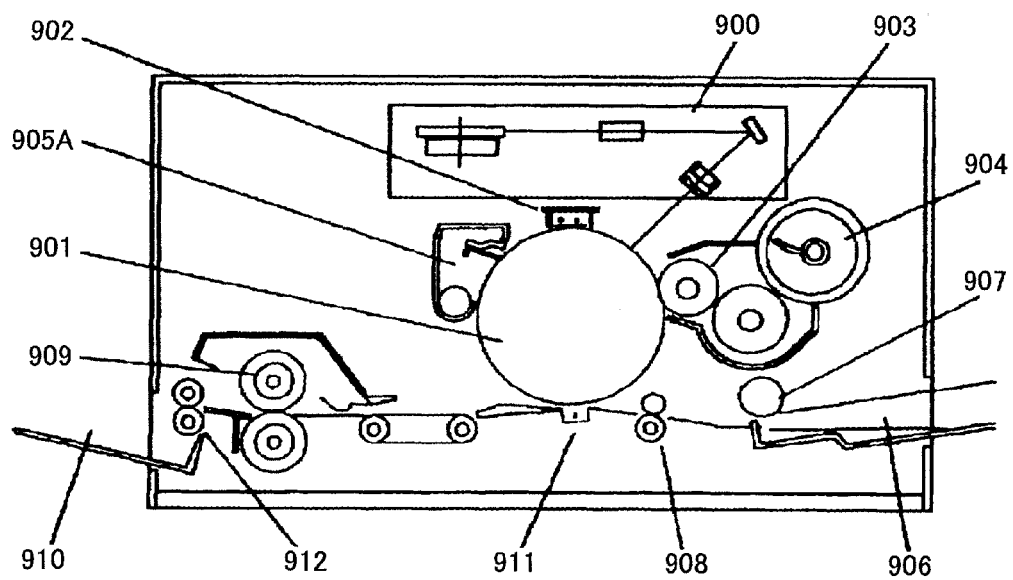
FIG. 52 is a schematic diagram of an image forming apparatus according to an embodiment of the present invention.

FIG. 52 is a schematic diagram of an image forming apparatus according to an embodiment of the present invention. Referring to FIG. 52, around the photoconductive drum 901 are provided the charger 902 for charging the photoconductive drum 901 to a high voltage; the developing roller 903 for causing charged toner to adhere to an electrostatic latent image recorded by the optical scanner 900 to turn the latent image into a visible image; the toner cartridge 904 for supplying toner to the developing roller 903; and a cleaning case 905A for storing residual toner scraped off from the photoconductive drum 901. As described above, plural light beams are simultaneously scanned by each surface of a polygon mirror to record a latent image on the photoconductive drum 901. A sheet of recording paper is supplied from the paper feeding tray 906 by the paper feeding roller 907, and sent out at a record starting timing in the sub scanning direction by the pair of registration rollers 908. Toner is transferred to the sheet by the transfer charger 911 when passing by the photoconductive drum 901, the toner is fixed onto the sheet by the fixing roller 909, and the sheet is discharged to the paper discharge tray 910 by the paper discharge roller 912. By applying the optical scanner according to the above embodiments of the present invention as the optical scanner 900 in this image forming apparatus, dot positions can be corrected highly precisely, and high quality images can be formed.

Figure 53:
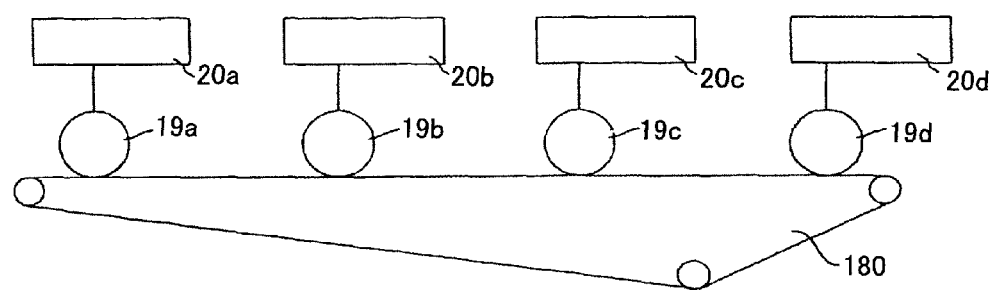
FIG. 53 is a schematic diagram of a color image forming apparatus according to an embodiment of the present invention.

The optical scanner according to the above embodiments of the present invention can also be applied to a color image forming apparatus. FIG. 53 is a schematic diagram of a tandem type color image forming apparatus including plural photoconductors, in which the optical scanner according to the present invention is applied. In the tandem type color image forming apparatus, it is necessary to provide different photoconductors corresponding to different colors of cyan, magenta, yellow, and black, for example. Scanning optical systems are provided for each photoconductor, and therefore, light beams pass through different light paths to form latent images. Accordingly, positional shifts of dots in the main scanning direction on the photoconductors often have different properties.

In FIG. 53, 180 denotes a transfer belt, 19a, 19b, 19c, 19d denote photoconductors corresponding to different colors, and 20a, 20b, 20c, 20d denote optical scanners corresponding to different colors.

By applying the optical scanner according to embodiments of the present invention as the optical scanners 20a, 20b, 20c, 20d, high-quality images can be formed, in which positional shifts of dots in the sub scanning direction are thoroughly corrected. An embodiment of the present invention is particularly effective in correcting positional shifts in the sub scanning direction to enhance image quality. Therefore, positional shifts between images of different colors formed at different color stations are effectively reduced, so that good color reproducibility is achieved in the final image formed.

Figure 55:
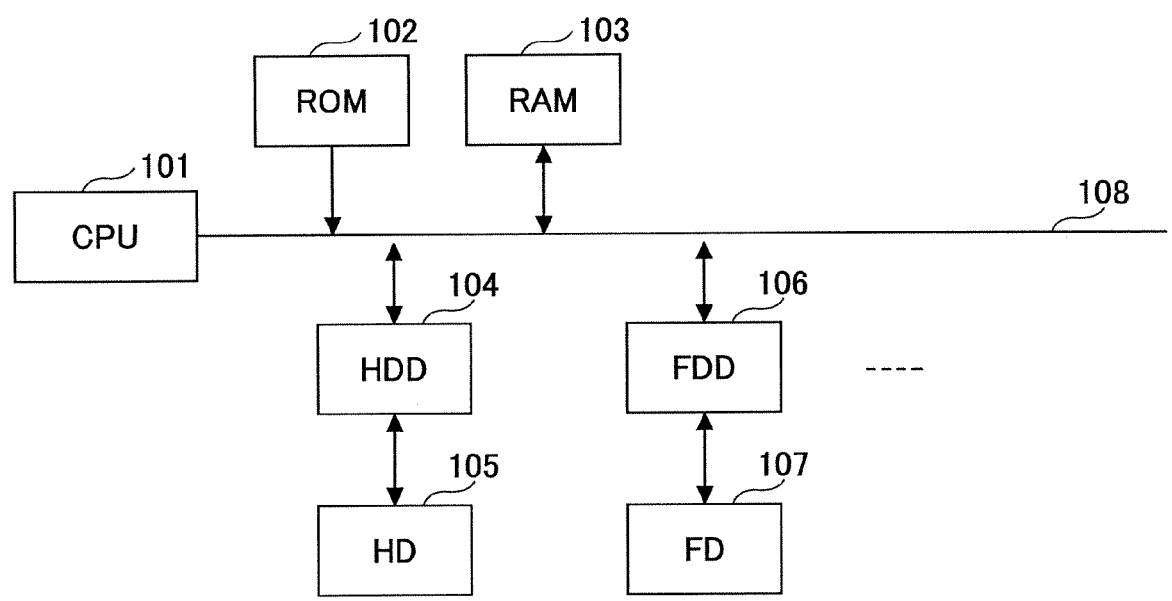
FIG. 55 is a block diagram of a hardware configuration of the light source driving control unit of the optical scanner according to an embodiment of the present invention.

FIG. 55 is a block diagram of a hardware configuration of the light source driving control unit of the optical scanner according to an embodiment of the present invention. The light source driving control unit includes a CPU 101, a ROM 102, a RAM 103, a HDD (hard disk drive) 104, a HD (hard disk) 105, a FDD (flexible disk drive) 106, and a FD 107, which are interconnected by a bus 108.

The CPU 101 controls all units of the device. The ROM 102 holds control programs. The RAM 103 is used as a work area of the CPU 101. In accordance with commands from the CPU 101, the HDD 104 controls reading/writing of data from/in the HD 105. The HD 105 holds data, which data are written according to control of the HDD 104. In accordance with commands from the CPU 101, the FDD 106 controls reading/writing of data from/in the FD 107. The FD 107 is removable, and holds data written according to control of the FDD 106.

The processes according to the above embodiments performed by the light source driving control unit 500 to implement the present invention can be provided as a program to be realized by a computer (e.g., CPU 101).

The program for causing a computer to realize the processes according to the above embodiments performed by the light source driving control unit 500 to implement the present invention can be loaded in a computer readable recording medium such as the hard disk (105), a floppy disk (registered trademark), a CD-ROM, an MO, or a DVD. A computer reads the program from the recording medium and executes the program. The program can be distributed via a network such as the Internet from the recording medium.

In the second, third, and fourth embodiments described above, the light sources A, B, C shown in FIGS. 32, 39, 42, 47 can be the light sources a1, a2, a3 shown in FIG. 26. The light sources A, B, C, D shown in FIGS. 41, 43 can be the light sources a1, a2, a3, a4 shown in FIG. 26. The light sources A, B, C, D, E shown in FIGS. 45, 46 can be the light sources a1, a2, a3, a4, b1 shown in FIG. 26. In FIG. 26, four light sources are horizontally arranged as a1-a4; however, the arrangement is not limited to that shown in FIG. 26, and any arbitrary number of light sources can be provided. For example the number of light sources can be three, as a1-a3, or five, as a1-a5.

Embodiments of the present invention can also be applied to laser printers, digital copiers, etc.

The present invention is not limited to the specifically disclosed embodiment, and variations and modifications may be made without departing from the scope of the present invention.

The present application is based on Japanese Priority Patent Application No. 2005-355541, filed on Dec. 9, 2005 and Japanese Priority Patent Application No. 2006-294049, filed on Oct. 30, 2006, the entire contents of which are hereby incorporated by reference.

What is claimed is:

1. An optical scanner, comprising:
   n (n≧2) light sources arranged at different positions in at least a sub scanning direction; and
   a light source drive control unit configured to: (1) drive and combine m (n≧m≧2) light sources among the n light sources to emit light to form a same one pixel when scanning one line, (2) change a driving status of the m light sources in order to shift a centroid of the pixel in the sub scanning direction, and (3) change a light source included among the m light sources to another light source, so that a position of the pixel moves in a predetermined direction in the sub scanning direction by an amount equal to a length of a pitch of a light source.

2. The optical scanner according to claim 1, wherein
   correction data are received for shifting the centroid of the pixel in the sub scanning direction, and
   the light source drive control unit is configured to change the driving status of the m light sources in order to shift the centroid of the pixel in the sub scanning direction by an amount according to the correction data.

3. The optical scanner according to claim 2, further comprising:

a sub scanning pixel position detecting unit configured to detect a pixel position in the sub scanning direction and output the correction data for correcting the pixel position in the sub scanning direction; wherein the light source drive control unit is configured to change the driving status of the m light sources in order to shift the centroid of the pixel in the sub scanning direction by an amount according to the correction data output by the sub scanning pixel position detecting unit.

4. The optical scanner according to claim 1, wherein the light source drive control unit is configured to change a light emitting time ratio of the m light sources in such a manner that a total light emitting time of the m light sources or a total exposing area of the m light sources is fixed, in order to shift the centroid of the pixel in the sub scanning direction.

5. The optical scanner according to claim 1, wherein the light source drive control unit is configured to change an exposing energy ratio of the m light sources by changing a light emitting level ratio of the m light sources in such a manner that a total exposing energy of the m light sources is fixed, in order to shift the centroid of the pixel in the sub scanning direction.

6. An optical scanner, comprising:
n ($n \geq 2$) light sources arranged at different positions in at least a sub scanning direction; and
a light source drive control unit configured to: (1) drive and combine m ($n \geq m \geq 2$) light sources among the n light sources to emit light to form a same one pixel when scanning one line, (2) change a driving status of the m light sources in order to shift a centroid of the pixel in the sub scanning direction, and (3) change the driving status of the light sources, so that:
(a) at an initial stage, up to a predetermined image height in a main scanning direction, m light sources form one pixel at a first position,
(b) beyond the predetermined image height, m+1 light sources form one pixel, and
(c) beyond another subsequent image height in the main scanning direction, m light sources form one pixel at a second position shifted in a predetermined direction in the sub scanning direction from the first position by an amount equal to a length of a pitch of a light source, wherein the m light sources are shifted in the sub scanning direction by one light source compared to the initial stage, wherein while the m+1 light sources form one pixel, the light source drive control unit performs a smoothing process to smooth pixel edges by changing in a step-wise manner the driving status of at least one light source at one edge among the m+1 light sources.

7. The optical scanner according to claim 6, wherein the light source drive control unit performs the smoothing process by employing PWM (pulse width modulation).

8. The optical scanner according to claim 6, wherein correction data are received for shifting the centroid of the pixel in the sub scanning direction, and
the light source drive control unit is configured to change the driving status of the m light sources in order to shift the centroid of the pixel in the sub scanning direction by an amount according to the correction data.

9. The optical scanner according to claim 8, further comprising:
a sub scanning pixel position detecting unit configured to detect a pixel position in the sub scanning direction and output the correction data for correcting the pixel position in the sub scanning direction; wherein
the light source drive control unit is configured to change the driving status of the m light sources in order to shift the centroid of the pixel in the sub scanning direction by an amount according to the correction data output by the sub scanning pixel position detecting unit.

10. The optical scanner according to claim 6, wherein the light source drive control unit is configured to change a light emitting time ratio of the m light sources in such a manner that a total light emitting time of the m light sources or a total exposing area of the m light sources is fixed, in order to shift the centroid of the pixel in the sub scanning direction.

11. The optical scanner according to claim 6, wherein the light source drive control unit is configured to change an exposing energy ratio of the m light sources by changing a light emitting level ratio of the m light sources in such a manner that a total exposing energy of the m light sources is fixed, in order to shift the centroid of the pixel in the sub scanning direction.

* * * * *